United States Patent
Wang

(10) Patent No.: US 12,017,797 B2
(45) Date of Patent: Jun. 25, 2024

(54) SYSTEMS AND METHODS FOR UAV DOCKING

(71) Applicant: SZ DJI TECHNOLOGY CO., LTD., Shenzhen (CN)

(72) Inventor: Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 136 days.

(21) Appl. No.: 17/883,562

(22) Filed: Aug. 8, 2022

(65) Prior Publication Data

US 2022/0388681 A1 Dec. 8, 2022

Related U.S. Application Data

(63) Continuation of application No. 17/068,528, filed on Oct. 12, 2020, now Pat. No. 11,407,526, which is a
(Continued)

(51) Int. Cl.
*B64F 1/22* (2006.01)
*B60L 53/65* (2019.01)
(Continued)

(52) U.S. Cl.
CPC .............. *B64F 1/222* (2013.01); *B60L 53/65* (2019.02); *B60R 9/00* (2013.01); *B64C 39/024* (2013.01);
(Continued)

(58) Field of Classification Search
CPC .. B64F 1/222; B64F 1/007; B64F 1/22; B64F 2201/20; B64U 70/00; B64U 2101/30;
(Continued)

(56) References Cited

U.S. PATENT DOCUMENTS 4,818,990 A * 4/1989 Fernandes ............ G05D 1/0038
340/310.17
5,015,187 A 5/1991 Lord
(Continued)

FOREIGN PATENT DOCUMENTS

CN 102200412 A 9/2011
CN 102909540 A 2/2013
(Continued)

OTHER PUBLICATIONS

Jie Zhao, Kwid Z.E. and its super partner, World Auto, Apr. 1, 2014, pp. 132-135.
(Continued)

*Primary Examiner* — Tye William Abell
(74) *Attorney, Agent, or Firm* — ANOVA LAW GROUP, PLLC

(57) ABSTRACT

A method for controlling operation of an unmanned aerial vehicle (UAV), includes receiving one or more commands selected by a user via a remote controller of the UAV, and in response to a received landing command: identifying the vehicle from a plurality of vehicles for landing, navigating the UAV to travel in a substantially same direction as the vehicle, and controlling the UAV to land on the vehicle when the UAV approaches the vehicle. The one or more commands includes at least the landing command to land the UAV on a vehicle while the vehicle is in operation.

20 Claims, 20 Drawing Sheets

Related U.S. Application Data continuation of application No. 15/966,276, filed on Apr. 30, 2018, now Pat. No. 10,800,548, which is a continuation of application No. 14/717,987, filed on May 20, 2015, now Pat. No. 10,059,467, which is a continuation of application No. 14/301,130, filed on Jun. 10, 2014, now Pat. No. 9,056,676, which is a continuation of application No. PCT/CN2014/079012, filed on May 30, 2014.

(51) Int. Cl.
| | |
|---|---|
| *B60R 9/00* | (2006.01) |
| *B64C 39/02* | (2023.01) |
| *B64F 1/00* | (2006.01) |
| *B64F 1/222* | (2024.01) |
| *G05D 1/00* | (2006.01) |
| *B64U 70/00* | (2023.01) |
| *B64U 80/86* | (2023.01) |
| *B64U 101/30* | (2023.01) |

(52) U.S. Cl.
CPC ............... *B64F 1/00* (2013.01); *B64F 1/007* (2013.01); *B64F 1/22* (2013.01); *G05D 1/0684* (2013.01); *B60L 2200/10* (2013.01); *B64U 70/00* (2023.01); *B64U 80/86* (2023.01); *B64U 2101/30* (2023.01); *B64U 2201/20* (2023.01); *Y02T 90/16* (2013.01)

(58) Field of Classification Search
CPC .. B64U 2201/20; B64U 80/86; B60L 2200/10
See application file for complete search history.

(56) References Cited

U.S. PATENT DOCUMENTS

| | | | |
|---|---|---|---|
| 7,040,247 | B2 | 5/2006 | Chouery |
| 7,130,741 | B2 | 10/2006 | Bodin et al. |
| 7,286,913 | B2 | 10/2007 | Bodin et al. |
| 8,276,844 | B2 | 10/2012 | Kariv |
| 8,511,606 | B1 | 8/2013 | Lutke et al. |
| 8,996,207 | B2 | 3/2015 | Goossen et al. |
| 9,056,676 | B1 | 6/2015 | Wang |
| 9,174,747 | B2 | 11/2015 | Kang |
| 9,302,783 | B2 | 4/2016 | Wang |
| 9,457,915 | B2 | 10/2016 | Wang |
| 9,561,871 | B2 | 2/2017 | Sugumaran |
| 10,453,348 | B2 | 10/2019 | Speasl et al. |
| 10,633,115 | B2 | 4/2020 | Pilskalns |
| 11,065,976 | B2 | 7/2021 | Venturelli et al. |
| 2005/0051667 | A1 | 3/2005 | Arlton et al. |
| 2006/0074557 | A1 | 4/2006 | Mulligan et al. |
| 2006/0249622 | A1 | 11/2006 | Steele |
| 2009/0294584 | A1 | 12/2009 | Lovell et al. |
| 2009/0314883 | A1 | 12/2009 | Arlton et al. |
| 2011/0049288 | A1* | 3/2011 | Suzuki .................. G05D 1/104 244/2 |
| 2011/0068224 | A1 | 3/2011 | Kang et al. |
| 2014/0032034 | A1 | 1/2014 | Raptopoulos et al. |
| 2015/0158599 | A1 | 6/2015 | Sisko |
| 2015/0321758 | A1 | 11/2015 | Sarna, II |
| 2015/0353206 | A1 | 12/2015 | Wang |
| 2016/0023762 | A1 | 1/2016 | Wang |
| 2017/0050749 | A1 | 2/2017 | Pilskalns |
| 2019/0258910 | A1 | 8/2019 | Stoman |
| 2021/0276735 | A1 | 9/2021 | Raptopoulos et al. |

FOREIGN PATENT DOCUMENTS

| | | |
|---|---|---|
| CN | 103010070 A | 4/2013 |
| CN | 103034185 A | 4/2013 |
| CN | 203191778 U | 9/2013 |
| CN | 103754288 A | 4/2014 |
| CN | 103914076 A | 7/2014 |
| EP | 2533068 A1 | 12/2012 |
| EP | 2899128 A1 | 7/2015 |
| FR | 2986647 A3 | 8/2013 |
| JP | S5587073 A | 7/1980 |
| JP | H09302628 A | 11/1997 |
| JP | 2000306469 A | 11/2000 |
| JP | 2001125641 A | 5/2001 |
| JP | 2001267829 A | 9/2001 |
| JP | 2002293298 A | 10/2002 |
| JP | 2006051893 A | 2/2006 |
| JP | 2006106919 A | 4/2006 |
| JP | 2006180326 A | 7/2006 |
| JP | 2006239797 A | 9/2006 |
| JP | 2007302103 A | 11/2007 |
| JP | 2008269101 A | 11/2008 |
| JP | 2009190661 A | 8/2009 |
| JP | 2012232654 A | 11/2012 |
| JP | 2013146309 A | 8/2013 |
| JP | 2014031118 A | 2/2014 |
| WO | 9215078 A1 | 9/1992 |
| WO | 03004352 A1 | 1/2003 |
| WO | 03059735 A2 | 7/2003 |
| WO | 2005123502 A2 | 12/2005 |
| WO | 2007141795 A1 | 12/2007 |
| WO | 2015026018 A1 | 2/2015 |

OTHER PUBLICATIONS

The United States Patent and Trademark Office (USPTO) Notice of allowance for U.S. Appl. No. 14/828,312, filed Jun. 14, 2016.
The European Patent Office (EPO) European search report and opinion for EP Application No. 14885848.3 dated Apr. 20, 2016.
The United States Patent and Trademark Office (USPTO) Office action for U.S. Appl. No. 14/828,312, filed Feb. 29, 2016.
The United States Patent and Trademark Office (USPTO) Office action for U.S. Appl. No. 14/828,312, filed Dec. 11, 2015.
The United States Patent and Trademark Office (USPTO) Notice of allowance for U.S. Appl. No. 14/828,325, filed Nov. 18, 2015.
The United States Patent and Trademark Office (USPTO) Notice of allowance for U.S. Appl. No. 14/301,130, filed Feb. 10, 2015.
The United States Patent and Trademark Office (USPTO) Office action for U.S. Appl. No. 14/301,130, filed Aug. 18, 2014.
The World Intellectual Property Organization (WIPO) International Search Report and Written Opinion for PCT/CN2014/079012 dated Jan. 4, 2015.
Penguin B.UAV Car Top Launcher datasheet.UAV Factory Ltd. www.uavfactory.com.2014.
Renault Kwid concept and its flying companion. Video. Acssceed 01/2212015. http://v.youku.com/v_show/id_XNjcxMTk3NzEy.html?qq-pf-to=pcqq.c2c.

* cited by examiner

SYSTEMS AND METHODS FOR UAV DOCKING

CROSS-REFERENCE

This application is a continuation of U.S. application Ser. No. 17/068,528, filed on Oct. 12, 2020, which is a continuation of U.S. application Ser. No. 15/966,276, filed on Apr. 30, 2018, now U.S. Pat. No. 10,800,548, which is a continuation of U.S. application Ser. No. 14/717,987, filed on May 20, 2015, now U.S. Pat. No. 10,059,467, which is a continuation of U.S. application Ser. No. 14/301,130, filed on Jun. 10, 2014, now U.S. Pat. No. 9,056,676, which is a continuation of International Application No. PCT/CN2014/079012, filed on May 30, 2014, the contents of all of which are hereby incorporated by reference in their entirety.

BACKGROUND OF THE INVENTION

Aerial vehicles such as unmanned aerial vehicles (UAVs) can be used for performing surveillance, reconnaissance, and exploration tasks for military and civilian applications. Such aerial vehicles may carry a payload configured to perform a specific function.

In some instances, an individual may be riding a vehicle and may wish to collect information about the vehicle's surroundings that cannot be readily discerned from within the vehicle.

SUMMARY OF THE INVENTION

In some instances, it may be desirable for a vehicle to be able to communicate with an aerial vehicle, such as an unmanned aerial vehicle (UAV) to gather information about the vehicle's surroundings. Thus, a need exists for improved UAV docking systems that may permit a UAV to dock with a vehicle. The present invention provides systems, methods, and devices related to using a UAV associated with a vehicle to gather information about the environment surrounding the vehicle and communicate with the vehicle. The UAV may take off and/or land from the vehicle. This may include recognition between the UAV and the vehicle, and performing obstacle avoidance. Communication between the UAV and the vehicle may be implemented to ensure robust communications between the movable vehicle and the flying UAV.

An aspect of the invention is directed to a method for coupling an unmanned aerial vehicle (UAV) to a vehicle, said method comprising: (a) detecting a marker on the vehicle that differentiates the vehicle from other vehicles; (b) generating a command signal, based on the marker, to drive one or more propulsion units of the UAV, thereby controlling a lateral velocity of the UAV to fall within a predetermined range relative to a lateral velocity of the vehicle; and (c) coupling the UAV onto the vehicle while the lateral velocity of the UAV falls within the predetermined range.

In some embodiments, the method may further comprise decreasing an altitude of the UAV prior to coupling the UAV onto the vehicle. The predetermined range may permit coupling of the UAV with the vehicle without damaging the UAV. The marker on the vehicle may uniquely differentiate the vehicle from other vehicles within 5 kilometers of the vehicle. The marker may be a visual marker detectable by an optical sensor. The marker may be a QR code. The marker may include black and white alternating patterns. The marker may include a laser spot. The marker may be detectable by an infrared sensor. The marker may be indicative of a landing position of the UAV on the vehicle.

The lateral velocity may be forward velocity of the vehicle. The forward velocity may be greater than zero. The lateral velocity of the UAV may be controlled by varying or maintaining output of the one or more propulsion units. The command signal may be generated with aid of a processor. The signal may be generated in response to a command to the UAV to initiate a landing sequence. The processor may be on-board the UAV. Alternatively, the processor may be on-board the vehicle. The one or more propulsion units may be rotors, and the lateral velocity of the UAV may be controlled by varying or maintaining the speed of rotation of one or more rotors.

The predetermined range may be within 5 mph greater than or less than the lateral velocity of the vehicle. The method may further comprise receiving, at the UAV, the lateral velocity of the vehicle; and calculating a target lateral velocity of the UAV falling within the predetermined range. The method may further comprise receiving, at the UAV, a target lateral velocity of the UAV falling within the predetermined range, wherein said target velocity is calculated on-board the vehicle based on the lateral velocity of the vehicle.

In some implementations, the UAV may be a rotorcraft. The altitude of the UAV can be decreased by decreasing the speed of rotation of one or more rotors. The coupling may be made via a mechanical connection. The coupling may be made via a magnetic connection. The coupling may occur on a roof of the vehicle. The marker may be on the roof of the vehicle. The coupling may be configured to prevent detachment of the UAV and the vehicle even when the vehicle is traveling between 30 mph and 100 mph. The steps (a)-(c) may occur automatically without requiring human intervention. The coupling may be automated and can occur without intervention of an operator of the vehicle. The coupling may be automated and can occur without intervention of any live being within or outside the vehicle.

An additional aspect of the invention may be directed to an unmanned aerial vehicle (UAV) capable of coupling to a moving vehicle, said UAV comprising: (a) one or more propulsion units configured to generate a lift of the UAV; (b) one or more sensors configured to detect a marker on the vehicle; (c) one or more processors, individually or collectively configured to generate a command signal, based on the detected marker, wherein the one or more propulsion units, in response to the command signal, controls a lateral velocity of the UAV to fall within a predetermined range relative to an assessed lateral velocity of the vehicle; and (d) one or more landing components configured to couple the UAV onto the vehicle.

The one or more propulsion units, in response to the command signal, may decrease an altitude of the UAV. The one or more propulsion units may decrease the altitude of the UAV prior to coupling the UAV onto the vehicle. The predetermined range may permit coupling of the UAV with the vehicle without damaging the UAV.

The marker on the vehicle may uniquely differentiate the vehicle from other vehicles within 5 kilometers of the vehicle. The marker may be a visual marker detectable by an optical sensor. The marker may be a QR code. The marker may include black and white alternating patterns. The marker may include a laser spot. The marker may be detectable by an infrared sensor. The marker may be indicative of landing position of the UAV on the vehicle.

The lateral velocity may be a forward velocity of the vehicle. The forward velocity may be greater than zero. The one or more propulsion units may be rotors, and wherein the lateral velocity of the UAV is controlled by varying or maintaining the speed of rotation of one or more rotors. The predetermined range may be within 5 mph greater than or less than the lateral velocity of the vehicle.

In some embodiments, the UAV may be a rotorcraft. The altitude of the UAV may be decreased by decreasing the speed of rotation of one or more rotors. The one or more landing components may be configured to provide a mechanical connection. The one or more landing components may be configured to provide a magnetic connection. The one or more landing components may be configured to couple to a roof of the vehicle. The marker may be on the roof of the vehicle. The one or more landing components may be configured to prevent detachment of the UAV and the vehicle even when the vehicle is traveling between 30 mph and 100 mph.

A vehicle configured to couple an unmanned aerial vehicle (UAV) may be provided in accordance with another aspect of the invention. Said vehicle may comprise: a marker capable of being detected by the UAV that distinguishes the vehicle from other vehicles; and one or more coupling connection components configured to couple the UAV to the vehicle.

The vehicle may further comprise a processor capable of identifying a location of the UAV. The vehicle may further comprise a communication unit capable of communicating with the UAV. The vehicle may further comprise a location unit capable of determining the velocity of the vehicle. The communication unit may be configured to transmit vehicle velocity information to the UAV. The marker may be on a roof of the vehicle. The one or more coupling connection components may be on a roof of the vehicle.

Furthermore, aspects of the invention may provide an unmanned aerial vehicle (UAV) housing apparatus comprising: a mounting component configured to attach to a vehicle; a landing connection component configured to form a connection with the UAV that prevents detachment of the UAV and the UAV housing apparatus; and a cover configured to at least partially enclose the UAV when the UAV is connected to the landing connection component.

The mounting component may be configured to attach to a vehicle roof. The mounting component may be configured to removably attach to the vehicle. The mounting component may be permanently attached to the vehicle.

In some embodiments, the landing connection component may provide a mechanical connection. The landing connection component may provide a magnetic connection. The landing connection component may be configured to prevent detachment of the UAV and the vehicle when the vehicle is traveling between 30 mph and 100 mph. The landing connection component may permit charging of the UAV while the UAV is connected to the landing connection component. The landing connection component may permit interchange of data between the UAV and the vehicle via the landing connection component while the UAV is connected to the landing connection component.

The cover is configured to completely enclose the UAV when the UAV is connected to the landing connection component. The cover may be coupled to an actuator configured to drive the cover between an open position and a closed position. The cover may be configured to open and close while the vehicle is in motion. The cover may be capable of functioning as a communication device when the cover is in an open position. The communication device may be a satellite dish. The communication device may be used to communicate with the UAV.

The UAV may further comprise a processor configured to generate a signal to close the cover when a UAV has landed and connected to the landing connection component. The UAV may further comprise a processor configured to generate a signal to open the cover when the UAV is about to take off from the vehicle. The cover may be waterproof. The cover may be powered by solar power. The cover may store energy used to charge and/or power the UAV when the UAV is connected to the landing connection component. The landing connection component may be configured to form a connection with multiple UAVs simultaneously. The cover may be configured to at least partially enclose multiple UAVs simultaneously.

In accordance with aspects of the invention, a vehicle forming a platform from which an unmanned aerial vehicle (UAV) may take off or land may be provided. Said vehicle may comprise: the UAV housing apparatus as previously described; and one or more propulsion unit configured to propel the vehicle.

The vehicle may be a car, truck, van, or bus. The vehicle may comprise a plurality of wheels. The vehicle may further comprise one or more communication unit capable of wirelessly communicating with the UAV. The communications may include two-way communications with the UAV. The cover may be a roof of the vehicle that is capable of opening and closing.

Additional aspects of the invention may include a method of housing an unmanned aerial vehicle (UAV), said method comprising: providing the UAV housing apparatus as previously described; detecting a UAV status; and varying or maintaining cover position based on the UAV status.

The method may further comprise closing the cover when the UAV has landed and formed a connection to the landing connection component. The method may further comprise opening the cover when the UAV is about to take off from the vehicle.

Moreover, aspects of the invention may include a method of landing an unmanned aerial vehicle (UAV) onto a companion moving vehicle, said method comprising: generating a command signal to drive one or more propulsion units of the UAV, thereby controlling positioning of a UAV relative to a moving vehicle, such that the UAV is moving along a travel trajectory in line with the companion moving vehicle; detecting an obstruction along the travel trajectory; and altering the UAV travel trajectory to avoid the obstruction.

The UAV position relative to the vehicle may be controlled via an input from a user via a remote controller. The UAV position relative to the vehicle may be controlled in accordance with a predetermined flight path.

The travel trajectory may include a projected UAV flight path. The UAV flight path may include a flight path for the UAV to land on the vehicle. The UAV flight path may include a flight path for the UAV to take off from the vehicle. The UAV flight path may include a flight path for the UAV to travel a predetermined distance ahead of the vehicle. The UAV flight path may include a flight path for the UAV to travel within a predetermined range of the vehicle. The altered UAV flight path may coincide with the UAV travel trajectory after the obstruction is cleared.

In some embodiments, the obstruction includes a structure. The obstruction may include a moving object. The obstruction may be detected with aid of one or more sensors. The obstruction may be detected by the UAV accessing geographic information. The geographic information may include map information.

An aspect of the invention may be directed to a method of permitting an unmanned aerial vehicle (UAV) to take off from a companion moving vehicle, said method comprising: generating a command signal to drive one or more propulsion units of the UAV, thereby controlling positioning of a UAV relative to a moving vehicle, such that the UAV is set to move along a travel trajectory in line with the companion moving vehicle; detecting an obstruction along the travel trajectory; and preventing the UAV from taking off until the obstruction is no longer in the travel trajectory, or altering the UAV travel trajectory to avoid the obstruction.

Additionally, aspects of the invention may include a controller for controlling operation of an unmanned aerial vehicle (UAV), said controller comprising: one or more user input components, wherein the one or more user input components are configured to be part of a vehicle; and a processor configured to receive a signal from the user input components and generate a command to be transmitted to the UAV to control operation of the UAV.

The one or more user input components may be at least part of a steering wheel of the vehicle. The one or more user input components may be at least part of a shift control of the vehicle. The one or more user input components may be at least part of a dashboard of the vehicle. The one or more user input components may be at least part of a display of the vehicle.

In some embodiments, the one or more user input components may include a button. The one or more user input components may include a joystick. The one or more user input components may include a touchscreen. The one or more user input components may include a microphone. The one or more user input components may include a camera.

Optionally, controlling operation of the UAV may include controlling flight of the UAV. Controlling operation of the UAV may include controlling positioning of a sensor of the UAV. The sensor may be a camera. Controlling operation of the UAV may include controlling operation of a sensor of the UAV.

An aspect of the invention may include a vehicle for controlling operation of an unmanned aerial vehicle (UAV), said vehicle comprising the controller as previously described; and one or more propulsion units configured to propel the vehicle.

The vehicle may be a car, truck, van, or bus. The vehicle may comprise a plurality of wheels. The vehicle may further comprise one or more communication units capable of wirelessly communicating with the UAV. The communications may include two-way communications with the UAV.

A method for controlling operation of an unmanned aerial vehicle (UAV) may be provided in accordance with an aspect of the invention. Said method may comprise: receiving, at one or more user input components of a vehicle, UAV control input from a user, wherein the one or more user input components are part of the vehicle; and generating, with aid of a processor, a command to be transmitted to the UAV to control operation of the UAV based on a signal from the user input components.

The one or more input components may be built into a steering wheel of the vehicle. The one or more input components can be built into a shift control of the vehicle. The one or more input components may be built into a dashboard of the vehicle. The one or more input components may be at least part of a display of the vehicle.

In some implementations, the one or more user input components may include a button. The one or more user input components may include a touchscreen. The one or more user input components may include a microphone. The one or more user input components may include a camera.

The user input may include a touch input from the user. The user input may include a voice input from the user. The user input may include a gesture by the user. The user input may be provided while the vehicle is in motion. The user input may be provided while the user is operating the vehicle.

The command may control flight of the UAV. The command may control a sensor on-board the UAV. The command may initiate a take-off sequence for the UAV from the vehicle. The command may initiate a landing sequence for the UAV on the vehicle.

A method for displaying information from an unmanned aerial vehicle (UAV) may be provided. Said method may comprise: providing a vehicle capable of permitting a UAV to take off from the vehicle and/or land on the vehicle while the vehicle is in operation; receiving, at a communication unit of the vehicle, information from the UAV; and displaying, at a display unit within the vehicle, information from the UAV while the vehicle is in operation.

The vehicle may include a roof mount configured to permit the UAV to take off and/or land from a roof of the vehicle. The information from the UAV may include location information about the UAV. The information from the UAV may include images captured by a camera on-board the UAV. The information from the UAV may include a state of charge of an energy storage device of the UAV.

In some cases, the display unit may be built into the vehicle and is not removable from the vehicle. Alternatively, the display unit may be removable from the vehicle. The information may be displayed on the unit in real-time. The information may be displayed while the UAV is in flight. The information may be displayed while the UAV is landed on the vehicle.

The communication unit may also be capable of transmitting information from the vehicle to the UAV.

Also, aspects of the invention may be directed to a vehicle for displaying information from an unmanned aerial vehicle (UAV), said vehicle comprising: a mount configured to permitting a UAV to take off from the vehicle and/or land on the vehicle while the vehicle is in operation; a communication unit configured to receive information from the UAV; and a display unit configured to display the information from the UAV while the vehicle is in operation.

A method for providing communications between an unmanned aerial vehicle (UAV) and a vehicle may be provided in accordance with aspects of the invention, said method comprising: providing a vehicle capable of communicating a UAV while the vehicle is in operation; and communicating, via a communication unit of the vehicle, with the UAV via an indirect communication method.

The vehicle may be configured to permit the UAV to take off from the vehicle and/or land on the vehicle while the vehicle is in operation. The vehicle may include a roof mount configured to permit the UAV to take off and/or land from a roof of the vehicle.

The indirect communication method may comprise communication via a mobile phone network. The mobile phone network may be a 3G or 4G network. The indirect communication method may utilize one or more intermediary devices in communications between the vehicle and the UAV. The indirect communication may occur while the vehicle is in motion.

The method may further comprise determining, with aid of a processor, to switch to a direct communication method; and communicating with the UAV via the direct communication method. The method may further comprise communicating with the UAV via a direct communication method with aid of a directional antenna on the vehicle. The directional antenna may also function as a cover for the UAV when the UAV is coupled to the vehicle.

Additional aspects of the invention may provide a method for providing communications between an unmanned aerial vehicle (UAV) and a vehicle, said method comprising: providing a vehicle capable of communicating a UAV while the vehicle is in operation; calculating, with aid of a processor, an angle at which to position a directional antenna of the vehicle; and communicating, via the directional antenna of the vehicle, with the UAV via a direct communication method.

The vehicle may be configured to permit the UAV to take off from the vehicle and/or land on the vehicle while the vehicle is in operation. The angle at which to position a directional antenna may be calculated based on a position of the UAV relative to the vehicle. The position may include relative altitude and relative lateral position. The directional antenna may be formed from a cover for the UAV when the UAV is coupled to the vehicle. The method may further comprise determining, with aid of a processor, to switch to an indirect communication method; and communicating with the UAV via the indirect communication method.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
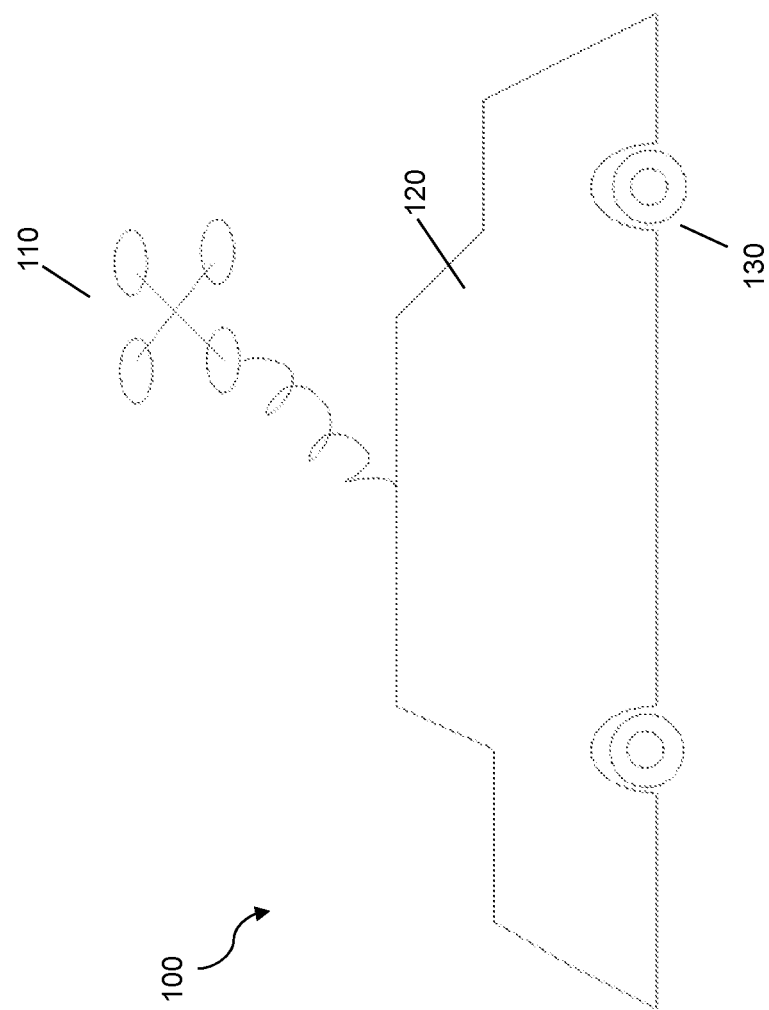
FIG. 1 shows an example of an unmanned aerial vehicle (UAV) that may be associated with a vehicle, that may take off from the vehicle in accordance with an embodiment of the invention.

The systems, devices, and methods of the present invention provide interaction between an unmanned aerial vehicle (UAV) and a vehicle. Description of the UAV may be applied to any other type of unmanned vehicle, or any other type of movable object. Description of the vehicle may apply to land-bound, underground, underwater, water surface, aerial, or space-based vehicles. The interaction between the UAV and the vehicle may include docking between the UAV and the vehicle. Communications may occur between the UAV and the vehicle while the UAV is separated from the vehicle and/or while the UAV is connected to the vehicle.

An individual on board a vehicle may wish to gather information that the individual may not be able to gather while on board the vehicle. In some instances, the vehicle may be in operation and/or in motion while the individual wishes to gather information. A UAV may be able to gather information may not be readily accessed while on board the vehicle. For example, a driver or passenger of a vehicle may wish to see what lies ahead, but their vision may be blocked by other vehicles, natural features, structures, or other types of obstructions. A UAV may take off from the vehicle and fly overhead. The UAV may also optionally fly forward, or in any pattern relative to the vehicle. The UAV may have a camera that may stream images down to the vehicle in real time. Thus, the driver or passenger of the vehicle may be able to see what lies ahead or collect any other information about the surrounding environment.

The UAV may be capable of taking off and landing from the vehicle. This may occur while the vehicle is stationary or in motion. The UAV may be able to discern its companion vehicle from other vehicles. This may be useful in situations where multiple vehicles may be provided in a small area, such as a traffic jam or urban driving. The UAV thus may be able to ensure it lands on the correct vehicle. The UAV may have some obstacle avoidance built in. The UAV may be able to detect and avoid obstacles while taking off and/or landing. The UAV may be able to detect and avoid obstacles while in flight. The UAV may be manually controlled by a user on board the vehicle. In other instances, the UAV may have an autonomous or semi-autonomous flight mode. The user may be able to toggle between different flight modes, or different flight modes may kick in for different situations.

The UAV may form a physical connection with the vehicle while docked with the vehicle. The physical connection may keep the UAV connected to the vehicle while the vehicle is in motion. A cover may optionally be provided to cover and/or protect the UAV when the UAV is docked with the vehicle. Electrical connections and/or data connections may be formed between the UAV and the vehicle while the UAV is docked with the vehicle.

Communications may be provided between the UAV and the vehicle. The communications may be provided while the UAV is docked with the vehicle and while the UAV is in flight. Direct and/or indirect modes of communications may be used. The UAV may be controlled using user input components that may be part of the vehicle. Data from the UAV may stream to a monitor within the vehicle.

FIG. 1 shows an example of an unmanned aerial vehicle (UAV) that may be associated with a vehicle, that may take off from the vehicle in accordance with an embodiment of the invention. A vehicle docking system 100 may be provided in accordance with an embodiment of the invention. The docking system may include a UAV 110 and a vehicle 120. The vehicle may have one or more propulsion units 130.

Any description herein of a UAV 110 may apply to any type of movable object. The description of a UAV may apply to any type of unmanned movable object (e.g., which may traverse the air, land, water, or space). The UAV may be capable of responding to commands from a remote controller. The remote controller may be not connected to the UAV. In some instances, the UAV may be capable of operating autonomously or semi-autonomously. The UAV may be capable of following a set of pre-programmed instructions. In some instances, the UAV may operate semi-autonomously by responding to one or more commands from a remote controller while otherwise operating autonomously.

The UAV 110 may be an aerial vehicle. The UAV may have one or more propulsion units that may permit the UAV to move about in the air. The one or more propulsion units may enable the UAV to move about one or more, two or more, three or more, four or more, five or more, six or more degrees of freedom. In some instances, the UAV may be able to rotate about one, two, three or more axes of rotation. The axes of rotation may be orthogonal to one another. The axes of rotation may remain orthogonal to one another throughout the course of the UAV's flight. The axes of rotation may include a pitch axis, roll axis, and/or yaw axis. The UAV may be able to move along one or more dimensions. For example, the UAV may be able to move upwards due to the lift generated by one or more rotors. In some instances, the UAV may be capable of moving along a Z axis (which may be up relative to the UAV orientation), an X axis, and/or a Y axis (which may be lateral). The UAV may be capable of moving along one, two, or three axes that may be orthogonal to one another.

The UAV 110 may be a rotorcraft. In some instances, the UAV may be a multi-rotor craft that may include a plurality of rotors. The plurality or rotors may be capable of rotating to generate lift for the UAV. The rotors may be propulsion units that may enable the UAV to move about freely through the air. The rotors may rotate at the same rate and/or may generate the same amount of lift or thrust. The rotors may optionally rotate at varying rates, which may generate different amounts of lift or thrust and/or permit the UAV to rotate. In some instances, one, two, three, four, five, six, seven, eight, nine, ten, or more rotors may be provided on a UAV. The rotors may be arranged so that their axes of rotation are parallel to one another. In some instances, the rotors may have axes of rotation that are at any angle relative to one another, which may affect the motion of the UAV.

A vertical position and/or velocity of the UAV may be controlled by maintaining and/or adjusting output to one or more propulsion units of the UAV. For example, increasing the speed of rotation of one or more rotors of the UAV may aid in causing the UAV to increase in altitude or increase in altitude at a faster rate. Increasing the speed of rotation of the one or more rotors may increase the thrust of the rotors. Decreasing the speed of rotation of one or more rotors of the UAV may aid in causing the UAV to decrease in altitude or decrease in altitude at a faster rate. Decreasing the speed of rotation of the one or more rotors may decrease the thrust of the one or more rotors. When a UAV is taking off, such as from a vehicle, the output may be provided to the propulsion units may be increased from its previous landed state. When the UAV is landing, such as on a vehicle, the output provided to the propulsion units may be decreased from its previous flight state.

A lateral position and/or velocity of the UAV may be controlled by maintaining and/or adjusting output to one or more propulsion units of the UAV. The attitude of the UAV and the speed of rotation of one or more rotors of the UAV may affect the lateral movement of the UAV. For example, the UAV may be tilted in a particular direction to move in that direction, and the speed of the rotors of the UAV may affect the speed of the lateral movement and/or trajectory of movement. Lateral position and/or velocity of the UAV may be controlled by varying or maintaining the speed of rotation of one or more rotors of the UAV.

The UAV 110 may be of small dimensions. The UAV may be capable of being lifted and/or carried by a human. The UAV may be capable of being carried by a human in one hand. The UAV may be capable of fitting on top of a vehicle or within a vehicle 120. The UAV may be capable of being carried by a roof of a vehicle. The UAV may be capable of being carried on top of a trunk of a vehicle. The UAV may be capable of being carried by a front hood of the vehicle. The UAV dimensions may optionally not exceed the width of the vehicle. The UAV dimensions may optionally not exceed the length of the vehicle.

The UAV 110 may have a greatest dimension (e.g., length, width, height, diagonal, diameter) of no more than 100 cm. In some instances, the greatest dimension may be less than or equal to 1 mm, 5 mm, 1 cm, 3 cm, 5 cm, 10 cm, 12 cm, 15 cm, 20 cm, 25 cm, 30 cm, 35 cm, 40 cm, 45 cm, 50 cm, 55 cm, 60 cm, 65 cm, 70 cm, 75 cm, 80 cm, 85 cm, 90 cm, 95 cm, 100 cm, 110 cm, 120 cm, 130 cm, 140 cm, 150 cm, 160 cm, 170 cm, 180 cm, 190 cm, 200 cm, 220 cm, 250 cm, or 300 cm. Optionally, the greatest dimension of the UAV may be greater than or equal to any of the values described herein. The UAV may have a greatest dimension falling within a range between any two of the values described herein.

The UAV 110 may be lightweight. For example, the UAV may weigh less than or equal to 1 mg, 5 mg, 10 mg, 50 mg, 100 mg, 500 mg, 1 g, 2 g, 3 g, 5 g, 7 g, 10 g, 12 g, 15 g, 20 g, 25 g, 30 g, 35 g, 40 g, 45 g, 50 g, 60 g, 70 h, 80 h, 90 g, 100 g, 120 g, 150 g, 200 g, 250 g, 300 g, 350 g, 400 g, 450 g, 500 g, 600 g, 700 g, 800 g, 900 g, 1 kg, 1.1 kg, 1.2 kg, 1.3 kg, 1.4 kg, 1.5 kg, 1.7 kg, 2 kg, 2.2 kg, 2.5 kg, 3 kg, 3.5 kg, 4 kg, 4.5 kg, 5 kg, 5.5 kg, 6 kg, 6.5 kg, 7 kg, 7.5 kg, 8 kg, 8.5 kg, 9 kg, 9.5 kg, 10 kg, 11 kg, 12 kg, 13 kg, 14 kg, 15 kg, 17 kg, or 20 kg. The UAV may have a weight greater than or equal to any of the values described herein. The UAV may have a weight falling within a range between any two of the values described herein.

The UAV 110 may be capable of interacting with a vehicle 120. The description of a vehicle may apply to any type of movable object (e.g., which may traverse the air, land, water, or space). The vehicle may be operated by an individual that is on-board the vehicle. The vehicle may be operated by an individual that is within the vehicle. The individual may be contacting the vehicle or local to the vehicle. Alternatively, the vehicle may be capable of responding to commands from a remote controller. The remote controller may be not connected to the vehicle. In some instances, the vehicle may be capable of operating autonomously or semi-autonomously. The vehicle may be capable of following a set of pre-programmed instructions.

The vehicle 120 may have one or more propulsion units 130 that may permit the vehicle to move about. The vehicle may traverse the land, air, water, or space. The vehicle may be capable of moving over land, underground, underwater, on the water's surface, in the air, and/or in space. The one or more propulsion units may enable the vehicle to move about one or more, two or more, three or more, four or more, five or more, six or more degrees of freedom. The one or more propulsion units may permit the vehicle to move within any media. For example, the propulsion units may include wheels that may permit the vehicle to move overland. Other examples of propulsion units may include, but are not limited to treads, propellers, rotors, jets, legs, or any other type of propulsion unit. The propulsion units may enable the vehicle to move over a single type or multiple types of terrain. The propulsion units may permit the vehicle to move up inclines or down slopes. The vehicle may be self-propelled.

The vehicle may have an engine, battery, or any type of driver. In some instances, a vehicle may have an internal combustion engine. The vehicle may run on a fuel and/or on electricity. The propulsion units of the vehicle may be driven by the engine, battery, or other type of driver.

The vehicle 120 may be any type of movable object. Examples of vehicles may include, but are not limited to cars, trucks, semis, buses, vans, SUVs, mini-vans, tanks, jeeps, motorcycles, tricycles, bicycles, trolleys, trains, subways, monorails, airplanes, helicopters, blimps, hot air balloons, spacecraft, boats, ships, yachts, submarines, or any other types of vehicles. The vehicles may be passenger vehicles. The vehicles may be capable of holding one or more occupant therein. One or more of the occupants may operate the vehicle. One or more of the occupants may direct movement of the vehicle and/or other functions of the vehicle. For example, the occupant may be a driver of a car or other land bound vehicle, or a pilot of a plane, ship, spacecraft, or other type of air-based, water-based, or space-based vehicle.

The vehicle 120 may be a docking vehicle with which the UAV 110 may dock. The UAV may land on the vehicle. The UAV may take off from the vehicle. The UAV may be carried by the vehicle while the UAV is docked to the vehicle. In some embodiments, a mechanical connection may be formed between the UAV and the vehicle while the UAV is docked to the vehicle. The vehicle may be in motion while the UAV is docked to the vehicle. The vehicle may remain stationary and/or move while the UAV is docked to the vehicle.

The UAV 110 may dock to the vehicle 120 on any part of the vehicle. For example, the UAV may dock to a roof of the vehicle. The UAV may be docked to a top surface of the vehicle. The UAV may be docked to a trunk of the vehicle. For example, the UAV may be carried on a top surface of the trunk of the vehicle. In another example, the UAV may be docked to a front hood of the vehicle. The UAV may be carried on a top surface of the front hood of the vehicle. In some instances, the UAV may dock with a trailer pulled by the vehicle, or on a side portion of the vehicle.

The UAV 110 may take off from the vehicle 120. In some instances, the UAV may take off while the vehicle is in operation. The UAV may take off while the vehicle is powered on and/or an individual is operating the vehicle. The UAV may take off while the vehicle engine is running. The UAV may take off while the vehicle is stationary and/or while the vehicle is in motion. In taking off, the UAV may ascend relative to the vehicle. For example, if the UAV is a multi-rotor craft, one or more rotors of the UAV may rotate to generate lift for the UAV. The UAV may gain altitude and be separated from the vehicle. In some instances, additional separation steps may occur to undock the UAV from the vehicle.

The UAV may be in flight while the vehicle is driving in around. In some embodiments, the UAV may remain in communication with the vehicle. The UAV may send information to the vehicle. The vehicle may or may not send information to the UAV while the UAV is in flight.

Figure 2:
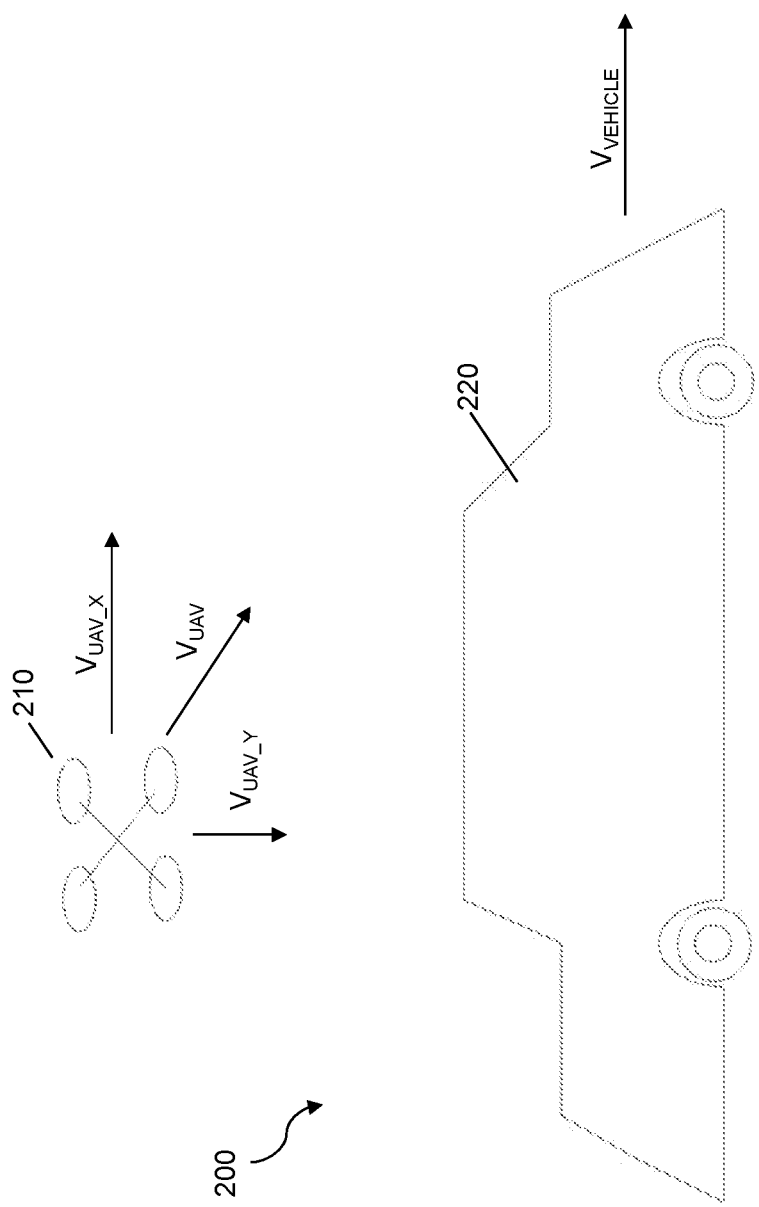
FIG. 2 shows an example of a UAV that may land on a vehicle, in accordance with an embodiment of the invention.

FIG. 2 shows an example of a UAV that may land on a vehicle, in accordance with an embodiment of the invention. A vehicle docking system 200 may be provided in accordance with an embodiment of the invention. The docking system may include a UAV 210 and a vehicle 220.

The UAV 210 may be in flight and separated from a vehicle 220. The UAV may be capable of landing on an associated docking vehicle. The UAV may dock with the vehicle upon landing. Once landed, the UAV may be carried by the vehicle.

The vehicle 220 may be moving at a velocity $V_{VEHICLE}$. This may include a forward motion of the vehicle and/or backward motion of the vehicle. This may or may not include an upward or downward motion of the vehicle. The vehicle may be capable of traversing in a straight line and/or making turns. The vehicle may or may not be capable of moving sideways without altering the orientation of the vehicle. The vehicle may be moving at any velocity. In some instances, $V_{VEHICLE}$ may be greater than zero. In other instances, $V_{VEHICLE}$ may be zero. The velocity and/or direction of motion of the vehicle may change. $V_{VEHICLE}$ may refer to a lateral velocity of the vehicle. When a vehicle is traveling over a surface, such as land or water, the vehicle may travel at a lateral velocity relative to the surface.

The UAV 210 that may be attempting to land on the vehicle may be traveling a velocity $V_{UAV}$. In some instances, $V_{UAV}$ may have a lateral component $V_{UAV\_X}$ and a vertical component $V_{UAV\_Y}$. In some instances, the lateral component of the UAV velocity $V_{UAV\_X}$ may be parallel to a lateral component of the velocity of the vehicle $V_{VEHICLE}$. Thus, while the UAV is landing on a vehicle, it may follow a similar lateral path to the vehicle. It may travel in substantially the same direction as the vehicle. In some instances, the difference in direction between the UAV and the vehicle may be less than or equal to about 0 degrees, 1 degree, 2 degrees, 3 degrees, 4 degrees, 5 degrees, 7 degrees, 10 degrees, 12 degrees, 15 degrees, or 20 degrees when the UAV is close to landing on the vehicle. The UAV may also travel at roughly the same lateral speed as the vehicle. In some instances, the difference in lateral speed between the UAV and the vehicle may be less than or equal to about 0 mph, 1 mph, 2 mph, 3 mph, 5 mph, 7 mph, 10 mph, 12 mph, 15 mph, or 20 mph while the UAV is close to landing on the vehicle. When bringing the UAV to land on the vehicle, the UAV may be brought to a predetermined lateral velocity range relative to the vehicle. The predetermined range may be any of the values described herein. The predetermined range may permit couple of the UAV with the vehicle without damaging the UAV and/or the vehicle. The difference in lateral speed between the UAV and the vehicle may be less than or equal to about 0%, 1%, 2%, 3%, 4%, 5%, 6%, 7%, 8%, 9%, 10%, 12% or 15% of the vehicle speed while the UAV is close to landing on the vehicle. In some instances, the UAV may be close to landing on the vehicle if it is on track to land within less than or equal to 60 seconds, 45 seconds, 30 seconds, 25 seconds, 20 seconds, 15 seconds, 10 seconds, 5 seconds, 3 seconds, 2 seconds, or 1 second.

In some embodiments, the lateral velocity of the vehicle may be determined. A target lateral velocity may be calculated for the UAV that may fall within the predetermined range. The target lateral velocity may be calculated on board the UAV or on board the vehicle. One or more propulsion units of the UAV may be controlled to cause the UAV to fly at the target velocity and/or within the predetermined range.

The vertical component of the UAV velocity $V_{UAV\_Y}$ may include a descent of the UAV to land on a top surface of the vehicle. In some instances, the UAV may be descending from a higher altitude to land on the vehicle. In alternate embodiments, the UAV may come up to the vehicle landing spot from the same altitude and/or from a lower altitude. For example, the UAV may fly behind the vehicle at about the same altitude, and then increase its lateral velocity to be greater than the lateral velocity of the vehicle. Then the UAV may swoop in from the back to land on the vehicle. The vertical component may have a value of zero, or may have a positive or negative value. In some instances, the vertical component of the UAV velocity may be low to permit the UAV to land gently on the vehicle. In some embodiments, the vertical component may be less than or equal to 10 mph, 9 mph, 8 mph, 7 mph, 6 mph, 5 mph, 4 mph, 3 mph, 2 mph, or 1 mph in the positive or negative direction, when the UAV is close to landing on the vehicle.

A method to land a UAV on the vehicle may be provided in accordance with an embodiment of the invention. A command signal may be generated to drive one or more propulsion units of the UAV, thereby controlling the positioning of the UAV relative to the vehicle. The vehicle may be in operation and/or in motion while the UAV is landing. The UAV may be moving along a travel trajectory in line with the companion moving vehicle. The command signal that drives the one or more propulsion units may be generated on-board the UAV. Alternatively, the command signal may be generated on-board the vehicle. In another example, the command signal may be generated at any other device, such as an external computer or server.

The command signal may be generated in response to data about the motion of the vehicle and/or the UAV. For example, information about the position and/or velocity of the vehicle may be provided. Information about the direction of travel of the vehicle may be provided. Information about the position, orientation and/or velocity of the UAV may be provided. In some instances, the command signal may be generated based on this data with aid of one or more processors. In one example, the command signal may be generated on-board the UAV. The UAV may receive information pertaining to the position, velocity, and/or direction of the vehicle. The UAV may use the vehicle information along with UAV position/orientation/velocity information to generate the command signal. In another example, the command signal may be generated on-board the vehicle. The vehicle may receive information pertaining to the position, orientation, and/or velocity of the UAV. The vehicle may use the UAV information along with the vehicle information to generate the command signal, which may be sent to the UAV. In an additional example an external device may receive information pertaining to the vehicle and the UAV and may generate the command signal, which may be transmitted to the UAV. The processors used to generate the command signal may be provided on board the UAV, on board the vehicle, or on board an external device. The command signal may be generated in response to a command to the UAV to initiate the landing sequence. The command may be provided from the vehicle. In some instances, the command to land may be generated on board the UAV when an error state is detected. For example, if one or more components are malfunctioning, or a battery charge is getting dangerously low, the UAV may automatically initiate a landing sequence.

In one example, a vehicle may transmit its coordinates to the UAV in real time. The vehicle may have a location unit that may aid in determining a location of the vehicle. In one example, the location unit may utilize GPS. The vehicle may transmit its GPS coordinates to the UAV. When the UAV wants to land it may fly near the vehicle's GPS coordinates. In some instances, there may be some error to the GPS coordinates so additional aids may be provided for landing the UAV on the vehicle. For example, a marker may be provided as described in greater detail elsewhere herein. The marker may be a vision based marker which will utilize a camera on board the UAV to provide more accurate positioning. The marker may be any other type of marker as described elsewhere herein.

The UAV may be capable of landing on the vehicle while the vehicle is in motion. The UAV may be capable of landing on the vehicle even if the vehicle is not in traveling in a straight line. For example, the UAV may be capable of landing on the vehicle even if the vehicle is making a sharp turn or moving along a wiggly path. The UAV may be capable of landing on the vehicle while the vehicle is turning about at least 5 degrees, 10 degrees, 15 degrees, 20 degrees, 30 degrees, 45 degrees, 60 degrees, 75 degrees, 90 degrees, 105 degrees, 120 degrees, 135 degrees, 150 degrees, 165 degrees, 180 degrees, 270 degrees, or 360 degrees.

The UAV may be capable of landing on the vehicle when the vehicle is traveling at a variety of speeds. In some instances, the UAV may be capable of landing on a vehicle when it is traveling at a speed that is greater than about 5 mph, 10 mph, 15 mph, 20 mph, 25 mph, 30 mph, 35 mph, 40 mph, 45 mph, 50 mph, 55 mph, 60 mph, 65 mph, 70 mph, 80 mph, 90 mph, or 100 mph. The UAV may be capable of landing on the vehicle when it is traveling at less than any of the speeds mentioned herein. The UAV may be capable of landing on a vehicle when it is traveling at a speed within a range between any two of the speeds mentioned herein.

The UAV may land on the vehicle and may dock with the vehicle. The UAV may dock with the vehicle by forming a connection with the vehicle. The connection may include a mechanical connection. The connection may be sufficiently strong to prevent the UAV from falling off the vehicle while the vehicle is in motion. For example, the connection may be sufficiently strong so that the UAV may remain on the vehicle while the vehicle is traveling at less than or equal to about 5 mph, 10 mph, 15 mph, 20 mph, 25 mph, 30 mph, 35 mph, 40 mph, 45 mph, 50 mph, 55 mph, 60 mph, 65 mph, 70 mph, 80 mph, 90 mph, or 100 mph. The connection may be sufficiently strong to keep the UAV docked with the vehicle while the vehicle is graveling at speeds greater than any of the speeds mentioned herein, or when the vehicle is traveling at a speed within a range between any two of the speeds mentioned herein.

Figure 3:
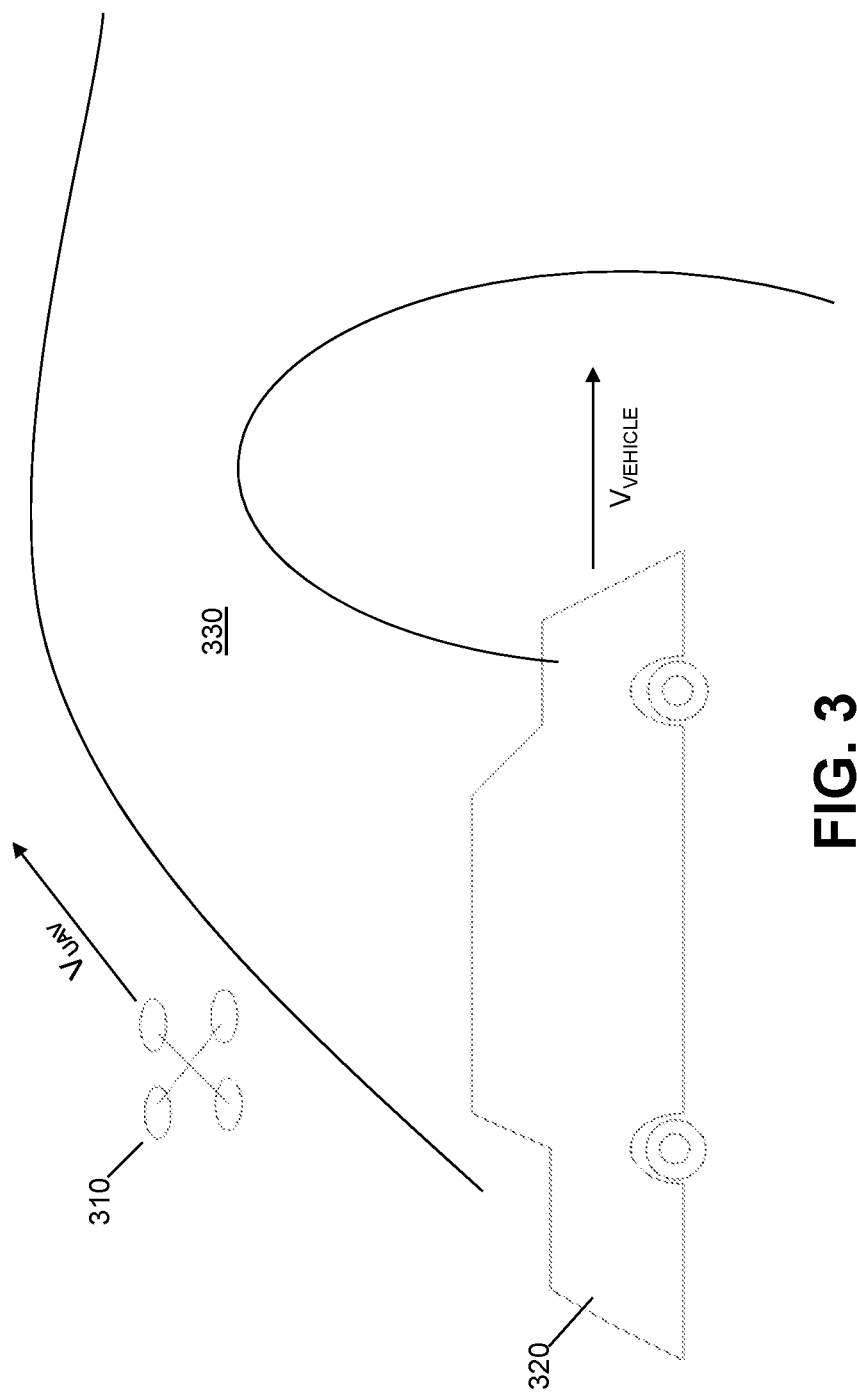
FIG. 3 shows an example of implementing obstacle avoidance when the UAV is trying to land on a vehicle in accordance with an embodiment of the invention.

FIG. 3 shows an example of implementing obstacle avoidance when the UAV is trying to land on a vehicle in accordance with an embodiment of the invention. For example, a UAV 310 may attempt to land on a vehicle 320. An obstruction 330 may be provided in the flight trajectory of the UAV to land on the vehicle. The UAV may alter its flight trajectory to avoid the obstruction.

In one example, the UAV 310 may be attempting to land on a vehicle 320. The vehicle may be in operation. In some instances, the vehicle may be moving while the UAV is attempting to land on the vehicle. The vehicle may be moving at a velocity $V_{VEHICLE}$. The UAV may have a flight path or flight trajectory to land on the vehicle. The flight path or flight trajectory of the UAV may or may not be in line with a path or trajectory of the vehicle. For example, the UAV and the vehicle trajectories may align. The UAV and/or the vehicle may be able to sense if there is an obstruction 330 in the UAV's path. If an obstruction is provided in the UAV's flight path or flight trajectory to land on the vehicle, the UAV path may be altered to avoid the obstruction. For example, the UAV may be descending to land on the vehicle. However, if an obstruction is in the way, the UAV altitude may be increased to avoid the obstruction. The UAV may have a new flight trajectory (e.g., along $V_{UAV}$) to avoid the obstruction.

In some embodiments, the UAV and/or vehicle may be able to sense an obstruction in the vehicle's trajectory, or an aligned travel trajectory for the UAV and vehicle. Similarly, the UAV path may be altered to avoid a detected obstruction.

A path or trajectory may have any shape. In some instances, a path or trajectory may be a straight line (e.g., a straight line extending directly in front of the UAV and/or vehicle) or may be a curved line, or have any other shape.

An obstruction 330 may be any item that may be in the UAV's predicted flight trajectory or path. The obstruction may be an item that would damage the UAV if the UAV were to collide with the obstruction. The obstruction may be a static obstruction or a dynamic obstruction. For example, the static obstruction may remain stationary, while a dynamic obstruction may be moving. Examples of static obstructions may include, but are not limited to, buildings, signs, poles, bridges, tunnels, towers, ceilings, roofs, power lines, trees, fences, plants, lights, parked vehicles, or any other type of obstruction. Examples of static obstructions may include, but are not limited to, other UAVs, other movable objects (e.g., moving vehicles), humans, animals, kites, or any other type of obstruction that may move. For dynamic obstructions, the predicted path or trajectory of the dynamic obstruction may be assessed to determine whether a collision between the dynamic obstruction and the UAV along the UAV's predicted flight trajectory or path is likely or imminent.

The obstruction may be sensed by the UAV, the vehicle, any other object, or any combination thereof. The UAV, vehicle, and/or any other object may be in communication with one another and may be able to share information about detected obstructions. For example, one or more sensors of a UAV may be used to detect an obstruction. The UAV may then alter the UAV's course to avoid the obstruction. In another example, the vehicle may use one or more sensors of the vehicle to detect the obstruction. The vehicle may send information to the UAV which may cause the UAV to alter the UAV's course to avoid the obstruction. The vehicle may send a command to the UAV to alter the UAV's course. In another example, the vehicle may send information to the UAV about the detected obstruction and the UAV may make the determination whether to alter the UAV's course and/or how to alter the course. The UAV may consider information from the vehicle alone or in combination with sensed information from the UAV or any other object. In some instances, other objects, such as the obstruction itself, may provide one or more signals indicative of the presence of the obstruction.

Examples of sensors that may be used to detect an obstruction may include vision sensors, heat sensors, ultrasonic sensors, lidar, GPS, sonar, radar, vibration sensors, magnetic sensors, or any other type of sensors as described elsewhere herein. Any combination of sensors may be used. Examples of signals indicative of the presence of the obstructions may include lights, colors, images, words, sounds, vibrations, magnetic signals, electric fields, heat patterns, wireless signals, or any other types of signals.

In some implementations, the obstruction may be detected based on information known about the environment within which the vehicle and/or the UAV are traversing. For example, geographic information may be accessed. Examples of geographic information may include local map information. In some instances, topographic map information may be provided, or map information about local structures, or other types of objects that may be static obstructions. For example, if the presence of a tunnel is known and the location of the vehicle and/or UAV relative to the tunnel is known, it may be determined whether the tunnel would be an obstruction to the UAV landing on the vehicle.

A method of landing a UAV onto a companion moving vehicle may include generating a command signal to drive one or more propulsion units of the UAV, thereby controlling positioning of the UAV relative to the moving vehicle. The UAV may be moving along a travel trajectory in line with the companion moving vehicle. An obstruction along the travel trajectory may be detected. The UAV's travel trajectory may be altered to avoid the obstruction.

The UAV travel trajectory may be altered in accordance with a set of pre-programmed instructions. For example, a new travel trajectory may be calculated that may alter the UAV travel trajectory enough to avoid the obstruction, but keep the UAV traveling in a similar direction to the motion of the vehicle. In one example, the altitude of the UAV may be altered to avoid the obstruction while the lateral trajectory and/or velocity may be kept substantially the same to be in line with the motion of the vehicle. In other instances, it may be necessary to alter the lateral trajectory of the UAV to avoid the obstacle. The trajectory may be altered to provide little disruption to the flight of the UAV while still avoiding the obstacle. Once the obstacle has been cleared, the UAV may be brought to land on the vehicle. For example, if a UAV's altitude is increased to avoid a tunnel, the UAV may be brought to land on the vehicle once the vehicle and UAV have cleared the tunnel.

When a landing sequence is initiated between the UAV and the vehicle, the UAV may automatically land without requiring human control. For example, a user may select an option for the UAV to land. An automated landing sequence may occur. The UAV may be capable of landing autonomously on the vehicle. The obstacle avoidance may also autonomously occur. In some instances, a user may control the UAV while the UAV is landing on the vehicle. For example, the user may manually control the UAV while the UAV is landing with aid of a remote controller. The user may be an operator of a vehicle, a passenger of the vehicle, or any other individual. The user may manually control the UAV to perform obstacle avoidance and/or autonomous controls may take over to perform obstacle avoidance.

Figure 4:
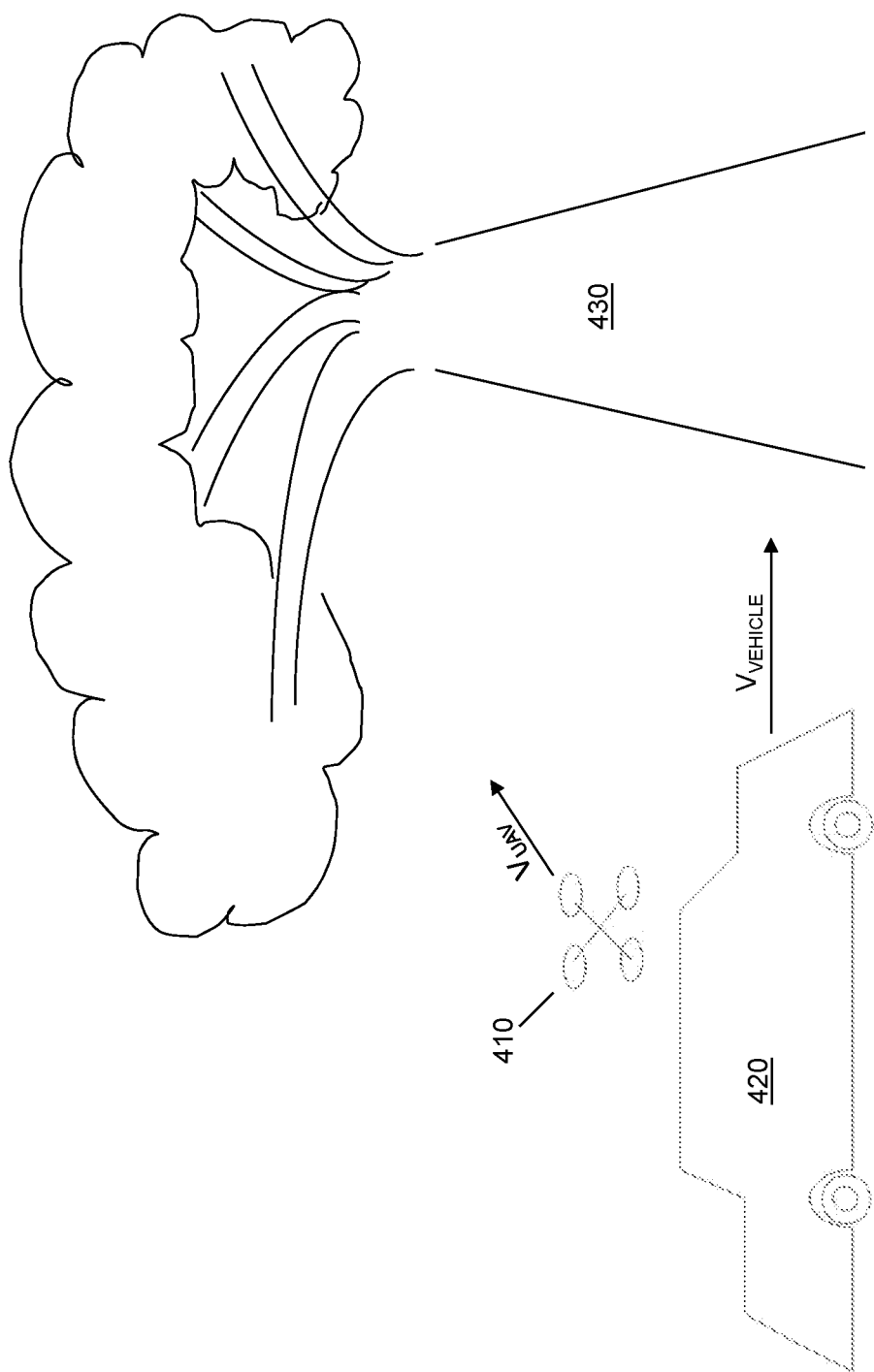
FIG. 4 shows an example of implementing obstacle avoidance when the UAV is trying to take off from a vehicle in accordance with an embodiment of the invention.

FIG. 4 shows an example of implementing obstacle avoidance when the UAV is trying to take off from a vehicle in accordance with an embodiment of the invention. For example, a UAV 410 may attempt to take off from a vehicle 420. An obstruction 430 may be provided in the flight trajectory of the UAV to take off from the vehicle. The UAV may delay taking off until the obstruction is cleared, or may alter its flight trajectory to avoid the obstruction.

In one example, the UAV 410 may be attempting to take off from a vehicle 420. The vehicle may be in operation. In some instances, the vehicle may be moving while the UAV is attempting to take off from the vehicle. The vehicle may be moving at a velocity $V_{VEHICLE}$. The UAV may have a flight path or flight trajectory to take off from the vehicle. The UAV and/or the vehicle may be able to sense if there is an obstruction 430 in the UAV's path. If an obstruction is provided in the UAV's flight path or flight trajectory to take off from the vehicle, the UAV may wait to take off until the obstruction has been cleared. In another example, the UAV may have already taken off or about to take off, and the UAV path may be altered to avoid the obstruction. For example, the UAV may be ascending to take off from the vehicle. However, if an obstruction is in the way, the UAV altitude may be increased faster, may be maintained, or may be decreased to avoid the obstruction. If the UAV had not yet taken off, the UAV may remain on the vehicle. If the UAV had taken off, the UAV may be brought back down to land on the vehicle until the obstruction is cleared. The UAV may have a new flight trajectory (e.g., along $V_{UAV}$) to avoid the obstruction.

An obstruction 430 may be any item that may be in the UAV's predicted flight trajectory or path. The obstruction may be an item that would damage the UAV if the UAV were to collide with the obstruction. As previously described, an obstruction may be a static obstruction or a dynamic obstruction. For example, the static obstruction may remain stationary, while a dynamic obstruction may be moving. For dynamic obstructions, the predicted path or trajectory of the dynamic obstruction may be assessed to determine whether a collision between the dynamic obstruction and the UAV along the UAV's predicted flight trajectory or path is likely or imminent. The motion of the vehicle may be taken into account. For example, if the UAV is riding on a vehicle, the trajectory of the UAV when taking off may take the motion of the vehicle into account for determining UAV flight trajectory.

The obstruction may be sensed by the UAV, the vehicle, any other object, or any combination thereof. The UAV, vehicle, and/or any other object may be in communication with one another and may be able to share information about detected obstructions. For example, one or more sensors of a UAV may be used to detect an obstruction. The UAV may then alter the UAV's course, or wait to take off to avoid the obstruction. In another example, the vehicle may use one or more sensors of the vehicle to detect the obstruction. The vehicle may send information to the UAV which may cause the UAV to alter the UAV's course or wait to take off to avoid the obstruction. The vehicle may send a command to the UAV to alter the UAV's course or wait to take off. In another example, the vehicle may send information to the UAV about the detected obstruction and the UAV may make the determination whether to alter the UAV's course and/or how to alter the course, or whether to wait to take off. The UAV may consider information from the vehicle alone or in combination with sensed information from the UAV or any other object. In some instances, other objects, such as the obstruction itself, may provide one or more signals indicative of the presence of the obstruction.

In some implementations, the obstruction may be detected based on information known about the environment within which the vehicle and/or the UAV are traversing. For example, geographic information may be accessed. Examples of geographic information may include local map information. In some instances, topographic map information may be provided, or map information about local structures, or other types of objects that may be static obstructions. For example, if the presence of a tunnel is known and the location of the vehicle and/or UAV relative to a large tree is known, it may be determined whether the tree would be an obstruction to the UAV taking off from the vehicle.

A method of having a UAV take off from a companion moving vehicle may include generating a command signal to drive one or more propulsion units of the UAV, thereby controlling positioning of the UAV relative to the moving vehicle. The UAV may be moving along a travel trajectory in line with the companion moving vehicle. The UAV may have a projected travel trajectory to take off from the moving vehicle. An obstruction along the travel trajectory may be detected. The UAV's travel trajectory may be altered to avoid the obstruction, the UAV may remain on a vehicle, or the UAV may land back on a vehicle. Altering the UAV's travel trajectory may include having the UAV remain on the vehicle and/or land back on the vehicle.

The UAV travel trajectory may be altered in accordance with a set of pre-programmed instructions. For example, a new travel trajectory may be calculated that may alter the UAV travel trajectory enough to avoid the obstruction, accommodating for the UAV traveling in the same direction to the motion of the vehicle while the UAV is still riding on the vehicle. In one example, the altitude of the UAV may be altered to avoid the obstruction while the lateral trajectory and/or velocity may be kept substantially the same to be in line with the motion of the vehicle. In other instances, the lateral trajectory of the UAV may be altered to avoid the obstacle. The trajectory may be altered to provide little disruption to the flight of the UAV while still avoiding the obstacle. Once the obstacle has been cleared, the UAV take off and/or fly freely in response to pre-programmed instructions or controls from a user. For example, if a UAV's altitude is decreased to avoid a tree, the UAV altitude may be increased once the tree has been passed, and the UAV may be able to fly onward to perform its mission.

When a take-off sequence is initiated between the UAV and the vehicle, the UAV may automatically take off without requiring human control. For example, a user may select an option for a UAV to take off. An automated take-off sequence may occur. The UAV may be capable of taking off autonomously from the vehicle. The obstacle avoidance may also autonomously occur. In some instances, a user may control the UAV while the UAV is taking off from the vehicle. For example, the user may manually control the UAV while the UAV is taking off aid of a remote controller. The user may be an operator of a vehicle, a passenger of the vehicle, or any other individual. The user may manually control the UAV to perform obstacle avoidance and/or autonomous controls may take over to perform obstacle avoidance.

Obstacle avoidance may occur while the UAV is in flight. Obstacle avoidance may occur while the UAV takes off from a vehicle, while the UAV lands on a vehicle, and at any point in between while the UAV is in flight. For example, a UAV may be flying along a flight path relative to the vehicle. The UAV may be flying along a flight path in direct response to manual remote commands from a user. The UAV may be flying along a flight path relative to a vehicle in accordance with a predetermined flight path.

A projected flight path of a UAV may be determined. The projected flight path may include a flight path for the UAV to land on the vehicle, or to take off from the vehicle as previously described. The projected flight path may include a flight path for the UAV to travel relative to the vehicle, such as those described elsewhere herein. The projected flight path may be for the UAV to travel directly ahead of the vehicle. The projected flight path may be for the UAV to travel a predetermined distance ahead of the vehicle. The projected flight path may include a flight path for the UAV to travel within a predetermined range of the vehicle. When an obstruction is detected in the UAV's flight path, the UAV's flight path may be altered in response. The UAV's altitude and/or latitude may be altered to avoid the obstruction. A processor on board the UAV may determine the direction and/or speed for the UAV to fly to avoid the obstruction. Once the obstruction has been cleared, the UAV flight path may be brought back into the projected UAV flight path or travel trajectory.

Figure 5:
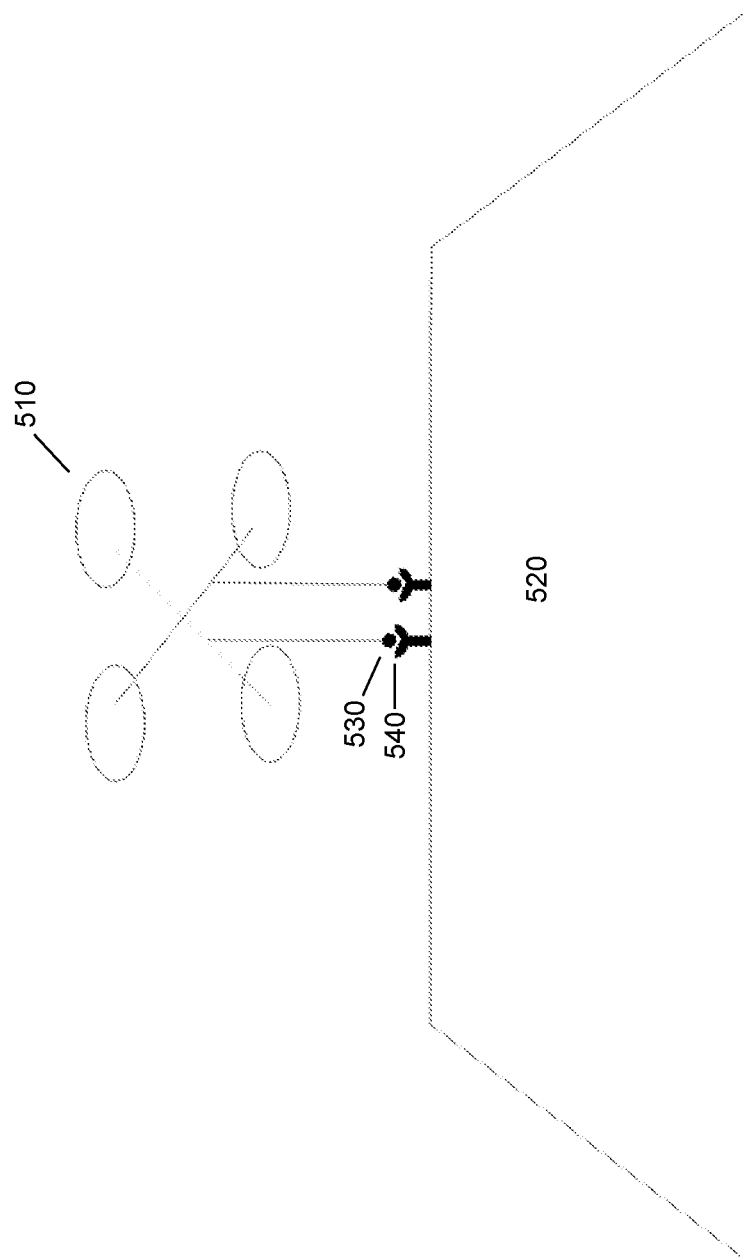
FIG. 5 shows an example of a mechanical connection between a UAV and a vehicle in accordance with an embodiment of the invention.

FIG. 5 shows an example of a mechanical connection between a UAV and a vehicle in accordance with an embodiment of the invention. A UAV 510 may be docked with a vehicle 520. A connection may be formed with a docking component of the UAV 530 and a docking component of the vehicle 540.

The UAV 510 may be docked to a companion vehicle 520. The companion vehicle may be a vehicle of any type. The companion vehicle may be capable of motion. The companion vehicle may be self-propelled. In some instances, the companion vehicle may be capable of traversing one or more type of media (e.g., land, water, air, space). The UAV may be docked to the companion vehicle while the companion vehicle is powered on or powered off. The UAV may be docked to the companion vehicle while the companion vehicle is in operation. The UAV may be docked to the companion vehicle while the companion vehicle is stationary or is in motion. The UAV may be capable of remaining docked to the companion vehicle while the companion vehicle is traveling at any of the speeds mentioned elsewhere herein. The UAV may be capable of remaining docked to the companion vehicle while the companion vehicle is traveling in a straight line, making turns, or rotating about any degree, such as any degree measurements described elsewhere herein. The UAV may be capable of remaining docked to the vehicle while experiencing windy conditions. For example, the UAV may be capable of remaining docked to the vehicle when the wind speeds reach any of the speeds mentioned elsewhere herein (e.g., about 5 mph, 10 mph, 15 mph, 20 mph, 25 mph, 30 mph, 35 mph, 40 mph, 45 mph, 50 mph, 55 mph, 60 mph, 65 mph, 70 mph, 80 mph, 90 mph, or 100 mph).

The UAV 510 may be docked with the companion vehicle 520 on any portion of the companion vehicle. For example, the UAV may dock with the companion vehicle on a top surface of the vehicle, front surface of the vehicle, rear surface of the vehicle, side surface of the vehicle, interior portion of the vehicle, or an attachment to the vehicle. The UAV may dock with the vehicle on a roof of the vehicle, on or in the interior cabin of the vehicle, on or in the trunk of the vehicle, or on or in the front hood of the vehicle. The UAV may dock with a carriage pulled by the vehicle, or a sidecar type attachment to the vehicle. The UAV may be docked to an interior portion of the vehicle or an exterior surface of the vehicle.

The UAV 510 may form a connection with the companion vehicle 520 while the UAV is docked to the companion vehicle. The connection may be a mechanical connection. The mechanical connection may be capable of keeping the UAV affixed to the vehicle as described elsewhere herein, while the vehicle is in motion. The mechanical connection may limit the movement of the UAV about one or more directions. For example, the mechanical connection may prevent the UAV from moving front to back, side to side, and/or up and down relative to the vehicle. The mechanical connection may alternatively only permit a limited range of movement about one or more of the directions described. The mechanical connection may permit the UAV from rotating about one or more axes while docked to the vehicle. Alternatively, the mechanical connection may permit the UAV to move about one or more axes in a limited fashion.

A mechanical connection may be formed between a portion of the UAV 530 and a portion of a docking station of the vehicle 540. The portion of the UAV that may form the connection may be on a lower surface of the UAV. In some examples, the portion of the UAV that may form the connection may be an extension, such as a landing stand of the UAV. The landing stand may be configured to bear the weight of the UAV while the UAV is not airborne. In some instances, the portion of the UAV that may form the connection may be a surface of a housing of the UAV, such as a bottom surface, side surface, or top surface of the UAV. In some instances, the housing itself may be a portion that may form the connection. In other instances, protrusions, indentations, or any other portion of the UAV may be used to form the connection. The UAV may include a portion that may move (e.g., extend out, retract in) relative to the UAV to form the connection. In one example, a connection member of the UAV may be in a retracted state while the UAV is in flight, but may extend out when the UAV is docking with the docking station of the vehicle to form the connection.

A connection component of a vehicle 540 may form a mechanical connection with the UAV component 530. The components may come into direct physical contact with one another. The connection component of the vehicle may protrude from the vehicle, be indented into the vehicle, or be part of the vehicle surface. In some instances, the connection components of the vehicle may be retractable and/or extendible. For example, they may be in a retracted state while the UAV is separated from the vehicle, and may extend out to receive the UAV when the UAV is docking with the vehicle.

In some instances, components of the UAV and the vehicle may interlock. In one instances, a portion of a UAV component may grip or surround another portion of the vehicle to form the connection, or vice versa. In some instances, a claw or covering may come from the vehicle to capture the UAV, or a claw or covering may come from the UAV to capture a portion of the vehicle. In some examples, a mechanical grip may be provided between one or more of the connecting components. The mechanical grip may prevent the UAV from moving relative to the vehicle about any of the directions described. In other embodiments, straps, hook and loop fasteners, twisting fasteners, slide and lock components, or grips may be used. Optionally, plugs, or male/female component interfaces may be used to keep the UAV connected to the vehicle.

In one example, a dock design for the vehicle may include a Y-shaped inverted cavity as a connection component 540 of the vehicle. The y-shaped inverted cavity may tolerate errors and enable easy aircraft landing. In some instances, the Y-shaped inverted cavity may help funnel the connection component 530 of the UAV to a central or bottom region of the cavity. The Y-shaped inverted cavity may have an inverted conical shape on top, or any other type of shape on top. The connection component of the vehicle may include guides that may help the UAV be directed to a desired connection spot. Gravity may aid the guides in directing the UAV. In one example, when a UAV hits a guide, and the rotors are powered down so that the weight of the UAV is resting on the guide, the guide, may cause the UAV to slide down to a desired resting point. The UAV may then be secured and/or locked to the vehicle. Structures may be provided to secure and lock the UAV to the vehicle.

In some instances, magnetic force may be used to provide the connection. In some instances, a magnetic connection may be formed between the UAV component and the vehicle component. In some instances, the magnetic connection may be used without additional mechanical support (such as the gripping features or other features described elsewhere herein) to keep the UAV connected to the vehicle. In other instances, the magnetic connection may be used in combination with the mechanical support, such as features described elsewhere herein, to keep the UAV docked to the vehicle.

A connection may be automatically formed between the UAV and the vehicle when the UAV lands on the vehicle. Coupling may occur between the UAV and the vehicle without intervention of an operator of the vehicle. The coupling may occur without any intervention of any live being within or outside the vehicle.

A UAV may dock with a docking station of the vehicle. The docking station may be any part of the vehicle that may connect with the UAV. The docking station may offer a mechanical connection with the UAV. The docking station may be integral to the vehicle. The docking station may not be removed and/or separated from the vehicle. For example, the docking station may include a portion of a surface of a vehicle. Optionally, a docking station may include a portion of a body panel of a vehicle. In some instances, the docking station may include a roof of the vehicle. The docking station may include one or more connectors that may connect to the UAV. The docking station may include one or more electrical connectors that may connect to the UAV. The docking station may include a cover that may at least partially cover a UAV.

The docking station may be built into the vehicle. The docking station may be added to the vehicle at the manufacturing site. The docking station may be manufactured with the rest of the vehicle. In some embodiments, an existing vehicle may be retrofitted with the docking station. The docking station may be permanently affixed and/or attached to the vehicle. One or more components of the docking station may be affixed and/or attached to the vehicle and may not be designed to be removable.

In some alternate embodiments, the docking station may be separable from the vehicle. The docking station may be added or attached to the vehicle in a removable manner. In some instances, one or more connectors may keep the docking station on the vehicle. The connectors may be removed to remove the docking station from the vehicle. In some examples, clips, ties, clamps, hook and loop fasteners, magnetic components, locking features, grooves, threads, mechanical fasteners, press-fits, or any other features may be used to attach the docking station to the vehicle. The docking station may be removed from the vehicle when not in use. In some instances, a user may wish to drive the user's vehicle, and only use the docking station in moments when a companion UAV is being taken along.

The docking station may be attached to any portion of the vehicle as described elsewhere herein. The docking station may be attached to the vehicle's roof. The docking station may be attached and/or removed from the vehicle's roof. Alternatively, the docking station may form the roof of the vehicle and/or include the roof of the vehicle. The docking station may include a roof mount. The roof mount may be configured to permit a UAV to land thereon. The roof mount may permit a UAV to take off therefrom.

Any description herein relating to any portion of the vehicle relating to the UAV may be provided on a docking station of the vehicle. This may apply to permanently attached or removable docking stations. For example, a mechanical connector between the UAV and the vehicle may be provided on a docking station. An electrical connector between the UAV and the vehicle may be provided on the docking station. A data connector between the UAV and the vehicle may be provided on the docking station. A controller that may perform a calculation relating to the UAV and/or vehicle may be provided on the docking station. A marker that may help guide a UAV and/or differentiate the vehicle from other vehicles may be provided on the docking station. A communication unit, such as a wireless communication unit that may communicate with the UAV may be provided on a docking station of the vehicle. A cover that may cover the UAV may be provided on the docking station of the UAV.

Any description herein of components or functions of the vehicle may apply to a docking station of the vehicle.

Alternatively, any description relating to any portion of the vehicle relating to the UAV may be provided on another part of the vehicle that need not be the docking station of the vehicle.

A vehicle may be capable of having a single UAV land on the vehicle. Alternatively, the vehicle may be capable of having multiple UAVs land on the vehicle. Multiple UAVs may be capable of simultaneously docking to the vehicle. In some instances, a single docking station may permit multiple UAVs to dock with the vehicle in parallel. In other instances, multiple docking stations may be provided on a vehicle that may permit multiple UAVs to dock with the vehicle. The multiple UAVs may all form mechanical and/or electrical connections with the vehicle when docked with the vehicle. The multiple UAVs may be capable of taking off simultaneously, landing simultaneously, or in a scattered or sequential fashion.

The same type of UAV may be capable of docking with a vehicle. For example, all UAVs (whether one or more many) may have a similar configuration.

In other instances, multiple types of UAVs may be capable of docking with a vehicle. The multiple types of UAVs may dock with the vehicle one-at-a-time, or multiple types of UAVs may be docked with the vehicle simultaneously. The multiple types of UAVs may have different form factors, shapes, and/or dimensions. The multiple types of UAVs may have different flying capabilities and/or battery life. The multiple types of UAVs may have different propulsion unit configurations. The multiple types of UAVs may have the same or different connection interfaces. In some examples, multiple types of UAVs may be able to dock with the same connection interface on the vehicle. In other instances, different types of UAVs may dock with different connection interfaces on the vehicle. In some instances, a connection interface on a vehicle may be adjustable to connect with different connection interfaces on the vehicle. In some instances, a vehicle may be synched with one or more UAVs to know the type of UAVs that may be landing on the vehicle. When a UAV of a particular type approaches the vehicle to land, the vehicle may maintain or adjust the connection interface as needed to permit the UAV to connect to the vehicle. When a different type of UAV approaches the vehicle to land, the vehicle may adjust the connection interface as needed to permit the other type of UAV to connect to the vehicle. The connection adjustment may include altering one or more dimensions or positions of components of the connector. The adjustment may also include swapping out different types of connectors.

In some instances, a vehicle may be capable of accommodating one, two, three, four, five, six, seven, eight, nine, ten or more UAVs landing on the vehicle at a time. The vehicle may accommodate the same types of UAVs or different types of UAVs with different characteristics.

Figure 6:
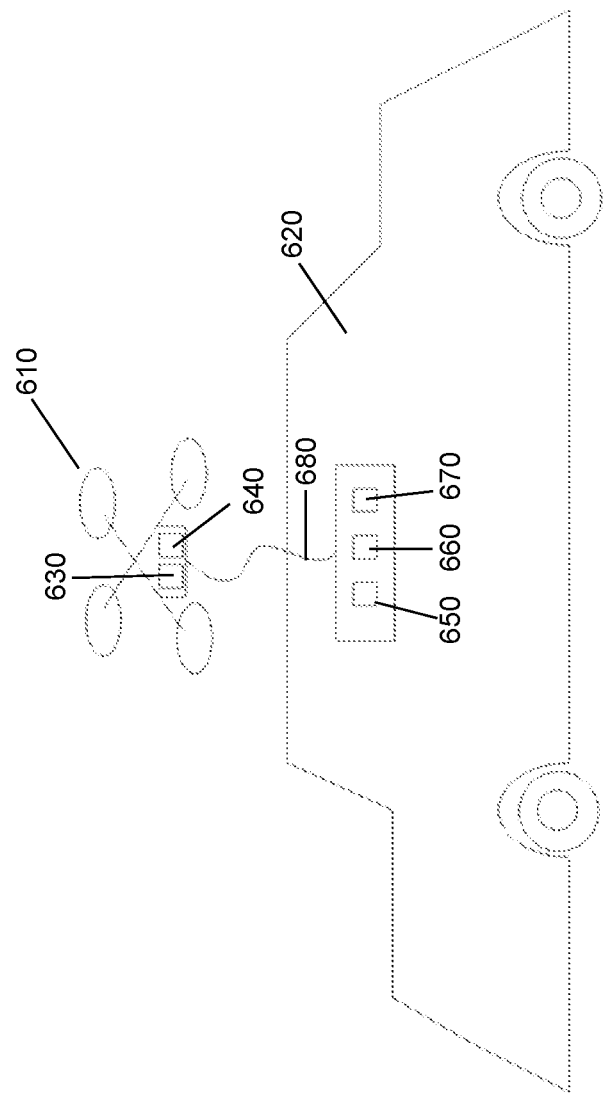
FIG. 6 shows an example of a functional connection between a UAV and a vehicle in accordance with an embodiment of the invention.

FIG. 6 shows an example of a functional connection between a UAV and a vehicle in accordance with an embodiment of the invention. A UAV 610 may be configured to dock with a vehicle 620. The UAV may include one, two, three, four, five, six, seven, eight, nine, ten, or more on-board components 630, 640. The vehicle may include one, two, three, four, five, six, seven, eight, nine, ten or more on-board components 650, 660, 670 configured to interact with the UAV. A connection may be formed 680 between one or more components of the UAV and one or more components of the vehicle.

The UAV 610 may be resting on the vehicle 620 while the UAV is docked with the vehicle. The vehicle may be supporting the weight of the UAV. A mechanical connection may be formed between the UAV and vehicle while the UAV is docked with the vehicle. The vehicle may have a docking station on-board configured to receive the UAV. Alternatively, the UAV may be configured to land anywhere on the vehicle. The docking station may optionally permit an electrical connection 680 to be formed between the UAV and the vehicle. The electrical connection may be a hard-wired connection. In some instances, the electrical connection may be an inductive connection. The electrical connection may be a hard-wired connection. An electrically conductive element of the UAV may come into contact with an electrically conductive element of the vehicle. The connection may be any connection capable of permitting communications between the UAV and the vehicle. In some embodiments, the connection may include an optical connector, wireless connector, wired connector, or any other type of connector. In some instances, multiple connectors and/or types of connectors may be employed between the UAV and the vehicle. The multiple connectors may include multiple types of physical connectors.

For example, a docking station of the vehicle may have one or more components built-in configured to connect with one or more corresponding components of the UAV when the UAV has landed on the docking station. The UAV may need to land on the docking station at a particular orientation or multiple orientations of the UAV may permit the desired docking. In some instances, one or more guide features may be provided on the docking station that may help guide the UAV to a desired orientation. In some instances, the guide features on the docking station may be physical components that may direct the UAV to land in one or more particular orientations. Optionally, the guide features may guide the UAV to a desired orientation for causing the desired mechanical, electrical, and/or communication connections.

The UAV may include one, two, three, four, five, six, seven, eight, nine, ten, or more on-board components 630, 640. Examples of such components may include, but are not limited to an on-board controller, data storage unit, communication unit, energy storage unit, sensors, carrier payload, propulsion units, and/or any other component. Any combination of components described herein may be provided on board the UAV.

The vehicle may include one, two, three, four, five, six, seven, eight, nine, ten or more on-board components 650, 660, 670 configured to interact with the UAV. Examples of such components may include, but are not limited to a controller, data storage unit, communication unit, energy storage unit, sensors, and/or any other component. Any combination of components described herein may be provided on board the vehicle.

In one implementation, the UAV may have an on-board UAV energy storage unit and the vehicle may have an on-board vehicle energy storage unit. An energy storage unit may include one or more batteries. In some instances, the energy storage may be a battery pack. The battery pack may include one or more batteries connected in series, in parallel, or any combination thereof. An energy storage unit of the UAV may power one or more components of the UAV. An energy storage unit of the vehicle may power one or more components of the vehicle. For example, the energy storage unit of the vehicle may also power lights, power door locks, power windows, and/or the radio of the vehicle. In one example, the vehicle energy storage unit may be a vehicle battery. In other instances, the vehicle energy storage unit may be a battery pack on-board the vehicle that is not used to power any other components of the vehicle.

Any energy storage unit may have one or more batteries. Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The battery cells may be connected in series, in parallel, or any combination thereof. The battery cells may be packaged together as a single unit or multiple units. The batteries may be rechargeable batteries.

When a UAV is in flight, the UAV may be discharging the UAV energy storage unit. When the UAV is docked with the vehicle, the UAV may form a connection between the UAV energy storage unit and the vehicle energy storage unit. The vehicle energy storage unit may be used to charge the UAV energy storage unit. In one example, when the UAV lands on the vehicle, a state of charge of the UAV energy storage may be assessed. The vehicle may charge the UAV when the state of charge of the UAV has dropped beneath a threshold value. The vehicle may charge the UAV when the UAV is not fully charged. In other instances, the vehicle may automatically charge the UAV energy storage unit regardless of state of charge of the UAV energy storage units. The vehicle energy storage unit may be charged when the vehicle is in motion. The charging may occur via a physical connection between the UAV and the vehicle. In other instances, inductive charging may be used. Thus, an advantage may be provided by the system where the UAV may be charged while the vehicle is on the go and the UAV may be launched as needed. This may permit a UAV to take off from the vehicle multiple times while the vehicle is traveling.

A UAV may be capable of flying for any length of time on a full charge of the UAV's energy storage unit. For example, the UAV may be capable of greater than or equal to about 10 hours, 9 hours, 8 hours, 7 hours, 6 hours, 5 hours, 4 hours, 3.5 hours, 3 hours, 2.5 hours, 2 hours, 1.5 hours, 1 hour, 55 minutes, 50 minutes, 45 minutes, 40 minutes, 35 minutes, 30 minutes, 25 minutes, 20 minutes, 15 minutes, 10 minutes, 5 minutes, 3 minutes, or 1 minute of continuous flight on a full charge. Alternatively, the UAV may only be capable of flying for less than any of the times mentioned herein. Alternatively, the UAV may be capable of flight in a range of time falling between any two of the values described herein. The flight time may be while the UAV is performing flying functions alone. The flight time may include the UAV transmitting image data or other types of data from a payload or sensors while the UAV is in flight.

The vehicle may be capable of charging the UAV quickly. For example, the UAV may be charged from a fully discharged state to a fully charged station within about 8 hours, 7 hours, 6 hours, 5 hours, 4.5 hours, 4 hours, 3.5 hours, 3 hours, 2.5 hours, 2 hours, 1.5 hours, 1 hour, 45 minutes, 30 minutes, 20 minutes, 15 minutes, 12 minutes, 10 minutes, 8 minutes, 7 minutes, 6 minutes, 5 minutes, 4 minutes, 3 minutes, 2 minutes, 1 minute, 30 seconds, or 10 seconds. Alternatively, the charging may take longer than any of the time values provided herein. The charging may occur within a range of time falling between any two of the values described herein. In some instances, the charging time may be less than the flight time. In other instances, the charging time may be greater or equal to the flight time. The ratio between charging time and flight time may be about 10:1, 8:1, 6:1, 5:1, 4:1, 3:1, 2:1, 1:1, 1:2, 1:3, 1:4, 1:5, 1:6, 1:8, or 1:10.

The vehicle may be capable of charging the UAV with any voltage and/or current input. In some instances, the UAV energy storage unit may receive a charging voltage corresponding to a charging voltage of the vehicle battery. For example, if the vehicle uses a 12 V battery, the UAV energy storage unit may be charged at 12 V. In other examples, about 1 V, 3 V, 5 V, 7 V, 10 V, 12 V, 14 V, 16 V, 18 V, 20 V, 24 V, 30 V, 36 V, 42 V, or 48 V may be employed.

In alternative embodiments, the UAV energy storage unit may be a battery pack that may be removable from the UAV. In some examples, the docking station on the vehicle may have another battery pack that may be swapped out with the battery pack of the UAV. The docking station on the vehicle may have one or more components that may permit automated swapping out of the battery packs without requiring human intervention. A robotic arm or other feature may be used to swap the battery packs.

One or more battery packs may be stored on board the vehicle. The battery packs may be charged while being stored on the vehicle. In some instances, the battery packs for the UAV may be charged by a battery of the vehicle while the vehicle is operational and/or in motion. In some instances, a renewable energy source may be used to charge the battery packs of the UAV. For example, solar power may be employed to charge the battery packs of the UAV. Renewable energy sources as described in greater detail elsewhere herein.

The battery packs may thus be in a fully charged or partially charged state when they are swapped out with a depleted battery of the UAV. In some instances, an assessment may be made of the state of charge of the battery of the UAV when the UAV docks with the vehicle. In some embodiments, depending on the state of charge, the UAV battery may be charged, or the UAV battery may be swapped out for a new one. In some instances, the state of charge of the new batteries may be assessed as well.

The UAV may include a data storage unit. The data storage unit may include one or more memory units that may comprise non-transitory computer readable media comprising code, logic, or instructions to perform one or more actions. The data storage unit may include on-board data useful for flight of the UAV. This may include map information and/or rules pertaining to one or more locations. The data storage unit of the UAV may be updated with new information while the UAV is in flight. The data storage unit of the UAV may be updated continuously, periodically, or in response to an event. In other instances, the data storage unit of the UAV may be updated with new information while the UAV is docked to the vehicle. For example, to conserve energy and/or flight time, new data may not be sent to the UAV while the UAV is in flight unless critical to operation of the UAV, and the UAV may receive regular updates when the UAV is connected to the vehicle. In some instances, a hard-wired transmission of data may occur from a data storage unit of the vehicle to a data storage unit of the UAV. For example, a connection 680 may be provided that may permit data from the vehicle data storage unit to be sent to the vehicle data storage unit. This may permit rapid transfer of data. The vehicle data storage unit may be updated continuously, periodically or in response to an event. The vehicle data storage unit may be updated wirelessly. The vehicle data storage unit may be part of the docking station, or may be integrated into the vehicle.

The data from the data storage unit may be accessed by a controller of the UAV. The controller of the UAV may control aspects of flight of the UAV. When the UAV is in an autonomous flight mode, the controller may control the motions of the UAV by generating command signals that control operation of the propulsion units of the UAV. When the UAV is being manually controlled remotely, the controller may receive the signals from the remote controller and generate command signals to propulsion units of the UAV based on the signals from the remote controller.

In some instances, the UAV may transmit data to the vehicle. For example, data gathered by a payload or sensor of the UAV may be transmitted to the vehicle. In one example, the payload may be an image capturing device, such as a camera, which may transmit image data to the vehicle. The data may be transmitted in real-time. In some instances, all the data may stream to the vehicle in real time. Other instances, a portion of the data, or a lower resolution of data may be streamed to the vehicle in real-time. The rest of the data may be provided to the vehicle when the UAV docks to the vehicle. The connection 680 may permit data from a data storage unit of the UAV to be transferred to a data storage unit of the vehicle.

In some instances, two-way communications may be provided between the UAV and the vehicle. The two-way communications may occur while the UAV is in flight and/or while the UAV is docked to the vehicle. The UAV and the vehicle may each have a communication interface. The communication interface may permit wireless communications between the UAV and the vehicle. In some instances, the communication interface may permit wired communications between the UAV and the vehicle, such as when the UAV and the vehicle are docked. In some instances, multiple types of communication interfaces may be provided for the UAV and/or the vehicle for different types of communications that may occur in different situations.

While a UAV is docked to the vehicle, energy and/or data transfer may occur. The docking of the UAV to the vehicle may permit a physical connection that may permit rapid transport of energy and/or data. The transfer may be unidirectional (e.g., from the vehicle to the UAV, or from the UAV to the vehicle) or bidirectional.

Figure 7:
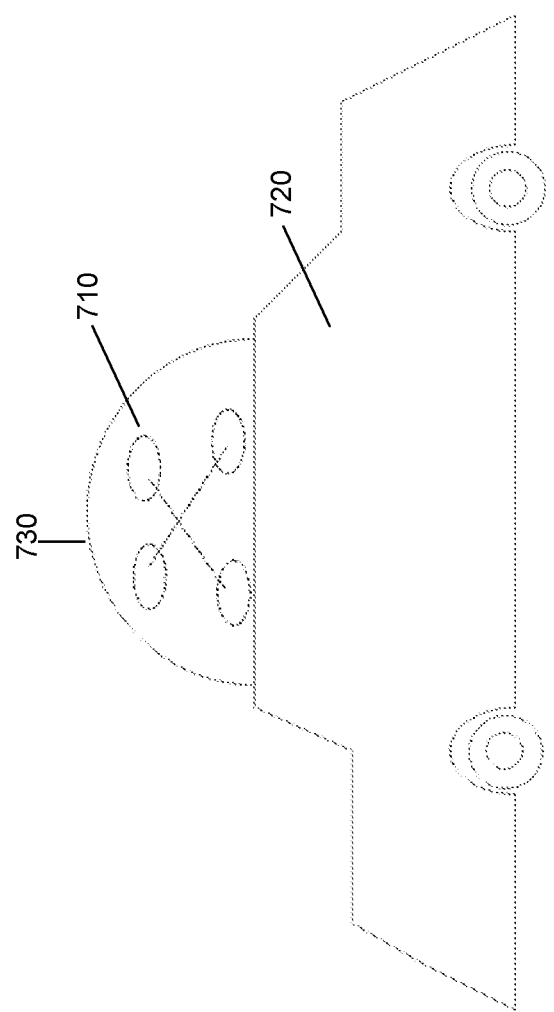
FIG. 7 shows an example of a UAV docked to a vehicle within a cover in accordance with an embodiment of the invention.

FIG. 7 shows an example of a UAV docked to a vehicle within a cover in accordance with an embodiment of the invention. A UAV 710 may be docked to a vehicle 720. The vehicle may have a docking station on-board that may permit the UV to dock to the vehicle. The docking station may include a cover 730. The cover may cover at least a portion of the UAV. The cover may completely or partially enclose the UAV.

The cover 730 may have any shape or dimension. In some instances, the cover may have a rounded pod-like shape. The cover may have a pot lid shape. For example, the cover may be a hemi-sphere or a hemi-ellipsoid. The cover may have no corners, rounded corners or sharp corners. In other instances, the cover may have a cylindrical or semi-cylindrical shape, prismatic shape, semi-buckeyball shape, or any other type of shape. In some instances, the cover may be designed to be aerodynamic. The cover may be designed to provide reduced drag on the vehicle when the vehicle is in motion. The cover may be designed to provide reduced or no lift when the vehicle is in motion. The cover may reduce aerodynamic lift and/or drag on the vehicle compared to the vehicle without the cover. The cover may be designed so that when the vehicle is in motion, a downward force is provided by the cover when the vehicle is in motion. In some instances, the cover may provide a similar effect as a spoiler on the vehicle.

The cover may be sized to cover the UAV entirely. In some instances, the greatest dimension (e.g., length, width, height, diagonal, or diameter) of the cover may be greater than the greatest dimension of the UAV (e.g., respective length, width, height, diagonal, or diameter). The cover may be sized to not exceed the lateral dimensions of the vehicle. The cover may or may not add to the height of the vehicle.

The cover may be formed from a single integral piece. The cover may be formed from multiple pieces that have been permanently attached to one another. In another example, the cover may be formed from multiple pieces that may come apart.

The cover may be powered by a renewable energy source. In some examples, the renewable energy source may be solar power, wind power, or any other type of renewable power. For example, one or more photovoltaic cells and/or panels may be provided on board the vehicle. The photovoltaic units may be provided on the cover itself. Alternatively, it may be provided on any other surface of the vehicle. The photovoltaic units may gather solar energy and translate it to electricity. The electricity may be used to directly power one or more components of the vehicle, such as a docking station of the vehicle. The electricity may be used to power the cover. The cover may open and/or close using the electricity generated by the solar power. The UAV battery may be directly charged using the electricity generated by the solar power. A UAV battery may be on-board the UAV or may be stored by the vehicle and swapped into the UAV. The electricity generated by the photovoltaic cells may be stored in an energy storage unit. The electricity to power one or more components of the vehicle, such as the cover or battery charging may be provided from the energy storage unit.

In another example, the renewable energy may utilize solar thermal. A liquid may be heated using solar power and used to generate electricity that may be used to power one or components of the vehicle. The electricity may be stored in an energy storage device to power one or more components of the vehicle as needed. This may include charging a battery of a UAV (on-board the UAV or to be swapped into the UAV).

Wind power may be used in an additional example. While the vehicle is in motion, it may experience a lot of wind, which may be used to generate electricity. For example, the vehicle may cause one or more blades to spin, which may be used to generate electricity. The electricity may be used to power one or more components of the vehicle. The electricity may be stored in an energy storage device to power one or more components of the vehicle as needed. This may include charging a battery of a UAV (on-board the UAV or to be swapped into the UAV).

The renewable energy power source may be used in combination with other power sources to power one or more components as described herein. The renewable energy source may provide supplemental power to a vehicle power source.

While the UAV is docked to the vehicle, the cover may cover the UAV. Optionally, the cover may completely enclose the UAV. The cover may provide a fluid-tight seal for the vehicle. The seal between the cover and the vehicle may be air tight. This may prevent air from flowing within the cover and increasing drag on the vehicle. This may also help protect the UAV from the elements. When the UAV is protected beneath the cover, the UAV may be protected from wind, rain, and other environmental conditions. The cover may be waterproof. The cover connection with the vehicle may be water-tight so that no water can get into the cover when it is enclosing the UAV. Optionally, the cover may be opaque. The cover may prevent light from entering its interior when it is closed. This may reduce sun damage to the UAV and/or the vehicle. Alternatively, the cover may be transparent and/or translucent. The cover may permit light to enter. The cover may filter the light to permit light of desired wavelengths of light to enter.

In other implementations, the cover may partially enclose the UAV. One or more holes or openings may be provided that may permit air to flow into the interior of the cover. In some instances, the holes or openings may be provided to minimize or reduce drag or aerodynamic lift by the cover and/or UAV.

When the UAV is about to launch from the vehicle, the cover may open. In one example, the cover may open by pivoting about an axis. For example, a hinge or similar configuration may attach the cover to the vehicle or docking station of the vehicle. The cover may pivot about the hinge to open up and expose the UAV to the environment. The UAV may then be capable of taking off. In another example, the cover may have multiple pieces that may come apart. For example, two sides of a pot lid structure may come apart and permit the UAV to fly out there through. The sides may each pivot about a hinge. In another example, rather than pivoting about a single hinge, the cover may include one or portions that may pivot about multiple axes. In one example, the cover may be a directional antenna that may be capable of pivoting about multiple axes, as described in greater detail below. In another example, rather than rotating about a hinge, the cover may be able to translate and/or move laterally and/or vertically. In one example, two portions of a cover may come apart may sliding sideways and exposing a middle interior section, through which the UAV may fly. In other instances, the cover may include one or more pieces that may retract. For example, they may retract into the vehicle roof. In another example, they may telescope or fold over on themselves. The cover may open in any number of ways, which may permit the UAV to take off from the vehicle.

Once the UAV has taken off and is in flight, the cover may optionally close again. This may be to provide desired aerodynamic qualities for the vehicle while the vehicle is in motion. Alternatively, the cover may remain open while the UAV is in flight. In some instances, the position of the cover may be controlled while the UAV is in flight. For example, the position of the cover may be altered to track the position of the UAV.

When the UAV is ready to land and dock with the vehicle, the cover may open, if the cover had been closed during the flight of the UAV. If the cover remained open during the flight of the UAV, the cover may remain open while the UAV is landing. After the UAV has landed and/or docked with the UAV, the cover may be closed.

The cover may be provided on the exterior of the vehicle. The UAV may land on an exterior portion of the vehicle, and the cover may cover the exterior portion of the vehicle.

The cover may optionally function as a directional antenna as described in greater detail elsewhere herein. A bowl-shaped portion of the cover may function as a directional antenna dish. The cover may be movable about one or more axes of rotation, which may permit a directional antenna to move to be pointed at a UAV.

Figure 8:
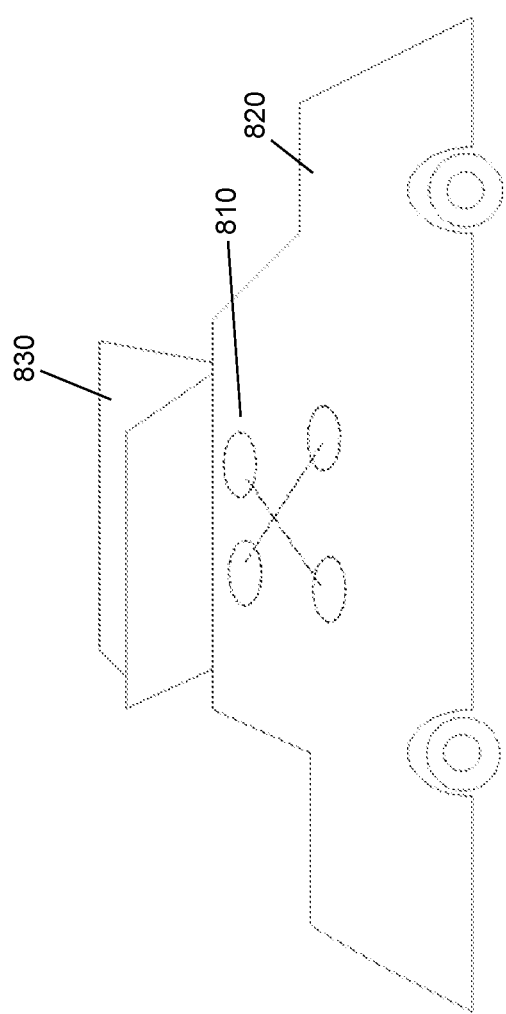
FIG. 8 shows an example of a UAV docked within a vehicle in accordance with an embodiment of the invention.

FIG. 8 shows an example of a UAV docked within a vehicle in accordance with an embodiment of the invention. A UAV 810 may be docked to a vehicle 820. The vehicle may have a docking station on-board that may permit the UV to dock to the vehicle. The docking station may optionally be within an interior of the vehicle. The docking station may include a cover 830. The cover may control access of the UAV to the docking station. The cover may control access of the UAV to the interior of the vehicle. The cover may completely or partially enclose the UAV or protect it from the exterior environment.

The cover 830 may have any shape or dimension. In some instances, the cover may be a portion of the vehicle roof, trunk, hood, door, or any other portion of the vehicle. The cover may be contoured to follow the rest of the surface of the vehicle. The cover may or may not have any portion that protrudes from the vehicle when the cover is in a closed position. The cover may or may not have any portion that is indented from a surface of the vehicle when the cover is in a closed position.

The cover may be sized to permit passage of the UAV. In some instances, the cover may be sized so that when the cover is open, the UAV may be capable of flying through the cover to dock to the docking station within the UAV. In some instances, the greatest dimension (e.g., length, width, height, diagonal, or diameter) of the cover may be greater than the greatest dimension of the UAV (e.g., respective length, width, height, diagonal, or diameter). The cover may be sized to not exceed the lateral dimensions of the vehicle. The cover may or may not add to the height of the vehicle.

The cover may be formed from a single integral piece. The cover may be formed from multiple pieces that have been permanently attached to one another. In another example, the cover may be formed from multiple pieces that may come apart.

While the UAV is docked to the vehicle within an interior of the vehicle, the cover may cover the UAV. Optionally, when the cover is closed, the UAV may not be capable of entering or exiting the vehicle without opening any doors of the vehicle. The cover may provide a fluid-tight seal for the vehicle. The seal between the cover and the rest of the vehicle may be air tight. This may prevent air from flowing within the vehicle and increasing drag on the vehicle. This may also help protect the UAV and the interior of the vehicle from the elements. When the UAV is protected beneath the cover, and within the vehicle, the UAV may be protected from wind, rain, and other environmental conditions. The cover may be water proof. The cover connection with the vehicle may be water-tight so that no water can get into the vehicle when the cover is closed. Optionally, the cover may be opaque. The cover may prevent light from entering its interior when it is closed. This may reduce sun damage to the UAV and/or the vehicle. Alternatively, the cover may be transparent and/or translucent. The cover may permit light to enter. The cover may filter the light to permit light of desired wavelengths of light to enter. The cover may function as a sun roof. The cover, when closed, may isolate the UAV and the interior of the car from external conditions (unless other features of the car, such as windows or doors, are open).

In other implementations, the cover may partially enclose the UAV. One or more holes or openings may be provided that may permit air to flow into the interior of the vehicle.

When the UAV is about to launch from the vehicle, the cover may open. In one implementation, the UAV may be within the interior of a cabin of a vehicle and the cover may be provided in the roof. In another implementation, the UAV may be within a trunk or rear portion of the vehicle, and the cover may be provided in the trunk surface. In another example, the vehicle may be provided in a front hoot portion of a vehicle, and the cover may be provided in the hood surface.

In one example, the cover may open by pivoting about an axis. For example, a hinge or similar configuration may attach the cover to the vehicle or docking station of the vehicle. The cover may pivot about the hinge to open up and expose the UAV to the environment. The UAV may then be capable of taking off. In another example, the cover may have multiple pieces that may come apart. For example, two sides of a portion of a vehicle roof may come apart and permit the UAV to fly out there through. The sides may each pivot about a hinge. In another example, rather than pivoting about a single hinge, the cover may include one or portions that may pivot about multiple axes. In one example, the cover may be a directional antenna that may be capable of pivoting about multiple axes, as described in greater detail below. In another example, rather than rotating about a hinge, the cover may be able to translate and/or move laterally and/or vertically. In one example, two portions of a cover may come apart may sliding sideways and exposing a middle interior section, through which the UAV may fly. In other instances, the cover may include one or more pieces that may retract. For example, they may retract into the vehicle roof. In another example, they may telescope or fold over on themselves. The cover may open in any number of ways, which may permit the UAV to take off from the vehicle.

In one example, the cover may be doors, such as or bay doors, on a surface of a vehicle. The cover may be doors provided on a roof of the vehicle. Any description of a door may apply to a single door, or multiple doors. In some instances, the cover 830 as illustrated in FIG. 8 may be a pair of doors. The doors may rotate about a hinge. The doors may open upwards (to the exterior of the vehicle) or inwards, to an interior of the vehicle. In other instances, the doors may be sliding doors. The doors may slide along the surface of the vehicle without substantially changing the height of the vehicle. The doors may be capable of retracting into the rest of the surface of the vehicle. In other instances, the doors may be folding doors or accordion-type doors.

Once the UAV has taken off and is in flight, the cover may optionally close again. This may be to provide desired aerodynamic qualities for the vehicle while the vehicle is in motion. Alternatively, the cover may remain open while the UAV is in flight. In some instances, the position of the cover may be controlled while the UAV is in flight. For example, the position of the cover may be altered to track the position of the UAV.

When the UAV is ready to land and dock with the vehicle, the cover may open, if the cover had been closed during the flight of the UAV. If the cover remained open during the flight of the UAV, the cover may remain open while the UAV is landing. After the UAV has landed and/or docked with the UAV, the cover may be closed.

The cover may be provided as part of a surface of the vehicle. The UAV may land in an interior portion of the vehicle, and the cover may control access to the interior of the vehicle for the UAV. When the cover is open, the UAV may pass through to from inside the vehicle to the outside environment, or from the outside environment to the interior of the vehicle. When the cover is closed, the UAV may not pass through.

Figure 9:
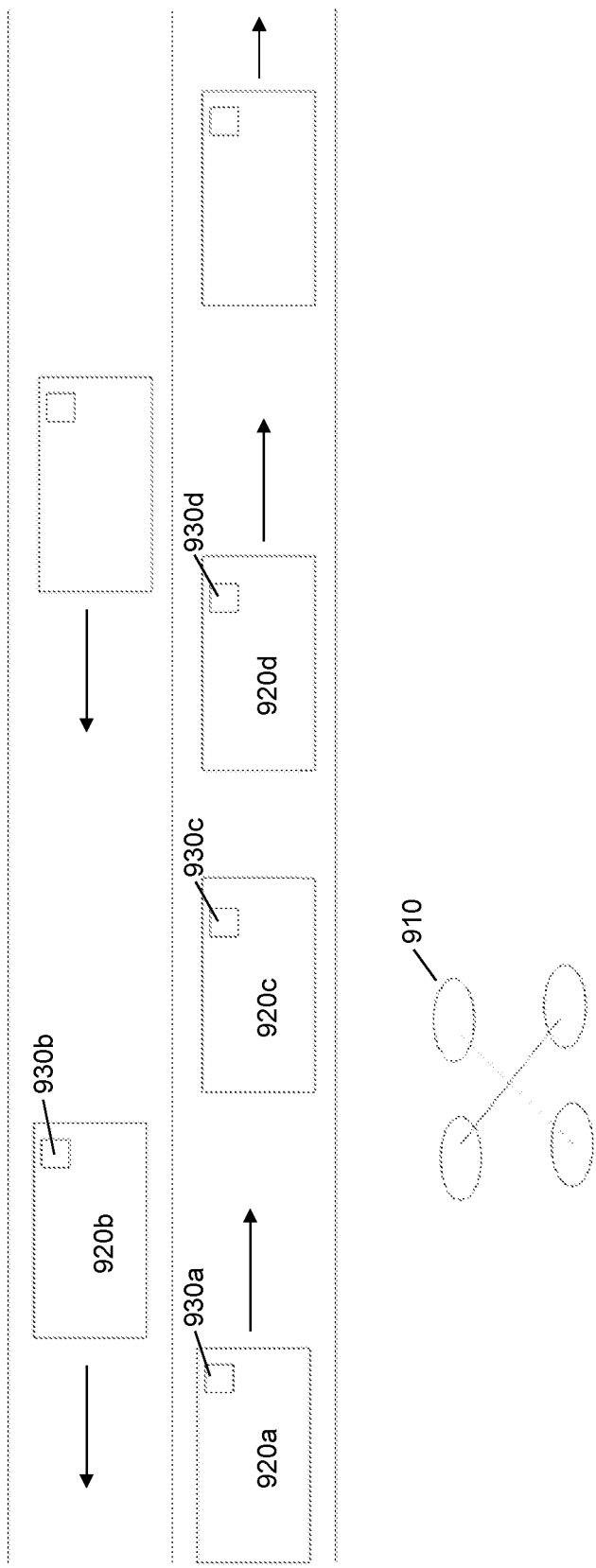
FIG. 9 shows a view of multiple vehicles that may be discerned by a UAV in accordance with an embodiment of the invention.

FIG. 9 shows a view of multiple vehicles that may be discerned by a UAV in accordance with an embodiment of the invention. A UAV 910 may be flight and may distinguish a companion vehicle 920c from other vehicles 920a, 920b, 920d in the vicinity. The vehicles may have a marker 930a, 930b, 930c, 930d that may distinguish them from one another.

A UAV 910 may communicate with a companion vehicle 920c. The UAV may send data to the companion vehicle while the UAV is in flight. The vehicle may be associated with the companion vehicle. The UAV may have taken off from the companion vehicle. The UAV may be configured to land on the companion vehicle. The operator of the companion vehicle may own and/or operate the UAV.

When the UAV is in flight, a challenge may arise when the time comes for the UAV to land on its companion vehicle. Many vehicles may be traveling within an environment. For example, even in two-direction traffic, there may be many vehicles in close proximity to one another. In some instances, these may include vehicles of similar shapes and/or sizes, as when viewed from above. These may include vehicles of the same make or model and/or color. A need may exist for the UAV to distinguish its companion vehicle from the other surrounding vehicles when the time comes for the UAV to land. Otherwise, the UAV may land on the wrong vehicle, or may even attempt to land on a vehicle that is not configured to dock with the UAV. This could result in loss of the UAV and/or damage to the UAV.

The companion vehicle 920c may have a marker 930c that may differentiate the companion vehicle from the other vehicles 920a, 920b, 920d. The marker may be detectable by the UAV. A command signal may be generated, based on the marker, to drive one or more propulsion units of the UAV, thereby controlling a laterally velocity of the UAV to fall within a predetermined range relative to a lateral velocity of the vehicle. The UAV may be coupled to the vehicle while the lateral velocity of the UAV falls within a predetermined range.

The command signal may be generated on-board the UAV. For example, a flight controller of the UAV may generate the command signal to drive the propulsion units of the UAV. The flight controller may receive data from one or more sensors of the UAV and/or a communication unit of the UAV indicative of the marker on the vehicle. In some instances, the UAV may detect the marker on the vehicle without requiring any communication from the vehicle and/or marker of the vehicle to the UAV.

In another example, the command signal may be generated on-board the vehicle. A processing unit of the vehicle may generate the command signal which may be transmitted to the UAV. The processing unit of the vehicle may or may not generate the command signal based on a location of the vehicle. The processing unit of the vehicle may or may not generate the command signal based on information the vehicle has received about the UAV (e.g., location of the UAV).

The marker 930c may be any type of marker. In one example, the marker may be a visual marker that may be detectable by an optical sensor. In one instance, the marker may be detectable by an optical sensor of the UAV. The optical sensor may be a camera capable of viewing the marker emitting and/or reflecting any signal along an electromagnetic spectrum. For example, a camera may be capable of detecting visible light. In another example, the optical sensor may be capable of detecting a signal emitted along an ultraviolet (UV) spectrum. In another example, the optical sensor may be capable of detecting a signal emitting along an infrared (IR) spectrum.

The marker 930c may be visual discernible to the naked eye. In one example, the marker may be a 1D, 2D or 3D barcode. In another example, the marker may be a quick response (QR) code. The marker may be an image, symbol, or any combination of black and white or colored patterns. In some instances, the marker may be an emitted light. The light may be emitted by any light source, such as an LED, incandescent light, laser, or any other type of light source. The marker may include a laser spot or any other type of light spot. The laser can have modulated data. The light may emit a particular wavelength or combination of wavelengths of light. The light may be emitted with any spatial pattern. In some instances, the light may be emitted with any temporal pattern (e.g., patterns of turning on and off).

The marker 930c may be detected using an IR sensor. The marker may be detected using thermal imaging. The marker may be detectable along the near IR spectrum, far IR spectrum, or any combination thereof.

The marker 930c may emit any other type of signal. In some instances, the marker may emit a wireless signal indicative of the identity of the vehicle. The marker may emit a signal indicative of the position of the vehicle. For example, the marker may emit a vehicle identifier (e.g., unique identifier for the vehicle) as well as coordinates of the vehicle, or any other information pertaining to the location of the vehicle. The marker may emit a signal along a radio frequency, or any other type of frequency. For instance, the marker may use RFID or other wireless methods. The marker may emit a direct wireless signal via WiFi, WiMax, Bluetooth, or any other type of direct wireless signal. The marker may emit an acoustic signal or sound signal. In some instances, the marker may emit a high frequency signal that may not be discernible by human ears.

In some instances, a single marker 930c may be provided on a vehicle 920c. Alternatively, multiple markers may be provided on a vehicle. The multiple markers may be of the same type of may be of differing types. The UAV may be capable of detecting a single type of marker or multiple types of markers. For a marker provided on a vehicle, the UAV may have one or more sensor capable of detecting the marker.

The markers 930a, 930b, 930c, 930d may be distinguishable from one another. This may help distinguish different vehicles 920a, 920b, 920c, 920d from one another. The markers may be distinguishable from one another using a sensor of the UAV. The UAV may be capable of distinguishing the marker from the companion vehicle 930c from the other markers around 930a, 930b, 930d. For example, if the markers are visual patterns, the visual patterns may each be different from one another. Each vehicle may have a unique or substantially unique visual pattern. In another example, if the marker is emitting a wireless signal, the wireless signals may provide an identifier from the vehicle that is differentiable from other surrounding vehicles.

The markers may be detectable and/or distinguishable by the UAV 910 while the vehicles are in motion. Even if the vehicles are traveling at any of the speeds described elsewhere herein, the UAV may be able to detect and/or read the markers to distinguish the companion vehicle 920b from other vehicles 920a, 920b, 920d. In some instances, the UAV and the companion vehicle may be in communication while the UAV is in flight. The companion vehicle may send information about the companion vehicle's location to the UAV. The UAV may use the companion vehicle's location along with the UAV's location to determine how to fly toward the companion vehicle. In another example, the companion vehicle may receive information about the UAV's location and use the UAV's location along with the companion vehicle's location to generate command signals to the UAV on how to fly back. However, even if the relative location of the companion vehicle and/or UAV are known, since there may be a high density of vehicles in a small space and the vehicles may all be in motion, having the marker may advantageously permit the UAV to pinpoint with increased accuracy, the companion vehicle on which the UAV is to land.

Once a landing sequence is initialized, the UAV may travel to the location of the companion vehicle. In some instances, the vehicle may transmit its geographic coordinates to the UAV. In one example, a UAV may receive the GPS coordinates of the vehicle in real time. The coordinates may be sufficient to get the UAV to the general location of the vehicle. However, there may also be other vehicles or similar objects close by. The UAV may employ one or more sensors to discern the marker of the companion vehicle from the other surrounding vehicles. For example, the UAV may use vision-based methods to provide accurate landing. The UAV may have an on-board camera (e.g., on the underside of the UAV), that may provide accurate positioning. Machine vision techniques may be employed to read the marker. Any other techniques or sensors may be employed to detect and distinguish a marker. Once the marker of the companion vehicle has been discerned, the UAV may land on the companion vehicle and dock with the companion vehicle.

General communication between the UAV and the companion vehicle may be used to get the UAV to the general location of the companion vehicle. The marker may aid in further pinpointing the location of the companion vehicle and distinguishing it from other surrounding vehicles. The marker may serve as a confirmation of the vehicle on which the UAV will land.

The marker may uniquely differentiate the vehicle from other vehicles nearby. In some instances, a companion vehicle may be differentiated from other vehicles within about 0.01 km, 0.05 km, 0.1 km, 0.3 km, 0.5 km, 0.7 km, 1 km, 1.5 km, 2 km 2.5 km, 3 km, 3.5 km, 4 km, 4.5 km, 5 km, 5.5 km, 6 km, 7 km, 8 km, 9 km, 10 km, 12 km, 15 km, 20 km, 25 km, 30 km, 35 km, 40 km, or 50 km of the vehicle. Each marker may provide a vehicle with a unique identifier, which may correspond to a UAV or be known by a companion UAV. The UAV may be calibrated with the unique identifier (e.g., visual pattern, IR signal, UV signal, wireless signal). For example, the UAV may interact with the marker in a calibration sequence to know the unique identifier corresponding to the vehicle. The way, if the vehicle later updates it marker, or the UAV is used with a different companion vehicle, the UAV may be recalibrated with the new marker and be able to find its companion vehicle.

The marker may also be useful for indicating a landing position of the UAV on the vehicle. The marker may be used as a fiducial marker, which may aid the UAV in navigating to a proper landing position on the vehicle. In some examples, multiple markers may be provided which may aid the UAV in landing in a desired position. In some instances, it may also be desirable for a UAV to have a particular orientation when docking with the vehicle. In one example, the marker may include an asymmetric image or code that may be discernible by the UAV. The fiducial may be indicative of the orientation of the vehicle relative to the UAV. Thus, the UAV may be able to orient itself properly when landing on the vehicle. The marker may also be indicative of the distance of the vehicle relative to the UAV. This may be used separate from or in combination with one or more other sensors of the UAV to determine the altitude of the UAV. For example, if the size of the fiducial marker is known, the distance from the UAV to the marker may be gauged depending on the size of the marker showing up in the sensors of the UAV. The marker may also aid with determining speed and/or motion of the vehicle. For example, if the UAV is collecting images at a particular frequency, the location of the marker in one frame to the next may help determine the motion of the vehicle relative to the UAV.

In one example, the marker may be provided at a particular location relative to a desired landing spot of the UAV on the vehicle. This may be at a particular location relative to a desired landing spot on a docking station of a vehicle. The UAV may be capable of landing on the vehicle/docking station with great precision, when the vehicle is stationary or is in motion. The marker may help guide the UAV to the exact desired spot. For instance, the marker may be located 10 cm in front of the center of the desired landing point of the UAV. The UAV may use the marker to guide the UAV to the exact landing spot. In some examples, multiple markers may be provided. The desired landing spot may fall between the multiple markers. The UAV may use the markers to help orient the UAV and/or position its landing between the markers.

The marker may be provided anywhere on the vehicle. In some instances, the marker may be provided on an exterior surface of the vehicle. The marker may be on a roof of the vehicle, trunk of the vehicle, hood of the vehicle, extension attached to the vehicle (e.g., carriage, two, or sidecar pulled by the vehicle), side of the vehicle, door of the vehicle, window of the vehicle, mirror of the vehicle, light of the vehicle, or any other portion of the vehicle. In some examples, the marker may be provided on a docking station. The marker may be positioned on a surface of the docking station discernible by the UAV. The docking station may or may not be removable from the vehicle. The marker may be positioned on a vehicle where it may be detected from outside the vehicle. The marker may include a wireless signal being emitted by a vehicle. The origin of the signal may be from outside the vehicle or inside the vehicle.

The marker may be positioned near where the UAV may dock with the vehicle. In one example, the marker may be positioned less than about 100 cm, 90 cm, 80 cm, 75 cm, 70 cm, 65 cm, 60 cm, 55 cm, 50 cm, 45 cm, 40 cm, 35 cm, 30 cm, 25 cm, 20 cm, 15 cm, 12 cm, 10 cm, 8 cm, 7 cm, 6 cm, 5 cm, 4 cm, 3 cm, 2 cm, or 1 cm from where the UAV forms a connection with the vehicle.

Data pertaining to the detected marker may be provided to one or more processors. The processors may be on board the UAV. Based on the detected information about the detected marker, the processors may, individually or collectively, generate a command signal. The command signal may drive the propulsion units of the UAV. For example, the propulsion units may be driven to cause the UAV to land on the vehicle with the detected marker, when the detected marker is determined to belong to the companion vehicle of the UAV. If the detected marker is determined to not belong to the companion vehicle of the UAV, the propulsion units may be driven to cause the UAV to fly in the vicinity to look for another marker that may belong to the companion vehicle of the UAV.

In some embodiments, sensors on board the UAV may be used to detect the marker, and processing may occur on-board the UAV. The UAV may be capable of landing itself on the vehicle without requiring further guidance or information from the vehicle once the UAV has confirmed that the marker belongs to the companion vehicle.

A vehicle may include a marker, and one or more coupling connection components. The vehicle may send information about its location and/or velocity to a UAV. The vehicle may have a location unit capable of determining positional and/or velocity information about the vehicle. A vehicle may receive information from the UAV about the location of the UAV. For example, coordinate information, such as GPS coordinates, for the UAV may be provided to the vehicle. The vehicle may have a communication unit capable of communicating with the UAV. The vehicle may have a processor capable of identifying and/or calculating a location of the UAV.

Figure 10:
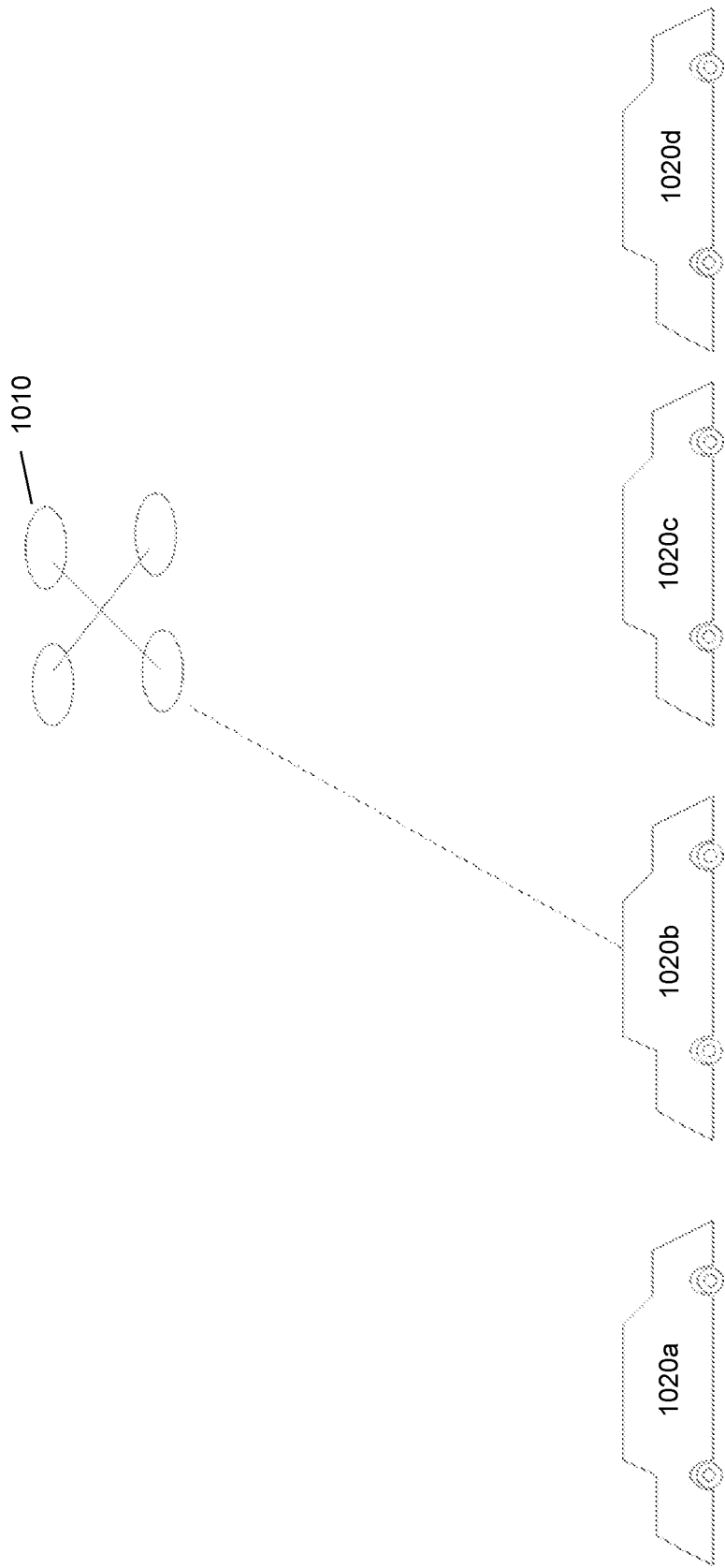
FIG. 10 shows an example of a UAV in communication with an associated vehicle in accordance with embodiments of the invention.

FIG. 10 shows an example of a UAV in communication with an associated vehicle in accordance with embodiments of the invention. A UAV 1010 may be capable of communicating with a companion vehicle 1020b. In some instances, the companion vehicle may be in a setting surrounded by other vehicles 1020a, 1020c, 1020d. The UAV may communicate with the companion vehicle without communicating with the other vehicles. The UAV may be able to discern the companion vehicles from other vehicles to communicate exclusively with the companion vehicle.

In some embodiments, one-way communications may be provided between the UAV 1010 and the companion vehicle 1020b. The UAV may send data to the companion vehicle. The data may include data from a payload of the vehicle and/or one or more sensors of the vehicle. In one example, the payload may be a camera or other type of image capturing device. The camera may capture static images (e.g., stills) and/or dynamic images (e.g., video). The images captured by the camera may be streamed to the companion vehicle. The data may be sent to the companion vehicle without being sent to any other surrounding vehicle.

Other data may be sent from the UAV to the companion vehicle. For example, location data of the UAV may be sent to the vehicle. The location data may be determined using one or more sensors of the UAV. The location may be discerned on-board the UAV and sent to the companion vehicle. Alternatively the location data may be sent to the companion vehicle which may use the data to discern the location of the UAV. Any environmental data picked up by one or more sensors of the UAV may be sent down to the vehicle. Such environmental data may include local environmental conditions such as temperature, wind, sunniness, brightness, sounds, or any other information. Such environmental data may also include the detection and/or presence of static or dynamic objects in the area.

In one example, a user (e.g., operator or passenger of a vehicle 1020b) may wish to gather information about the surrounding environment that the user cannot get while in the vehicle. The user may wish to gather images of the environment surrounding the user. In one example, a traffic jam may have occurred. The user may wish to determine the cause of the traffic jam and/or scout out how bad the traffic jam is. The user may also wish to map out possible alternate routes depending on surrounding traffic. The user may launch a UAV from the vehicle to collect the information. The UAV may include a camera, and may fly ahead of the vehicle. The UAV may be able to capture images of about the cause of the traffic jam and/or possible routes to take. The UAV may be able to capture images that may help the user assess how long the user may be stuck in traffic and/or the extent of the traffic jam. The images may be streamed to the user in real-time. The images may be streamed to a display device within the vehicle. For example, the UAV 1010 may fly above the companion vehicle 1020b and/or other vehicles 1020a, 1020c, 1020d and be able to view from a higher altitude additional information that may not be viewable from within the companion vehicle.

An additional example may provide a user looking for a parking spot in a parking lot or parking structure. The UAV may be able to fly overhead to stream images of the parking lot from overhead. The user may be able to see in real-time whether there are any parking spots open. The just may also be able to see if there are other cars looking for parking near the open parking spot or the best way to maneuver the user's vehicle toward the open parking spot. This may also be advantageous in situations where there are many different parking areas within a parking lot. In some instances, the UAV may fly overhead and provide images that may help a user determine which parking area has the most open parking spots.

In another example, a user may wish to scout out surrounding locations for safety purposes. The user may wish to see if other vehicles or individual are in an area that the user is driving. The UAV may fly overhead and capture images of the surrounding environment.

The companion vehicle may be first responder, or emergency vehicle. For example, the companion vehicle may be a law enforcement vehicle (e.g., police car), fire truck, ambulance, or any other type of first responder vehicle. The companion vehicle may wish to gather more information about the emergency to which it responds before arriving on the scene. The UAV may fly ahead and be used to provide additional information about the emergency. For example, if there is a car accident, medical emergency, fire, and/or any type of crisis, the UAV may gather information about the situation (e.g., capture images of the situation) and send the information to the companion vehicle before the companion vehicle arrives. This may help first responders plan for and respond to the emergency more quickly and effectively.

An additional example may provide a UAV that also includes a light source as a payload. The light source may be used to illuminate an area beneath the UAV. In some instances, in a very dark environment, a user may wish the UAV to fly overhead and/or ahead to light the way and show the operator of the companion vehicle what obstacles may lie ahead. The additional light provided by the UAV may provide additional perspective or visibility relative to headlights of the vehicle. In some instances, if the vehicle headlights are non-functioning or insufficient, the UAV may be used for additional illumination. In one instance, the companion vehicle may be searching for a fugitive and the UAV may fly near the companion vehicle to provide an aerial viewpoint and/or light source to help track down the fugitive.

The UAV may be used to conduct a geographical survey in accordance with another aspect of the invention. For example, the UAV may capture images of the surrounding environment, or use other sensors, to create a geographical map of the surrounding environment. The companion vehicle may be driving around to create a map of the surrounding environment, and the UAV may be useful in supplementing or adding to the data collected by the companion vehicle. The aerial images captured by the UAV may be used alone or in combination with images captured by the companion vehicle.

Optionally, other data, such as the location of the vehicle may be relayed to the user. In some instances, the location of the UAV may be overlaid on a map. This may help put the images captured by the UAV into a geographic context. Optionally, the location of the companion vehicle may also be overlaid on the map. Thus, the map may show the relative locations between the UAV and the companion vehicle within the geographical area. This may help a user in controlling the UAV or sending commands to the UAV.

Communications may be provided from the vehicle 1020b to the companion UAV 1010. The communications may include information about the location of the vehicle. The UAV may use the information about the location of the vehicle to control the flight path of the UAV. In some instances, the UAV may fly along a predetermined path in relation to the location of the vehicle. In other instances, the UAV may fly within a particular range of the location of the vehicle. The UAV may use the information about the location of the vehicle to return to the vehicle and/or land on the vehicle.

Communications from the vehicle to the companion UAV may also include one or more flight commands from the vehicle to the UAV. In some instances, the flight commands may include direct, real-time control of the flight of the UAV. For example, the vehicle may have a remote controller for the flight of the UAV. A user may operate the remote controller to control the flight of the UAV. The UAV may respond to the commands from the remote controller in real-time. The remote-controller may control the position, orientation, velocity, angular velocity, acceleration, and/or angular acceleration of the UAV. An input from the remote controller may result in a corresponding output in by the UAV. Inputs by the remote controllers may correspond to specific outputs by the UAV. A user may thus be manually controlling aspects of the UAV's flights via the remote controller. The user may manually control aspects of the UAV's flights while within the companion vehicle. The user may be the operator of the vehicle, or a passenger of the vehicle.

In some instances, the flight commands may include the initiation of a preset sequence. For example, a user may input a command for the UAV to take off from the vehicle. In some instances, a predetermined protocol may be provided for the UAV to take off. In other instances, the user may manually control the UAV to have the UAV take off from the vehicle. The present UAV take off sequence may include opening a cover, if a cover is provided over the UAV. A preset sequence of the UAV taking off from the vehicle may include undocking or disconnecting the UAV from a docking portion of the vehicle. The preset sequence may also include increasing the altitude of the UAV with aid of one or more propulsion units. The orientation and/or position of the UAV may be controlled. In some instances, the movement of the vehicle while the UAV is taking off may be taken into account for the takeoff sequence of the UAV. Environmental conditions such as the wind speed may or may not be assessed and/or considered for the takeoff sequence of the UAV.

In another example, a user may input a command for the UAV to land on the vehicle. In some instances, a predetermined protocol may be provided for the UAV to land on the vehicle. In other instances, the user may manually control the UAV to have the UAV land on the vehicle. A preset sequence of the UAV landing on the vehicle may include decreasing the altitude of the UAV with aid of one or more propulsion units. The orientation and/or position of the UAV may be controlled. In some instances, the movement of the vehicle while the UAV is landing may be taken into account for the landing sequence of the UAV. For example, the UAV lateral velocity may match the vehicle lateral velocity or fall within a predetermined range of the vehicle lateral velocity. For example, the UAV lateral velocity may be brought within about 15 mph, 12 mph, 10 mph, 9 mph, 8 mph, 7 mph, 6 mph, 5 mph, 4 mph, 3 mph, 2 mph, 1 mph, 0.5 mph, or 0.1 mph when the UAV is landing on the vehicle. Environmental conditions such as the wind speed may or may not be assessed and/or considered for the landing sequence of the UAV. The preset landing sequence may include the docking and/or connecting of the UAV with a docking portion of the vehicle. The preset landing sequence may optionally include covering the UAV with a cover once docked to the vehicle.

The flight commands may be provided in accordance with one or more flight pattern of the UAV while separated from the vehicle. In some instances, one or more flight patterns may be provided, which may permit autonomous, or semi-autonomous flight of the UAV. The flight patterns may dictate the position of the UAV relative to the vehicle. The flight pattern may dictate the position of the UAV over time relative to the vehicle. In one example, a flight pattern may instruct the UAV to fly directly above the vehicle at a particular altitude. If the vehicle is in motion, the UAV may move laterally to correspond to the vehicle motion, and remain over the vehicle. In another example, the flight pattern may instruct the UAV to fly above the vehicle and remain ahead of the vehicle by a particular distance. For example, a UAV may fly up into the air and fly to be about 500 meters in front of the vehicle. After a predetermined amount of time the UAV may return to the vehicle and land on the vehicle. Other examples of flight patterns may include grid-like flight patterns, circular flight patterns, or any other shape of flight pattern. The flight patterns may include the UAV flying above the vehicle, in front of the vehicle, behind the vehicle, to a right side of the vehicle, to a left side of the vehicle, or any combinations thereof. The UAV may fly along the flight pattern relative to the vehicle a particular amount of time and then return to the vehicle.

In other instances, the UAV may return to the vehicle in response to a detected condition. For example, if a battery on-board the UAV drops beneath a threshold state of charge, the UAV may return to the vehicle. For example, if the battery charge level for the UAV drops beneath about 50%, 40%, 30%, 25%, 20%, 15%, 12%, 10%, 8%, 7%, 6%, 5%, 4%, 3%, 2%, or 1%, the UAV may return to the vehicle. In another example, if an error is detected on-board the UAV, the UAV may return to the vehicle. For example, overheating of one or more components of the UAV may be detected, and the UAV may immediately return to the vehicle. In another example, an error may be detected for one or more sensors or payload of the UAV. If the camera of the UAV is no longer functioning, the UAV may return to the vehicle. If one or more sensors is malfunctioning and/or not receiving a signal, the UAV may return to the vehicle.

In some instances, the UAV may be instructed to remain within a particular distance of the moving UAV. For example, the UAV may be instructed to remain within about 10 km, 9.5 km, 9 km, 8.5 km, 8 km, 7.5 km, 7 km, 6.5 km, 6 km, 5.5 km, 5 km, 4.5 km, 4 km, 3.5 km, 3 km, 2.5 km, 2 km, 1.5 km, 1 km, 500 m, 300 m, or 100 m of the companion vehicle. The distance may be lateral distance, altitude, or any combination thereof. The distance may incorporate both the lateral distance and vertical distance. The UAV may fly in accordance with a pre-set flight pattern within the distance. In another instance, the UAV may autonomously fly within the distance without following a pre-set pattern, but may remain within the distance. In another example, a user may manually control the UAV freely within the distance. If the user tries to control the UAV outside the distance, the UAV may refuse to go outside the distance and may remain within the distance.

Any description herein of the distance may also refer to any permissible zone relative to the companion vehicle. Any permissible zone may have any shape and/or may refer to boundaries within which the UAV will need to stay relative to the companion vehicle. The permissible zone may have different distance thresholds for different directions relative to the companion vehicle. For example, a UAV may need to remain within 4 km to the front of the companion vehicle, 1 km of a side of the companion vehicle and 2 km of the rear of the companion vehicle.

As the companion vehicle moves, the threshold distance and/or permissible zone may move with the companion vehicle. For example, if the permissible zone is a circle around the companion vehicle, as the companion vehicle moves, the permissible zone may move with the companion vehicle so that the center of the circle remains with the vehicle. Thus, the region within which UAV in flight may fly may change over time.

Additional types of commands may be provided from the vehicle to the companion UAV. For example, control of the payload may be provided in response to a command from the vehicle. This may include positioning and/or orientation of a camera on the UAV. This may also include controlling other camera features such as recording modes, zoom, resolution, or any other type of camera controls. The vehicle may control the camera by initiating a preset sequence (e.g., autonomous or semi-autonomous) or directly controlling (e.g., manual) the camera. Similarly, control of one or more sensors may occur in response to a command from the vehicle. The commands to the sensors, payloads, and/or any other features of the UAV may permit any component of the UAV to operate in any of the following modes: autonomous, semi-autonomous, or manual modes.

Two-way communications may be provided between the UAV 1010 and the companion vehicle 1020*b*. Any combination of data transmissions described herein may be provided. For example, commands from the vehicle may be used to control the UAV or initiate a sequence for the UAV to execute. The commands may be used to control the flight of the UAV, a payload of the UAV, a sensor of the UAV, or any other component or function of the UAV. Data from the UAV may be provided to the vehicle. This may include data about a state of the UAV (e.g., position, flight trajectory, error state, charge state), and/or any data collected by one or more payload or sensor of the UAV (e.g., images, location information, environmental information). In some embodiments, the two-way communications may affect one another. Feedback may be provided. For example, location data of the UAV may aid in formulating the commands to control the flight of the UAV. The feedback may be provided by a manual operator, and/or a processor configured to provide automated commands.

The UAV 1010 may be capable of selectively communicating with the companion vehicle 1020*b* without communicating with the other vehicles. In some instances, the UAV and the companion vehicle may be pre-synched or pre-paired which may enable direct communications with one another. Unique identifiers between the UAV and/or the companion vehicles may be exchanged and used to identify one another. In other embodiments, the UAV and companion vehicle may communicate via a unique frequency and/or communication channel. The communication channel may optionally be encrypted.

Figure 11:
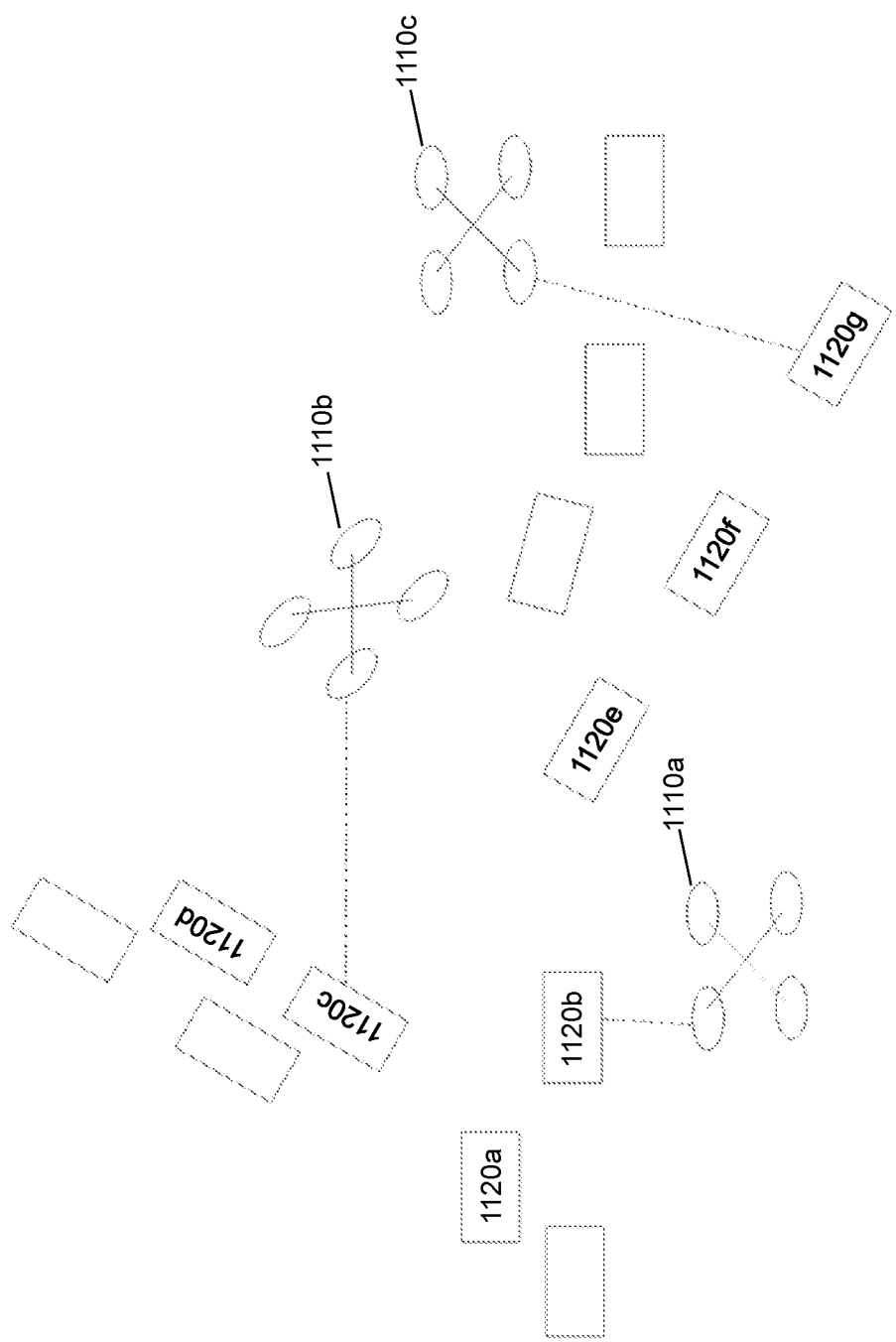
FIG. 11 shows an example of multiple UAVs in communication with multiple vehicles in accordance with an embodiment of the invention.

FIG. 11 shows an example of multiple UAVs in communication with multiple vehicles in accordance with an embodiment of the invention. In some instances, within a given area, multiple UAVs 1110*a*, 1110*b*, 1110*c* may be provided. The multiple UAVs may each have a corresponding companion vehicle 1120*b*, 1120*c*, 1120*g*. Other vehicles 1120*a*, 1120*d*, 1120*e*, 1120*f* may be provided in the area. The other vehicles may or may not have their own companion UAVs.

The UAVs may be able to communicate with their companion vehicles without communicating with other vehicles.

The UAVs may be able to communicate with their companion vehicles without interfering with communications between other UAVs and their companion vehicles. The UAVs may communicate with their companion vehicles without 'eavesdropping' on communications between the other UAVs and their companion vehicles. The UAVs may be able to differentiate their companion vehicles from other vehicles and communicate only with their companion vehicles. Similarly, the vehicles may be able to differentiate their UAVs from other UAVs and communicate only with their companion UAVs. For example, a UAV 1110a may be able to distinguish its companion vehicle 1120b from all other vehicles in the area. The vehicle 1120b may be able to distinguish its companion UAV 1110a from all other UAVs in the area. In some instances, the area may be less than or equal to about 100 sq km, 90 sq km, 70 sq km, 60 sq km, 50 sq km, 45 sq km, 40 sq km, 35 sq km, 30 sq km, 25 sq km, 20 sq km, 15 sq km, 12 sq km, 10 sq km, 9 sq km, 8 sq km, 7 sq km, 6 sq km, 5 sq km, 4.5 sq km, 4 sq km, 3.5 sq km, 3 sq km, 2.5 sq km, 2 sq km, 1.5 sq km, 1 sq km, 0.8 sq km, 0.5 sq km, 0.3 sq km, 0.1 sq km, 0.05 sq km, or 0.01 sq km.

In some embodiments, the UAVs 1110a, 1110b, 1110c may be able to detect one another and/or communicate with one another. The UAVs may detect the presence of other UAVs. Collision avoidance may be provided between multiple UAVs. In some instances, the UAVs may have a communication sharing mode. For example, a first UAV 1110a may communicate data collected to a second UAV 1110b. In one example, images collected by the first UAV may be shared with a second UAV. The first UAV may transmit the first UAV's data to the companion vehicle 1120b. The second UAV that receives data from the first UAV may transmit the data to the second UAV's companion vehicle 1120c. Data collected by the second UAV may also be transmitted to the second UAV's companion vehicle and to the first UAV. The first UAV may optionally transmit data from the second UAV to the first companion vehicle. Thus, data sharing may occur between the different UAVs. This may be useful for expanding the range of data collected by a UAV. In some instances, in any given moment a single UAV may only able to cover a particular area. If multiple UAVs are covering different areas, and sharing the information, the information collected may be expanded.

In some instances, users may be able to opt in or opt out of a UAV data sharing mode. If the users opt out of the UAV data sharing mode, the user's UAV may not communicate with any other UAVs. If the users opt into a data sharing mode, the user's UAV may communicate with other UAVs. The other UAVs may also need to opt into the data sharing mode.

Optionally, the vehicles may only communicate with their companion UAVs. Alternatively, they may communicate with other vehicles. In some implementations, vehicles 1120b, 1120c, 1120g may be able to detect one another and/or communicate with one another. The vehicles may communicate with other vehicles that have companion UAVs or even other vehicles that do not have companion UAVs 1120a, 1120d, 1120e, 1120f. The vehicles may detect the presence of other vehicles. In some instances, the vehicles may have a communication sharing mode. This may be provided in addition to, or in the place of, a communication mode between UAVs. For example, a first vehicle 1120b may communicate data collected to a second vehicle 1120c. In one example, images collected by a first UAV that is a companion to the first vehicle and transmitted to the first vehicle may be shared with a second vehicle. The first UAV may transmit the first UAV's data to the companion vehicle 1120b. The first vehicle may transmit the received information to the second vehicle. The second vehicle may or may not transmit information to its companion UAV 1110b. Similarly, the second vehicle may also share information with the first vehicle. The second vehicle's companion UAV may transmit data to the second vehicle. The second vehicle may transmit the data to the first vehicle. Thus, data sharing may occur between the different vehicles. This may be useful for expanding the range of data collected by a vehicle. The vehicle may receive data collected from multiple UAVs via the combination of UAVs and/or other vehicles. In some instances, in any given moment a single UAV may only able to cover a particular area. If multiple UAVs are covering different areas, and sharing the information, the information collected may be expanded.

In some instances, users may be able to opt in or opt out of a vehicle data sharing mode. If the users opt out of the vehicle data sharing mode, the user's vehicle may not communicate with any other vehicles. If the users opt into a data sharing mode, the user's vehicle may communicate with other vehicles. The other vehicles may also need to opt into the data sharing mode.

Additional implementations may provide vehicles being able to communicate with any UAVs participating in a data sharing mode, and/or UAVs between able to communicate with any vehicles participating in a data sharing mode. Optionally, the UAVs may be able to communicate with any other UAVs participating in a data sharing mode and/or the vehicles may be able to communicate with any other vehicles participating in a data sharing mode. For example, a UAV 1110a participating in a data sharing mode may communicate with its companion vehicle 1120b. The UAV may also be capable of communicating with other UAVs 1110b who may be participating in a data sharing mode, and/or other vehicles 1120c who may be participating in the data sharing mode. Similarly, a vehicle 1120b participating in a data sharing mode may communicate with its companion UAV 1110a. The vehicle may be capable of communicating with other vehicles 1120c who may be participating in the data sharing mode, and/or other UAVs 1110b who may be participating in the data sharing mode.

If a UAV 1110c is not participating in a data sharing mode, it may communicate with its companion vehicle 1120g without communicating with any other vehicles and/or UAVs, including those participating in the data sharing mode. Similarly, if the vehicle 1120g is not participating in the data sharing mode it may communicate with its companion UAV 1110c without communicating with any other vehicles and/or UAVs, including those participating in the data sharing mode.

As previously, users may be able to opt in or opt out of a data sharing mode. If the users opt out of the data sharing mode, the user's UAV or vehicle may not communicate with any other UAVs or vehicles. If the users opt into a data sharing mode, the user's UAV or vehicle may communicate with other UAVs or vehicles. The other UAVs or vehicles may also need to opt into the data sharing mode. In some instances, a user may be able to opt in and specify one or more parameters of the data sharing mode. For example, the user may only share with UAVs and/or vehicles of a particular type or with which the user has a particular relationship. In another example, the user may specify the type of data that may be shared with other UAVs and/or vehicles, or situations where data may be shared.

Thus, in situations where there may be multiple UAVs and/or vehicles, communications may be limited or open as desired. Closed communications may permit UAVs and companion vehicles to communicate with one another privately. In some instances, it may be desirable to share some information, in which some open communications may be provided. The UAVs and the vehicles may be able to discern their companions from other objects in the area. Unique identification and recognition may occur. In some instances, the unique identification and recognition may be useful for encryption and/or decryption of data that may be shared.

Each UAV may have a single companion vehicle. Alternatively, a UAV may have multiple companion vehicles. A vehicle may have a single companion UAV. Alternatively, a vehicle may have multiple companion UAVs.

Figure 12A:
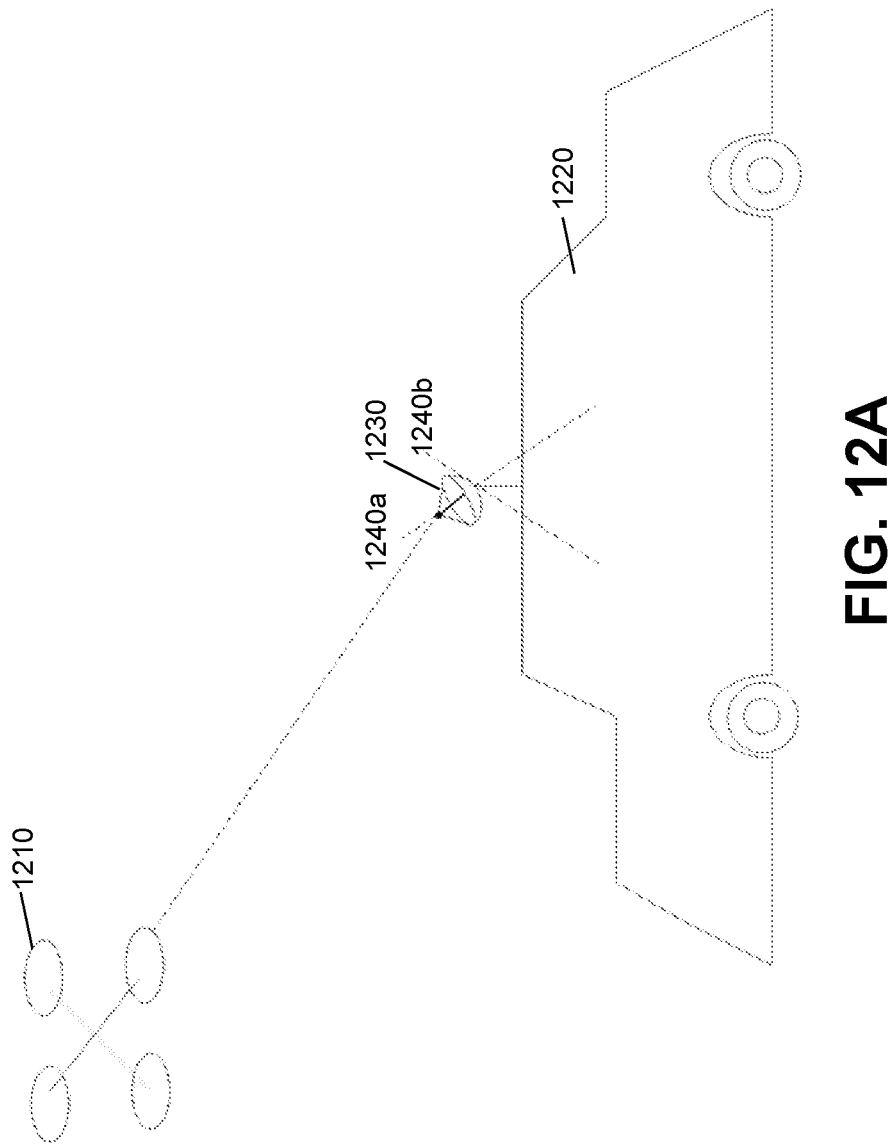
FIG. 12A shows an example of an antenna on a vehicle that may be in communication with a UAV in accordance with embodiments of the invention.

FIG. 12A shows an example of an antenna on a vehicle that may be in communication with a UAV in accordance with embodiments of the invention. The UAV 1210 may be capable of communicating with a companion vehicle 1220 while the UAV is in flight. The UAV and vehicle may communicate with one another with aid of an antenna 1230. The antenna may be a directional antenna that may be capable of changing direction. For example, the antenna may change orientation about one or more rotational axes 1240a, 1240b.

The UAV 1210 may be capable of communicating with a companion vehicle 1220 while the UAV is in flight. In some instances, two-way communications may occur between the UAV and vehicle. The companion vehicle may permit the UAV to take off from the vehicle and/or land on the vehicle while the vehicle is in operation. The companion vehicle may permit the UAV to take off from the vehicle and/or land on the vehicle while the vehicle is in motion.

In some embodiments, direct communications may be provided between the UAV 1210 and the companion vehicle 1220. Direct communications may occur with aid of a directional antenna 1230. The directional antenna may be provided on board the companion vehicle. In alternate embodiments, a directional antenna may be provided on board the UAV. Directional antennas may be provided on board the vehicle and on board the UAV. In some instances, a directional antenna may be provided on board the vehicle without being provided on board the UAV.

Directional antennas 1230 may also be referred to as beam antennas. Directional antennas may be capable of radiating greater power in one or more directions relative to other directions. This may advantageously permit an increase performance of transmission of data in one or more particular directions. This may also permit increased performance of reception of data from one or more particular directions. Optionally, the use of a directional antenna can reduce interference from unwanted sources. For example, signals from other directions may be weaker or less likely to be picked up. Some examples of directional antennas that may be employed may include Yagi-Uda antennas, log-periodic antennas, corner reflector, or any other type of directional antenna.

The directional antenna may have greater range of communications in one or more directions. For example, a directional antenna may have an increased range in a primary direction of communication relative to an omnidirectional antenna. The directional antenna may or may not have a decreased range in a direction that is not a primary direction of communication relative to an omnidirectional antenna.

When the UAV 1210 is located in a primary direction of communication relative to the directional antenna, an increased range may be provided for wireless communications between the UAV and the directional antenna. In some instances, a UAV may be capable of directly communicating with a directional antenna on a companion vehicle 1220 at a distance of at least 1 m, 5 m, 10 m, 20 m, 30 m, 40 m, 50 m, 60 m, 70 m, 80 m, 90 m, 100 m, 120 m, 150 m, 170 m, 200 m, 220 m, 250 m, 300 m, 400 m, 500 m, 600 m, 700 m, 800 m, 900 m, 1 km, 1.2 km, 1.5 km, 2 km, 2.5 km, 3 km, 3.5 km, 4 km, 4.5 km, 5 km, 6 km, 7 km, 8 km, 9 km, 10 km, 12 km, 15 km, or 20 km when in the primary direction of communication. In other instances, the UAV may communicate with a directional antenna when the distance is less than any of the distances described herein.

When the UAV is not located in a primary direction of communication relative to the directional antenna, a lesser range may be provided for wireless communication between the UAV and directional antenna, relative to if the UAV were located in the primary direction of communication. In some instances, the ratio of the less range when not in the primary direction to the greater range when in the primary direction may be less than or equal to about 4:5, 3:4, 2:3, 1:2, 1:3, 1:4, 1:5, 1:6, 1:7, 1:8, 1:9, 1:10, 1:12, 1:15, or 1:20. In other instances, the ratio may be greater than or equal to any of the ratio values described herein. The ratios may fall into a range falling between any two of the values described herein.

A directional antenna 1230 may be capable of moving. The directional antenna may change orientation by rotating about one or more axes of rotation 1240a, 1240b. The directional antenna may be capable of rotating about one or more, two or more, or three or more axes of rotation. The axes of rotation may be orthogonal to one another. The axes of rotation may remain orthogonal to one another while the directional antenna is in motion. The axes of rotation may intersect one another. In some instances, the axes of rotation may intersect with a base of the directional antenna. The directional antenna may have a pivot point. Optionally, the axes of rotation may all intersect at the pivot point. Optionally, the axes of rotation may be a pitch axis and/or yaw axis of rotation. A roll axis may or may not be provided. The directional antenna may be used to adjust a lateral angular of the directional antenna. The directional antenna may be capable of changing a pitch and/or vertical angle of the directional antenna. The directional antenna may be capable of panning about any range of angles. For example, the directional antenna may be capable of panning about 0 to 360 degrees. The directional antenna may be capable of panning about at least 5 degrees, 10 degrees, 15 degrees, 30 degrees, 45 degrees, 60 degrees, 75 degrees, 90 degrees, 105 degrees, 120 degrees, 135 degrees, 150 degrees, 165 degrees, 180 degrees, 210 degrees, 240 degrees, 270 degrees, 300 degrees, 330 degrees, 360 degrees, or 720 degrees. The directional antenna may be capable of tilting downward or upward at any angle. For example, the directional antenna may be capable of tilting upwards at least 5 degrees, 10 degrees, 15 degrees, 30 degrees, 45 degrees, 60 degrees, 75 degrees, or 90 degrees. The directional antenna may be capable of tiling downwards up to at least 5 degrees, 10 degrees, 15 degrees, 30 degrees, 45 degrees, 60 degrees, 75 degrees, or 90 degrees.

The directional antenna may be configured to be oriented so that the primary direction of communication is in line with the UAV. The UAV may be moving relative to the vehicle. The UAV may be in flight while the UAV is moving relative to the vehicle. The directional antenna may be capable of positioning itself so that the primary direction of communication is aimed at the UAV, or is pretty close to the UAV. In some instances, the primary direction of communication may be aimed to within 45 degrees, 40 degrees, 35 degrees, 30 degrees, 25 degrees, 20 degrees, 15 degrees, 10 degrees, 8 degrees, 7 degrees, 6 degrees, 5 degrees, 4 degrees, 3 degrees, 2 degrees, or 1 degree of the direction at which the UAV is located.

The position of the UAV relative to the vehicle may be known. Location information about the UAV and/or the vehicle may be gathered to determine the location of the UAV relative to the vehicle. The location of the UAV relative to the vehicle may include an angular direction of the UAV relative to the vehicle. This may include a lateral angular direction as well as a vertical angular direction. This may include a relative altitude and relative lateral position of the UAV relative to the vehicle.

A processor may calculate an angle at which to position the directional antenna of the vehicle. This calculation may be made based on the known relative position between the UAV and the vehicle. Communications may occur, via the directional antenna, with the UAV. The calculated angle may be to direct the primary direction of communication of the antenna at the UAV. As the UAV moves around in flight, the angle of the directional antenna may be updated to track the motion of the UAV. In some instances, the directional antenna may be updated in real-time, and may track the motion of the UAV in real time. In some instances, the directional antenna position may be updated periodically. The directional antenna position may be updated with any frequency (e.g., about every hour, every 10 minutes, every 5 minutes, every 3 minutes, every 2 minutes, every minute, every 45 seconds, every 30 seconds, every 20 seconds, every 15 seconds, every 12 seconds, every 10 seconds, every 8 seconds, every 7 seconds, every 6 seconds, every 5 seconds, every 4 seconds, every 3 seconds, every 2 seconds, every second, every 0.5 seconds, every 0.1 seconds, or any other regular or irregular interval of time). In some instances, the directional antenna position may be updated in response to an event or a command. For example, if it is detected that the UAV is moving outside of a particular angular range, the directional antenna may correct its orientation.

In some embodiments, calculation of the orientation of the directional antenna may occur using one or more of the following steps. Such steps are provided by way of example only and are not limiting. Steps can be provided in different orders, removed, added, or exchanged for different steps.

A coordinate system conversion may occur. GPS may output data in geodetic coordinates. In geodetic coordinates, the Earth's surface can be approximated by an ellipsoid and locations near the surface may be described in terms of latitude $\Phi$, longitude $\lambda$ and height h. An Earth-centered, earth-fixed (ECEF) coordinate system may be a Cartesian coordinate system. The ECEF coordinate system may represent positions as an X, Y, and Z coordinate. Local east, north, up (ENU) coordinates can be formed from a plane tangent to the Earth's surface fixed to a specific location, and hence may sometimes be known as a "local tangent" or "local geodetic" plane. The east axis may be labeled x, the north y and the up z. In order for navigating calculations, the GPS location data may be converted into the ENU coordinate system. The conversion may contain two steps:

1) The data is converted from geodetic system to ECEF.

$X = (N(\phi)+h)\cos \phi \cos \lambda$ $Y = (N(\phi)+h)\cos \phi \sin \lambda$ $Z = (N(\phi)(1-e^2)+h)\sin \phi$ where $$N(\phi) = \frac{a}{\sqrt{1-e^2\sin^2\phi}}$$

a and e are the semi-major axis and the first numerical eccentricity of the ellipsoid respectively. $N(\Phi)$ is called the Normal and is the distance from the surface to the Z-axis along the ellipsoid normal.

2) The data in ECEF system may then be converted to ENU coordinate system.

To transform from ECEF to the ENU system, the local reference may be chosen to the location when the USV just receives a mission is sent to the USV.

$$\begin{bmatrix} x \\ y \\ z \end{bmatrix} = \begin{bmatrix} -\sin\lambda_r & \cos\lambda_r & 0 \\ -\sin\phi_r\cos\lambda_r & -\sin\phi_r\sin\lambda_r & \cos\phi_r \\ \cos\phi_r\cos\lambda_r & \cos\phi_r\sin\lambda_r & \sin\phi_r \end{bmatrix} \begin{bmatrix} X - X_r \\ Y - Y_r \\ Z - Z_r \end{bmatrix}$$

The distance between two points may be calculated. In some implementations, the Haversine Formula may be used to give that the distance from two points A and B on the Earth surface is that, $$d_{A-E} = 2\arcsin\left(\sqrt{\sin^2\left(\frac{\Delta\phi}{2}\right) + \cos\phi_A\cos\lambda_B\sin^2\left(\frac{\Delta\lambda}{2}\right)}\right)R_e \quad (1)$$

where $\Delta\phi = \phi_A - \phi_B$, $\Delta\lambda = \lambda_A - \lambda_B$, and $R_e$ is the radius of the Earth.

In some embodiments, a desired heading calculation may be made. The current position and target position in ENU coordinates may be denoted as $(x_c, y_c)$ and $(x_t, y_t)$, respectively. The desired angle $(-180, 180]$ between the current point and the destination may be calculated as follows.

$$\begin{cases} -180°, & \text{if } |x_c - x_t| \leq \text{ and } y_c > y_t \\ 0, & \text{if } |x_c - x_t| \leq 1 \text{ and } y_c > y_t \\ 90° - \arctan\left(\frac{y_c - y_t}{x_c - x_t}\right), & \text{if } x_c - x_t < 0 \\ -90° - \arctan\left(\frac{y_c - y_t}{x_c - x_t}\right), & \text{if } x_c - x_t \geq 0 \end{cases} \quad (2)$$

Figure 12B:
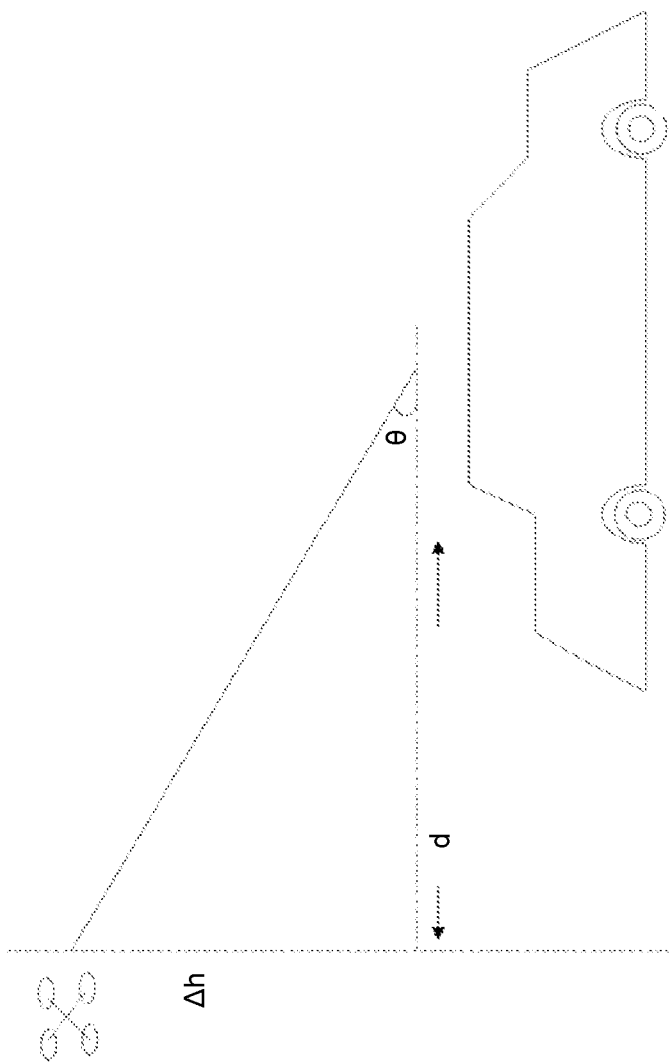
FIG. 12B shows an example of a vertical relationship between a vehicle and a UAV for calculating a vertical angle of a directional antenna, in accordance with an embodiment of the invention.

A vertical angle for the directional antenna may be calculated. The vertical angle of the antenna may be calculated using a triangle relationship shown in FIG. 12B. The distance between the vehicle and the UAV, denoted as d, may be calculated using equations described above (e.g., equation (1)), such as the equation for calculating distance between two points (e.g., Haversine Formula). $\theta$ may be the vertical angle of the antenna. $\Delta h$ may be the altitude difference between the vehicle and the UAV. d may be the distance between the car and the UAV. $\tan \theta = \Delta h/d$, so the vertical angle at which to orient the directional antenna may be equal to $\arctan (\Delta h/d)$.

Figure 12C:
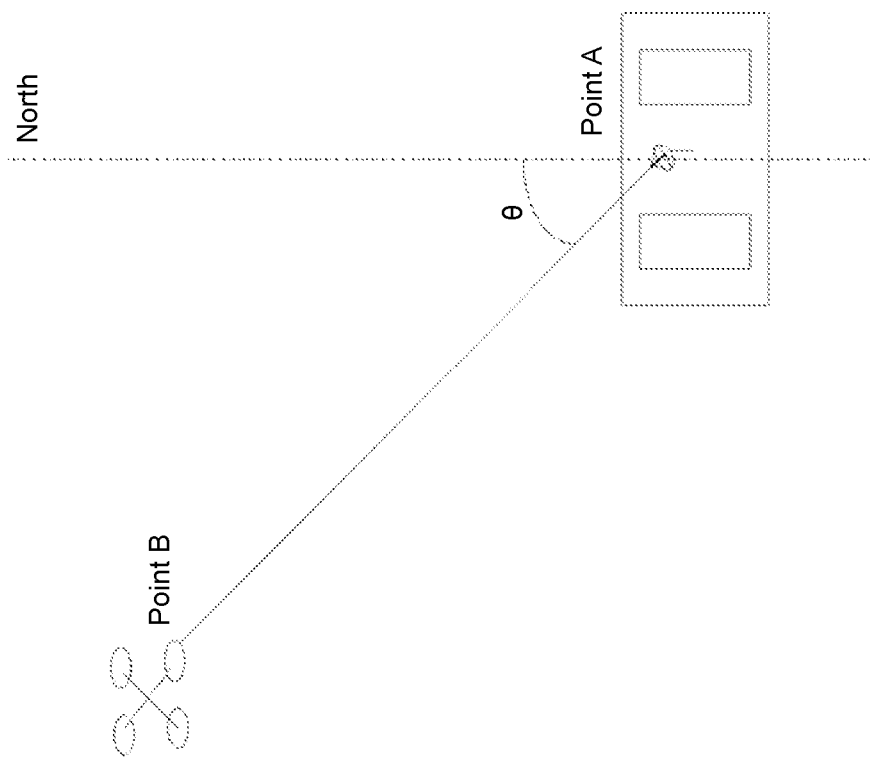
FIG. 12C shows an example of a horizontal relationship between a vehicle and a UAV for calculating a horizontal angle of a directional antenna, in accordance with an embodiment of the invention.

A horizontal angle for the directional antenna may also be calculated. The latitude and longitude information in geodetic coordinates may be converted to the ECEF system as stated in the previous steps. By using the triangle relationship, the desired angle of the antenna can be calculated using equation (2). As illustrated in FIG. 12C, the latitude and longitude of points A and B can be first converted to an ECEF system. The desired angle of the antenna $\theta$ may be calculated based on the triangle relation. In the context of the horizontal angle, $\theta$ may be a heading angle.

The directional antenna bearing may be calculated using any of the techniques described herein. The calculations may be made with aid of one or more processors, collectively or individually performing any of the steps described.

The processor may be on-board the vehicle. The processor may be on-board a docking station of a vehicle and/or the directional antenna of the vehicle. The processor may send a command signal to one or more actuators of the directional antenna to effect movement of the directional antenna. Actuation of one or more motors may cause the directional antenna to rotate about one or more axes. In some instances, each axis of rotation may have a dedicated actuator. In other instances, a single actuator may control multiple axes of rotation.

A directional antenna 1230 may have any shape or morphology. In some instances, the directional antenna may have a dish shape. The directional antenna may have a substantially hemispherical shape and/or rounded circular shape. The directional antenna may be capable of functioning as a cover for a UAV 1210 when the UAV is docked. The directional antenna may cover the UAV when the UAV is docked to the vehicle 1220. The directional antenna may partially or completely enclose the UAV when the UAV is docked to the vehicle. The directional antenna may have a maximum dimension that is greater than a maximum dimension of the UAV. The directional antenna may function as a cover, and may have any characteristic of a cover as described elsewhere herein.

In some instances, the directional antenna 1230 may cover a UAV 1210 while the UAV is docked to the vehicle 1220. The directional antenna may cover the UAV while the vehicle is in motion. A hemispherical portion of the directional antenna may overly the UAV when the UAV is docked. An instruction may be provided for the UAV to take off from the vehicle. The directional antenna may move to uncover the UAV. The UAV may take off from the vehicle. The directional antenna may change orientation to track to the motion of the UAV. A primary direction of communication for the directional antenna may fall within an angular range of the UAV. The angular range may have any angular value as described elsewhere herein. An instruction may be provided for the UAV to land. The UAV may dock with the vehicle. The directional antenna may be repositioned to cover the UAV.

The directional antenna may be used to aid in direct communications between the UAV and the vehicle. In other instances, the directional antenna may be used to aid in indirect communications between the UAV and the vehicle. If the directional antenna is aiding in indirect communications, the directional antenna may not need to track to the motion of the UAV. The directional antenna may adjust position to be oriented toward an intermediary device that may aid in indirect communications between the UAV and the vehicle.

In some implementations, direct communications and indirect communications may be permitted between a UAV and a vehicle. In some instances, the UAV and/or vehicle may be capable of switching between different modes of communication.

Figure 13:
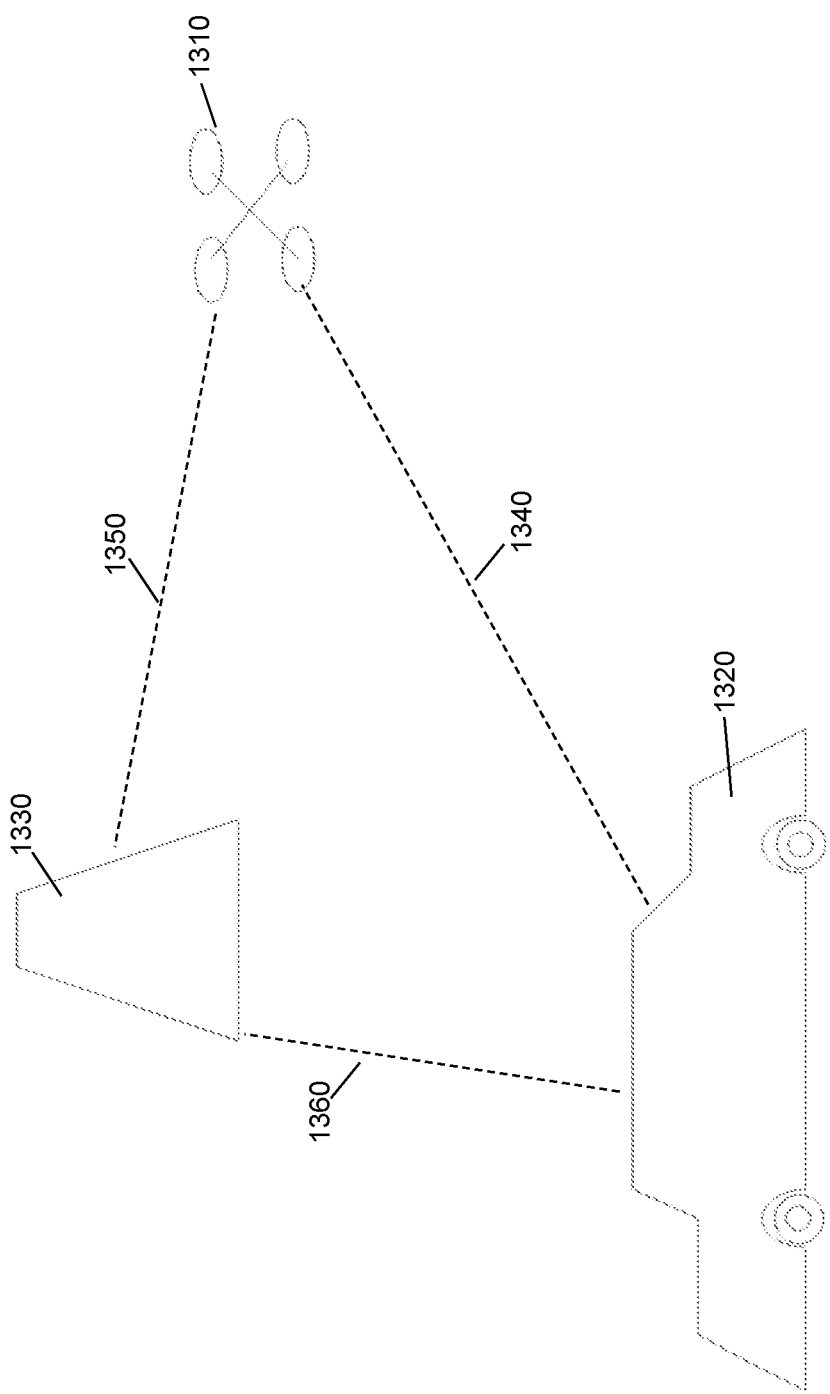
FIG. 13 shows examples of direct and indirect communications between a UAV and a vehicle in accordance with an embodiment of the invention.

FIG. 13 shows examples of direct and indirect communications between a UAV and a vehicle in accordance with an embodiment of the invention. A UAV 1310 may communicate with a companion vehicle 1320. In some instances, direct communication 1340 may be provided between the UAV and the vehicle. In other instances, indirect communications 1350, 1360 may occur between the UAV and the vehicle, with the aid of one or more intermediary device.

The UAV 1310 may wirelessly communicate with a companion vehicle 1320. The wireless communication may include data from the UAV to the vehicle and/or data from the vehicle to the UAV. In some instances, the data from the vehicle to the UAV may include commands that may control the operation of the UAV. The UAV may be capable of taking off from its companion vehicle and/or landing on its companion vehicle.

In some instances, the UAV 1310 may communicate with the companion vehicle 1320 directly. A direct communication link 1340 may be established between the UAV and the companion vehicle. The direct communication link may remain in place while the UAV and/or the companion vehicle are in motion. The UAV and/or the companion vehicle may be moving independently of one another. Any type of direct communication may be established between the UAV and vehicle. For example, WiFi, WiMax, COFDM, Bluetooth, IR signals, directional antennas or any other type of direct communication may be employed. Any form of communication that occurs directly between two objects may be used or considered.

In some instances, direct communications may be limited by distance. Direct communications may be limited by line of sight, or obstructions. Direct communications may permit fast transfer of data, or a large bandwidth of data compared to indirect communications.

Indirect communications may be provided between the UAV 1310 and the companion vehicle 1320. Optionally, indirect communications may include one or more intermediary device 1330 between the vehicle and the external device. In some examples the intermediary device may be a satellite, router, tower, relay device, or any other type of device. Communication links may be formed between a UAV and the intermediary device 1350 and communication links may be formed between the intermediary device and the vehicle 1360. Any number of intermediary devices may be provided, which may communicate with one another. In some instances, indirect communications may occur over a network, such as a local area network (LAN) or wide area network (WAN), such as the Internet. In some instances, indirect communications may occur over a cellular network, data network, or any type of telecommunications network (e.g., 3G, 4G). A cloud computing environment may be employed for indirect communications.

In some instances, indirect communications may be unlimited by distance, or may provide a larger distance range than direct communications. Indirect communications may be unlimited or less limited by line of sight or obstructions. In some instances, indirect communications may use one or more relay device to aid in direct communications. Examples of relay devices may include, but are not limited to satellites, routers, towers, relay stations, or any other type of relay device.

A method for providing communications between an unmanned aerial vehicle and a vehicle may be provided, where the communication may occur via an indirect communication method. The indirect communication method may comprise communication via a mobile phone network, such as a 3G or 4G mobile phone network. The indirect communications may use one or more intermediary devices in communications between the vehicle and the UAV. The indirect communication may occur when the vehicle is in motion.

Any combination of direct and/or indirect communications may occur between different objects. In one example, all communications may be direct communications. In another example, all communications may be indirect communications. Any of the communication links described and/or illustrated may direct communication links or indirect communication links. In some implementations, switching between direct and indirect communications may occur. For example, communication between a vehicle and a UAV may be direct communication, indirect communication, or switching between different communication modes may occur. Communication between any of the devices described (e.g., vehicle, UAV) and an intermediary device (e.g., satellite, tower, router, relay device, central server, computer, tablet, smartphone, or any other device having a processor and memory) may be direct communication, indirect communication, or switching between different communication modes may occur.

In some instances, the switching between communication modes may be made automatically without requiring human intervention. One or more processors may be used to determine to switch between an indirect and direct communication method. For example, if quality of a particular mode deteriorates, the system may switch to a different mode of communication. The one or more processors may be on board the vehicle, on board the UAV, on board a third external device, or any combination thereof. The determination to switch modes may be provided from the UAV, the vehicle, and/or a third external device.

In some instances, a preferable mode of communication may be provided. If the preferable mode of communication is inoperational or lacking in quality or reliability, then a switch may be made to another mode of communication. The preferable mode may be pinged to determine when a switch can be made back to the preferable mode of communication. In one example, direct communication may be a preferable mode of communication. However, if the UAV flies too far away, or obstructions are provided between the UAV and the vehicle, the communications may switch to an indirect mode of communications. In some instances, direct communications may be preferable when a large amount of data is transferred between the UAV and the vehicle. In another example, an indirect mode of communication may be a preferable mode of communication. If the UAV and/or vehicle needs to quickly transmit a large amount of data, the communications may switch to a direct mode of communications. In some instances, direct communications may be preferable when the UAV is flying at significant distances away from the vehicle and greater reliability of communication may be desired.

Switching between communication modes may occur in response to a command. The command may be provided by a user. The user may be an operator and/or passenger of the vehicle. The user may be an individual controlling the UAV.

In some instances, different communication modes may be used for different types of communications between the UAV and the vehicle. Different communication modes may be used simultaneously to transmit different types of data.

Figure 14:
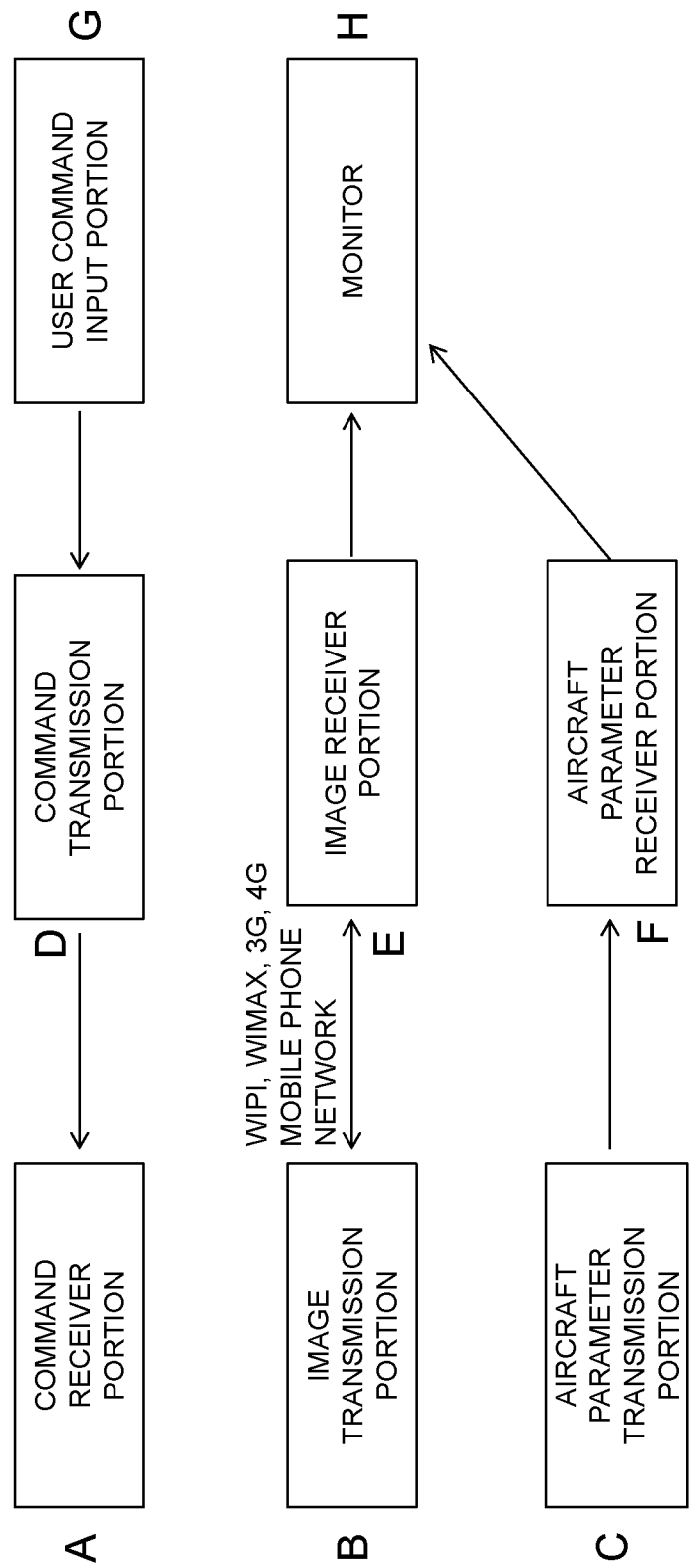
FIG. 14 shows an example of communication flow in accordance with an embodiment of the invention.

FIG. 14 shows an example of communication flow in accordance with an embodiment of the invention. A UAV and vehicle may communicate with one another. For example, commands may be transmitted between the UAV and the vehicle. In some instances, images may be transmitted between a UAV and vehicle. UAV parameter data may be transmitted between the UAV and the vehicle.

Various communication units may be provided between the UAV and the vehicle. For example, a command receiver portion A, an image transmission portion B, and an aircraft parameter transmission portion C may be provided for a UAV. These portions may be provided on-board the UAV. A command transmission portion D, user command input portion G, image receiver portion E, aircraft parameter receiver portion F, and monitor H may be provided for a vehicle. These portions may be provided on-board the vehicle.

Control commands may be provided from a vehicle to a UAV. A user may input a command via a user command input portion G from the vehicle's end. The user may be an operator of the vehicle and/or a passenger of the vehicle. A user may be any individual that may be controlling the UAV. The user may be manually controlling the UAV in real-time. The user may be selecting one or more commands to send to the UAV, and the UAV may fly autonomously and/or semi-autonomously in response to the commands. The user may be controlling the UAV while driving the vehicle. In other instances, the user controlling the UAV may not be the driver of the vehicle.

The user command input portion G may be provided within the vehicle. In some instances, as discussed in greater detail further below, the user command input portion may be part of the vehicle. The user command input portion may be built-into the vehicle and/or may not be removable from the vehicle. The user command input portion may be separable and/or removable from the vehicle. The user command input portion may be freely brought in or out of the vehicle.

The user command input portion may receive an input in any manner, such as those described in greater detail below. In some examples, the input may be provided via touch (e.g., touchscreen, button, joystick, slider, switch), audio signal (e.g., voice commands), detected images (e.g., gesture recognition, blinking or eye movements), positioning of the portion (e.g., via inertial sensors sensing tilt, movement, etc.).

A command transmission portion D may transmit the command from the user command input portion G to the UAV. The command transmission portion may wirelessly transmit the information, or transmit the information via a wired connection. The command may be received by a command receiver portion A on board the UAV.

In some instances, the commands between the command transmission portion D of the vehicle and the command receiver portion A of the UAV may be direct communications. Point-to-point direct communications may be employed to transmit control commands from a vehicle to a UAV.

The user may send any type of command to the UAV. The command may control the motion of the UAV. The command may control the flight of the UAV. The command may control the takeoff and/or landing of the UAV. The command may be a direct manual control of the motion of the UAV. The command may directly correspond to rotation of one or more rotors on-board the UAV. The command may be used to control the position, orientation, velocity, angular velocity, acceleration, and/or angular acceleration of the UAV. The command may cause the UAV to increase, decrease, or maintain altitude. The command may cause the UAV to hover in place. The command may include instructions to initiate a preset sequence or flight mode. For example, the command may initiate a sequence that causes the UAV to take off and/or land on the vehicle. The command may initiate a sequence that causes the UAV to fly with a particular pattern relative to the vehicle.

The command may also control a component of the UAV, such as a payload or sensor. For example, the command may control operation of the payload. The command may manually control operation of the payload and/or cause the payload to operate in a preset manner. The command may cause the payload to operate autonomously or semi-autonomously. The command may affect the orientation of the payload. The command may cause the payload to alter or maintain its orientation relative to the UAV. The payload may be instructed to rotate about one or more axes, two or more axes, or three or more axes. Other functions of the payload may be controlled remotely, such as when the payload is camera, instructions may be provided whether to zoom in or out, whether to enter a static image or video shooting mode, whether to adjust the image resolution or quality, or any other type of image capturing modes. In another example, if the payload is an illumination device, the degree or illumination may be controlled, the illumination device may be turned on or off, or a blinking pattern provided by the illumination device.

The command may control any sensor of the UAV. For example, the command may affect operation of a GPS receiver, inertial sensor, ultrasonic sensor, lidar, radar, wind sensor, temperature sensor, magnetic sensor, or any other component of the UAV. The command may cause the UAV to send back data regarding the state of the UAV or the surrounding environment.

In some embodiments, it may be important that the UAV be reliably controlled by a user in the vehicle. Thus, the commands sent by the user controlling the UAV may need to be reliable. In some instances, the communications from the command transmission portion D to the command receiver portion A may use frequency hopping spread spectrum (FHSS) techniques. Thus, radio signals may be sent from the command transmission portion to the command receiver portion by rapidly switching a carrier among many frequency channels. In some instances, the sequence may be a pseudorandom sequence known by both the transmission portion and the receiver portion. FHSS may advantageously be resistant to narrowband interference. The spread-spectrum signals may be difficult to intercept and may appear as background noise to a narrowband receiver. FHSS techniques may also share a frequency band with many types of conventional transmissions with minimal interference. The spread-spectrum signals may add minimal noise to the narrow-frequency communications, and vice versa.

Image data may be provided from a UAV to a vehicle. An image may be captured using an image capturing device on-board the UAV, such as a camera. An image transmission portion B may transmit the image to an image receiver portion E. The image receiver portion may optionally cause the image to be displayed on a monitor H. The image transmission portion may be provided on-board the UAV. The image receiver portion may be provided on-board the vehicle. The monitor may optionally be provided on-board the vehicle.

Images from a UAV camera may be transmitted to a vehicle in real-time. The images may be displayed on a vehicle monitor. The images may be captured with aid of a camera. The camera may be a high-resolution camera. The camera may be capable of capturing images and having a resolution of at least 1 MP, 2 MP, 3 MP, 4 MP, 5 MP, 6 MP, 7 MP, 8 MP, 9 MP, 10 MP, 11 MP, 12 MP, 13 MP, 14 MP, 15 MP, 16 MP, 18 MP, 20 MP, 24 MP, 26 MP, 30 MP, 33 MP, 36 MP, 40 MP, 45 MP, 50 MP, 60 MP, or 100 MP. The camera may optionally take pictures having fewer megapixels than any of the values described. The camera may be able to take pictures having megapixels falling into a range between any two of the values described herein. The resolution of the images to be captured may be modified in response to a command or a detected condition. For example, a user may be able to specify for a camera to take images in a high-resolution mode, or in a lower resolution mode.

The images may include still images (snapshots) or moving images (e.g., streaming video). Images may be captured at a video rate. In some instances, images may be captured at greater than about 10 Hz, 20 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, or 100 Hz frequency. The images may be captured at a rate lower than any of the values described herein. The images may be captured at a rate falling between any two of the frequencies described herein.

The camera may be capable of moving relative to the UAV. The camera may be supported by a carrier that may permit the camera to move about one or more axes, two or more axes, or three or more axes of rotation. The carrier may or may not permit translation of the camera in one direction, two directions, three directions or more. In some instances, the carrier may include a gimbal arrangement that may permit rotation of one or more frame assembly relative to another frame assembly and/or the UAV. The camera may be oriented to a desired orientation to capture an image to be transmitted.

The image captured by the camera may be transmitted using an image transmission portion B. The image transmission portion may be provided on board the UAV. The image transmission portion may be part of the camera. For example, the camera of the UAV may transmit the image data directly. In another example, the image transmission portion may be on board the UAV without being part of the camera. For example, the camera may communicate the image data to a separate image transmission portion, which may transmit the image data. The camera may be connected to the image transmission portion via a wired or wireless connection.

An image transmission portion B may transmit the image data to the vehicle. The image transmission portion may wirelessly transmit the information, or transmit the information via a wired connection. The image data may be received by an image receiver portion E on board the vehicle. The image receiver portion may or may not be part of the vehicle itself. For example, the image receiver portion may be removable and/or separable from the vehicle.

In some instances, the image data between the image transmission portion B of the UAV and the image receiver portion E of the vehicle may be provided direct communications. Point-to-point direct communications may be employed to transmit image data from the UAV to the vehicle. In alternative embodiments, indirect communications may be used to transmit the image data from the UAV to the vehicle.

Optionally, the transmission of image data may take up more bandwidth than the transmission of commands to the UAV. In some instances, a quicker connection may be desired to permit greater rates of data transfer. Also optionally, it may be less critical for the image data transmission to be reliable relative to the command data to the UAV. Thus, reliability of the communication link from the UAV to the vehicle may be less important. In some instances, the communications from the image transmission portion B to the image receiver portion E may use a point-to-point technique, such as WiFi, WiMax, COFDM, IR, Bluetooth, or any other type of point-to-point technique. In some instances, the communications may use indirect techniques, such as a public mobile network, or any telecommunications networks, such as those described herein.

Optionally a single mode of communication may be used for the image data transmission. In other instances, modes of communication may be switched depending on detected conditions. For example, a default direct communication may be used to transmit image data. However, when the direct communication link becomes less reliable, the communication mode may be switched to transmit data via an indirect communication link. Once the direct communication link is determined to be reliable again, the communication mode may switch back to the direct communication link. In other instances, no default mode may be provided, and the switching may occur when it is detected that the current communication mode is no longer performing as well, or when the other connection is more reliable. A user may not be able to dictate when the communication modes may switch. Alternatively, the communication modes may switch automatically without requiring user input. A processor may use data to make an assessment whether to switch communication modes.

The image data received by the image receiver portion E may be displayed on a monitor H. The monitor may be on board the vehicle. The monitor may be built into the vehicle and/or integral to the vehicle. The monitor may be any object within or on-board the vehicle. The monitor may or may not be removable and/or separable from the vehicle. It may or may not be possible to take the monitor out of the vehicle or off-board the vehicle. The monitor may or may not be portable. The connection between the image receiver portion and the monitor may be wired or wireless.

The monitor may include a user interface that may display data. The user interface may include a screen, such as a touchscreen, or any other type of display. The monitor may be capable of displaying images based on the image data received from the image receiver portion. The images may include real-time images captured by the camera on-board the UAV. This may include real-time streaming video that is captured by the UAV camera. The images may be displayed on the monitor on board the vehicle within less than about 30 seconds, 20 seconds, 10 seconds, 5 seconds, 3 seconds, 2 seconds, 1.5 seconds, 1 seconds, 500 ms, 300 ms, 100 ms, 50 ms, 10 ms, 5 ms, or 1 ms of being captured by the camera on board the UAV. The images may be displayed in high definition or in low definition. The images may be displayed at the resolution they are captured, or at a lower resolution than that they are captured. The images may be displayed at the frame rate at which they are captured, or at a lower frame rate than at which they are captured.

A user on-board the vehicle may be able to see the images displayed on the monitor. The user on-board the vehicle may advantageously be able to see images captured by the UAV, which may show images of objects or locations that may otherwise not be viewable from the user while on-board the vehicle. The user may have a bird's eye view of the user's surrounding environment on the monitor.

Aircraft parameter data may be provided from a UAV to a vehicle. The aircraft parameter data may include information about the state of the UAV and/or data captured by sensors of the UAV. An aircraft parameter transmission portion C may transmit the aircraft parameter data to an aircraft parameter receiver portion F. The aircraft parameter receiver portion may optionally cause the image to be displayed on a monitor H. The aircraft parameter transmission portion may be provided on-board the UAV. The aircraft parameter receiver portion may be provided on-board the vehicle. The monitor may optionally be provided on-board the vehicle.

Aircraft parameter data may be transmitted to a vehicle in real-time. The aircraft parameter data or information generated based on the aircraft parameter data may be displayed on a vehicle monitor. The aircraft parameter data may include any data relating to a state of the aircraft and/or data captured by one or more sensors of the aircraft.

In some embodiments, the state of the aircraft may include positional data relating to the aircraft. For example, the positional data may include location of the aircraft (e.g., coordinates such as latitude, longitude, and/or altitude), orientation of the aircraft (e.g., about a pitch axis, yaw axis, and/or roll axis), velocity of the aircraft, angular velocity of the aircraft, acceleration of the aircraft, and/or angular acceleration of the aircraft. In some instances, one or more inertial sensors and/or location related sensors (e.g., GPS, vision sensors, lidar, ultrasonic sensors) may aid in determining position data for the aircraft. The state of the aircraft may include other data, such as temperature of the aircraft or one or more components of the aircraft. One or more temperature sensors may aid in determining the temperature of the aircraft. The state of the aircraft may include other data, such as the state of charge of a battery of the aircraft. The state of the aircraft may also detect whether an error condition is provided for the aircraft or any components of the aircraft. The state of the aircraft may include whether one or more receiver is not receiving signals, or one or more components of the aircraft is not operating as expected.

Data collected by one or more sensors of the aircraft may include environmental data for the aircraft. For example, environmental data may include temperature, wind speed and/or direction, presence or absence of precipitation, detected obstacles or obstructions, detected noise or signal interference, or any other data that may be picked up by a sensor of the aircraft. Examples of aircraft sensors may include but are not limited to vision sensors, infrared sensors, lidar, radar, sonar, ultrasonic sensors, inertial sensors (e.g., accelerometers, gyroscopes, magnetometers), magnetic sensors, electric field sensors, acoustic sensors, microphones, or any other type of sensors.

In some instances, the aircraft parameter data may be useful for controlling the aircraft. In some instances, one or more commands may be generated in response to aircraft parameter data received. The commands may be manually generated by a user who may consider the aircraft parameter data received. In other examples, the commands may be automatically generated by a processor that may use the aircraft parameter data to formulate the commands.

The aircraft parameter data may be transmitted using an aircraft parameter transmission portion C. The aircraft parameter transmission portion may be provided on board the UAV. The aircraft parameter transmission portion may be part of a sensor or component of the UAV. In another example, the aircraft parameter transmission portion may be on board the UAV without being part of the sensor or other component. For example, a sensor may communicate the aircraft parameter data to a separate aircraft parameter transmission portion, which may transmit the aircraft parameter data. The sensor may be connected to the aircraft parameter transmission portion via a wired or wireless connection.

An aircraft parameter transmission portion C may transmit the aircraft parameter data to the vehicle. The aircraft parameter transmission portion may wirelessly transmit the information, or transmit the information via a wired connection. The aircraft parameter may be received by an aircraft parameter receiver portion F on board the vehicle. The aircraft parameter receiver portion may or may not be part of the vehicle itself. For example, the aircraft parameter receiver portion may be removable and/or separable from the vehicle.

In some instances, the data between the aircraft parameter transmission portion C of the UAV and the aircraft parameter receiver portion F of the vehicle may be provided via direct communications. Point-to-point direct communications may be employed to transmit aircraft parameter data from the UAV to the vehicle. In alternative embodiments, indirect communications may be used to transmit the aircraft parameter data from the UAV to the vehicle.

In some instances, the communications from the aircraft parameter transmission portion C to the aircraft parameter receiver portion F may use a point-to-point technique, such as WiFi, WiMax, COFDM, IR, Bluetooth, or any other type of point-to-point technique. In some instances, the communications may use indirect techniques, such as a public mobile network, or any telecommunications networks, such as those described herein.

In some instances, narrow band frequency-shift keying (FSK), gaussian frequency-shift keying (GFSK), or other modulation techniques may be used. The data may be transmitted via a frequency modulation scheme where digital information is transferred through discrete frequency changes of a carrier wave. Alternatively, the aircraft parameter data may be embedded in the image data signal (e.g., embedded in a video signal).

Optionally a single mode of communication may be used for the aircraft parameter data transmission. In other instances, modes of communication may be switched depending on detected conditions. For example, a default direct communication may be used to transmit aircraft parameter data. However, when the direct communication link becomes less reliable, the communication mode may be switched to transmit data via an indirect communication link. Once the direct communication link is determined to be reliable again, the communication mode may switch back to the direct communication link. In other instances, no default mode may be provided, and the switching may occur when it is detected that the current communication mode is no longer performing as well, or when the other connection is more reliable. A user may not be able to dictate when the communication modes may switch. Alternatively, the communication modes may switch automatically without requiring user input. A processor may use data to make an assessment whether to switch communication modes.

Aircraft parameter data transmitted back to vehicles may be important. Thus it may be desirable to provide a reliable connection. If the aircraft exceeds a point-to-point communication range with the vehicle (e.g., such as a controller's control range), a safer method may be for the vehicle and the aircraft to also maintain communication, so that the aircraft and the vehicle can know one another's positions. Thus, it may be desirable for the aircraft and the vehicle to be able to communicate using an indirect communication method, such as using mobile phone networks, so as to obviate a communication range limitation that may be provided using point-to-point communication techniques.

The aircraft parameter data received by the aircraft parameter receiver portion F may be displayed on a monitor H. The monitor may be on board the vehicle. The monitor may be built into the vehicle and/or integral to the vehicle. The monitor may be any object within or on-board the vehicle. The monitor may or may not be removable and/or separable from the vehicle. It may or may not be possible to take the monitor out of the vehicle or off-board the vehicle. The monitor may or may not be portable. The connection between the aircraft parameter receiver portion and the monitor may be wired or wireless. The monitor displaying the aircraft parameter data may be the same monitor as a monitor displaying image data. Alternatively, separate monitors may be provided. In some instances, a single monitor may be used to show aircraft parameter data. Alternatively, multiple monitors may be used to show aircraft parameter data.

The monitor may include a user interface that may display data. The user interface may include a screen, such as a touchscreen, or any other type of display. The monitor may be capable of displaying data relating to the aircraft parameter data received from the aircraft parameter receiver portion. The data may be shown in real time. The aircraft parameter data or data generated based on the aircraft parameter data may be displayed on the monitor on board the vehicle within less than about 30 seconds, 20 seconds, 10 seconds, 5 seconds, 3 seconds, 2 seconds, 1.5 seconds, 1 seconds, 500 ms, 300 ms, 100 ms, 50 ms, 10 ms, 5 ms, or 1 ms of being sensed or captured on board the UAV.

A user on-board the vehicle may be able to see information relating to the aircraft parameter data displayed on the monitor. The data may include words, numerical values, and/or images. In one example, the location of the UAV may be indicated on the monitor. For instance, a map may be provided showing the location of the UAV relative to the vehicle and/or a geographic feature. Examples of geographic features may include roads, structures, city lines, bodies of water, mountains, or other environmental features. The data may optionally show a visual representation of the UAV and one or more component of the UAV that may be malfunctioning or in an error state. In another example, the data may include a visual indicator of the level of charge of a battery of the UAV.

In some embodiments, for any of the communications provided between one or more component of or on-board the UAV or the vehicle, point-to-point communications may be desirable. It may also be desirable to permit indirect communication between the UAV and the vehicle. For any communication method, it may be desirable to provide a backup communication method. In some instances, it may be desirable to provide a backup communication method that can come into effect when the UAV exceeds a point-to-point communication range or when there are obstacle blocking the communication. It may be desirable to provide a backup communication method that may come into effect where there is interference or noise impeding efficacy of a primary communication method. It may be desirable to provide a backup communication method when a primary communication method may be hacked or hijacked by an interloper. It may be desirable to provide a backup communication method when the primary communication method becomes unreliable or compromised in quality for any reason.

Figure 15:
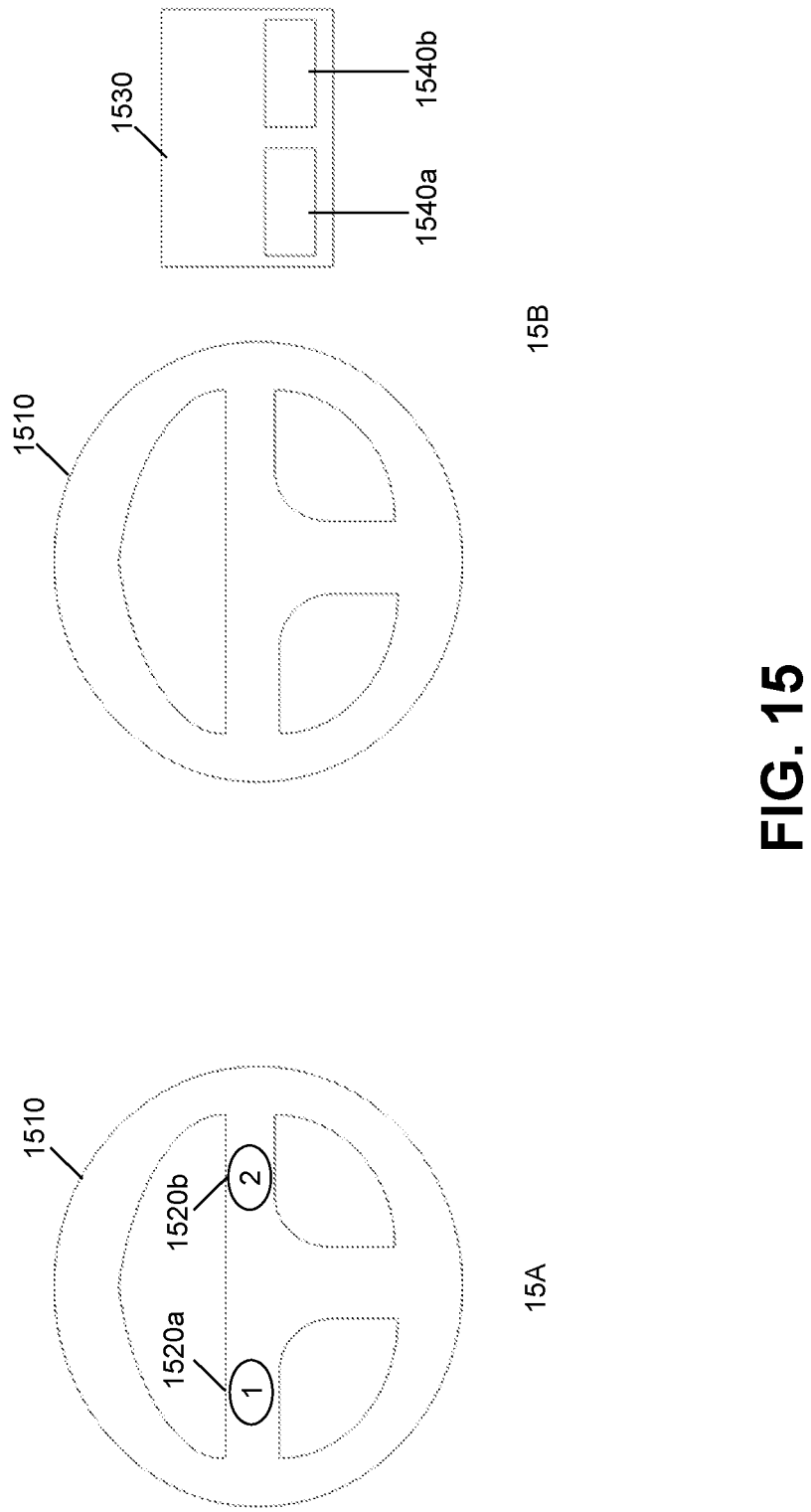
FIG. 15 shows an example of a UAV control mechanism in accordance with an embodiment of the invention.

FIG. 15 shows an example of a UAV control mechanism in accordance with an embodiment of the invention. The UAV control mechanism may be part of a vehicle. The UAV control mechanism may be added to the vehicle at a manufacturer site. The UAV control mechanism may be integral to the vehicle and/or not designed to be separable or removed from the vehicle. The UAV control mechanism may be built into a normal component of the vehicle.

The UAV control mechanism may be a user input component through which a user may input a command that may control the UAV or a component of the UAV. The UAV control mechanism may accept a user command that may result in affecting the flight of the UAV. The user command may include manually controlling the flight of the UAV. For example, the user may directly control the position, location (e.g., latitude, longitude, altitude), orientation, speed, angular velocity, acceleration, and/or angular acceleration of the UAV. The user command may initiate a predetermined flight sequence of the UAV. For example, the user command may cause the UAV to undock and/or take off from a vehicle. The user command may cause the UAV to dock with and/or land on a vehicle. The user command may cause the UAV to fly in accordance with a preset path relative to the vehicle. The user command may cause the UAV to fly autonomously or semi-autonomously.

The user command may control any other component of the UAV as described elsewhere herein. For example, the UAV control mechanism may accept a user input that may control a payload on board the UAV, such as a camera or illumination device, a carrier of the UAV, one or more sensors of the UAV, or any other features of the UAV. In some instances, the command may result in controlling positioning of a payload, sensor, or any other component of the UAV. The command may result in controlling operation of the payload, sensor, or any other component of the UAV. The user control mechanism may be capable of accepting a single type of input from the user or a variety of inputs from the user.

The UAV control mechanism may be built into the vehicle. For example, the UAV control mechanism may include one or more user input components that are built into a steering wheel of the vehicle, as illustrated in FIG. 15A. The steering wheel may be used to control the direction of the vehicle. The steering wheel may turn about an axis. The axis may pass through a central region or shaft of the steering wheel. For example, the steering wheel 1510 may include one or more buttons 1520*a*, 1520*b* that may accept user inputs. The user input components may be any type of user interface or input device. For example, the user input components can include buttons, switches, knobs, joysticks, trackballs, mouse, keyboards, touchpads, touchscreens, light pointer, image capture devices, thermal imaging devices, microphones, inertial sensors, or any other user input components or combinations thereof. The user input components may be wearable user input components. For example, the user input components may be worn by a driver and/or passenger of the vehicle. The user input components may be worn on a user's head, face, neck, arms, hands, torso, legs, or feet.

A user input may be any type of input from a user. For example, the input may be a touch input from a user, a voice input from a user, a gesture from a user, a facial expression of a user, an adjustment of an orientation or position of a body part of the user, or any other type of input from a user. The user input may be provided while the vehicle is operational. The user input may be provided while the vehicle is moving. The user input may be provided while the vehicle is idling or stationary. The user input may be provided while the user is operating the vehicle. The user input may be provided while the user is driving the vehicle. The user may optionally be a passenger of the vehicle. The user input may be provided while the user is within the vehicle.

FIG. 15B shows an additional example of a UAV control mechanism. For example, a steering wheel may be provided 1510 and may not have any user input components thereon. A display panel 1530 may be provided for the vehicle. The display panel may optionally be built into the vehicle. The display panel may be an integral screen to the vehicle. Alternatively, the display panel may be separable and/or removable from the vehicle. One or more user input components 1540*a*, 1540*b* may be provided. The user input components may be regions on a touchscreen. A user may touch a region of a display in order to provide user commands.

In other examples, the user input component may be built into any component of the vehicle, such as a steering wheel, dashboard, built-in monitor, seat, window, mirror, shift stick, door panel, foot pedal, floor, cup-holder, or any other part of the vehicle. For example, the shift stick, which may be used to change between different drive or gear modes, may have an input component built therein. For example, the shift stick may permit a vehicle operator to switch between drive, neutral, reverse, or different gear levels. The user input component may be within arm's reach of a driver of the vehicle. The user input component may be within arm's reach of a passenger of the vehicle. The user input component may be within leg's reach of the driver and/or passenger of the vehicle. The user input component may be within the line of sight of the driver and/or passenger of the vehicle. The user input component may be within the line of sight of the driver and/or passenger of the vehicle when the driver and/or passenger is facing substantially forward. In one example, the user input component may be designed so that the driver may be able to provide a user command without taking the driver's eyes off the road. This may advantageously permit operation of the UAV in a safer manner.

In one example, when a user is providing commands via a user input component on a steering wheel, a user may be able to keep the user's eyes on the roads and the user's hands on the steering wheel. In some instances, the user may be able to manipulate controls on a steering wheel to directly manually control the flight of the UAV. For example, manipulating a particular control may cause the UAV to adjust its angle, speed, and/or acceleration (e.g., spatial, and/or rotational) in an amount corresponding to the manipulation of the control. A linear correlation, exponential correlation, reverse correlation, or any other type of correlation may be provided between a user input and a corresponding reaction by the UAV during manual control.

In another example, depressing a button, or other simple inputs may cause the UAV to execute a predetermined flight sequence. In one example, pressing a first button 1520*a* may cause the UAV to take off from a vehicle, while pressing a second button 1520*b* may cause a UAV to land on the vehicle. In another example, a first button may cause a UAV to fly in a first flight pattern with respect to the vehicle, and pressing a second button may cause the UAV to flight in a second flight pattern with respect to the vehicle. This may permit the UAV to execute complicated maneuvers without requiring much involvement or engagement by the user. This may be advantageous in situations where the user is a driver who needs to pay attention to driving the vehicle.

Additionally, other remote control components may be provided in the vehicle. For example, besides a takeoff and return button, a set of remote control joysticks may be provided. In some instances, the remote control joysticks may be accessible by a driver of a car, or by a passenger of a car. In some embodiments, the remote control joysticks may be accessible by both the driver and the passenger of the car. A driver or passenger may use the remote control joysticks to control the aircraft according to image data that may be transmitted to a monitor in the vehicle. The remote control joysticks may be affixed to a portion of the vehicle or may be provided on a tether or may be movable relative to the portion of the vehicle. For example, the remote control joysticks may be passed from occupant to occupant of the vehicle.

Examples of simple inputs that may not require much driver engagement may include pressing a button, pressing a touchscreen, flipping a switch, turning a nob, providing a voice command, providing a simple gesture, making a facial expression, or any other type of simple movement that may elicit a response by the UAV. In some instances, simple input may include a one-touch or one-motion type of input. For example, pressing a single button or pressing or swiping a single portion of a touchscreen may be a simple input that may control a UAV or component thereof.

As previously described, the user input components may be part of the vehicle. The user input components may be permanently affixed to the vehicle and/or not designed to be removed from the vehicle. The user input components may be built into the vehicle when the vehicle is manufactured. Alternatively, existing vehicles may be retro-fitted with the user input components. In some instances, one or more components of a vehicle may be swapped out to be upgraded to a vehicle component having the user input components. For example, a normal steering wheel may be swapped out for a new steering wheel that may have user input components to control the UAV. In another example, a component may be added to an existing structure of the vehicle to provide user input components. For example, a steering wheel cover may be added to an existing steering wheel that may have user input components, such as buttons, thereon. In another example, a vehicle shift stick cover may be provided that may have one or more user input components thereon.

In some instances, software of a vehicle may be updated. The software may be able to take the user input of the user input components and translate it to data that may be used to control the UAV. In one example, a vehicle may have a built-in display. The display software may be updated to show user input components that may accept user input and be translated to commands to the UAV. In another example, the vehicle may have buttons or components, where the software may be updated to cause user inputs to the buttons or other components to be interpreted and translated to commands to the UAV.

Thus, a vehicle may have one or more hardware component that may accept a user input for the control of a UAV (or component thereof). The vehicle may have one or more processors configured to execute commands that may translate the user input into a command for the control of the UAV.

A method of controlling a UAV may include receiving, at one or more user input components of a vehicle, a UAV control input from a user, wherein the one or more input components are part of the vehicle. A command may be generated, with aid of a processor, to be transmitted to the UAV to control operation of the UAV based on a signal from the user input components. The user input components may receive an input from a user. The user input components may send a signal to a controller of the vehicle. The controller of the vehicle may include one or more processors that may, individually or collectively, execute any steps described herein. The steps may be executed in accordance with non-transitory computer readable media comprising code, logic, or instructions for performing one or more steps. The non-transitory computer readable media may be stored in a memory. The memory may be provided on-board the vehicle. The controller may generate a signal to be sent to a UAV, based on the user input components. For instance, the controller may calculate a command signal that may directly control the UAV and/or any components of the UAV. In other instances, the controller may pre-process and/or relay the signals from the input components to be sent to the UAV. The UAV may have an on-board controller that may generate the command signal in response to the signal from the vehicle. The vehicle may have a communication unit in communication with the vehicle controller. The UAV may have a communication unit in communication with the UAV controller.

The communication unit of the vehicle and the communication unit of the UAV may communicate with one another. The communications may be wireless communication. The communications may be direct communications or indirect communications. The communication units may be capable of switching between different communication modes. The communication units may provide one-way communications (e.g., from the UAV to the vehicle, or from the vehicle to the UAV). The communication units may provide two-way communications between the vehicle and the UAV. In some instances, multiple communication units may be provided between the vehicle and the UAV. The different communication units may be used for the transmission of different types of data or different directions of data. In other instances, single communication units may be provided for all types and/or directions of communication.

A display 1530 may be provided on-board a vehicle. The display may be within the vehicle. The display may be part of any component of the vehicle. For example, the display may be built into the dashboard, window, steering wheel, door panel, seat, or any other portion of the vehicle. The display may be within arm's reach of a driver and/or passenger of the vehicle. The display may be within the line of sight of a driver and/or passenger of the vehicle. The display may be within the line of sight of a driver and/or passenger of the vehicle when the driver and/or passenger is facing forward.

The display may be a part of the vehicle when the vehicle is manufactured. The display may be added to the vehicle at a manufacturer's site. In other examples, existing vehicles may be retrofitted with the display. The display may be permanently affixed to the vehicle and/or not designed to be separated from and/or removed from the vehicle. The display may be integral to any part of the vehicle. In other instances, the display may be removable and/or separable from the vehicle. The display may be attached to a display receiving dock of the vehicle. The display receiving dock may have a complementary shape that may receive the display. The display receiving dock may or may not include electrical connectors that may electrically connect the display with other components of the vehicle. For example, the electrical connectors may electrically connect the display to a communication unit of the vehicle. When images or other data are received at the communication unit of the vehicle, they may be transmitted via an electrical connector to the display.

In one example, a removable or separable display may be a mobile device of a user. For example, the display may be a smartphone (e.g., iPhone, Galaxy, Blackberry, Windows phone, etc.), tablet (e.g., iPad, Galaxy, Surface, etc.), laptop, personal device assistant, or any other type of display device. The display may be held in a user's hand or on a user's lap. Optionally, a mount may be provided on the vehicle to which the display may attach. The mount may physically support the display relative to the rest of the vehicle. The mount or may not provide additional electrical and/or data connections between the display and the rest of the vehicle.

The display may show information based on data received from a UAV. The display may be a monitor that may be viewable from within the vehicle. For example, the display may show image data captured by a UAV. The image data may optionally be shown in real-time. For example, if a camera of the UAV is capturing video, live streaming video may be shown on the display. The display may show information relating to the UAV, such as a state of the UAV.

The information may show environmental information around the UAV. For example, environmental conditions, such as temperature, wind speed and/or direction, sunniness, precipitation, or air pressure may be shown. The display may optionally show a map which may show the location of the UAV relative to the vehicle and/or one or more geographic features. The position of the UAV and/or vehicle may be updated in real-time. Thus, a user may be able to track how the UAV and/or vehicle are moving in their geographical contexts or relative to one another. The display optionally shows a state of one or more components of the UAV. For example, error conditions or malfunctions of one or more components of the UAV may be displayed. In some examples, the display may show information about a state of charge of one or more batteries of the UAV.

In addition to information relating to the UAV, the display may show information about the vehicle. For example, the display may show information about a location of the vehicle. The display may show information about environmental conditions surrounding the vehicle. Examples of environmental conditions around the vehicle may include temperature, wind speed and/or direction, sunniness, precipitation, or air pressure. The display may show other information about the surroundings of the vehicle. For example, the display may show a map showing roads, traffic level, city lines, bodies of water, structures, natural features, topography, or any other information. The display may aid with navigation of the vehicle. The display may provide route guidance for the vehicle. The display may show other information relating to the vehicle, such as fuel efficiency, level of fuel and/or charge left, malfunction of a component of the vehicle, low battery level, low tire pressure, check engine, parking brake on, or any other data relating to the vehicle.

The display may show information pertaining to a docking station of the vehicle. For example, if a malfunction has occurred on the docking station of the vehicle, the data may be displayed. In some instances, the display may show whether a cover of a docking station is open or closed. The display may show whether a UAV is currently docked to the vehicle, or whether the UAV is in flight and there is currently no UAV docked to the vehicle. In some instances, an image capture device may be provided on board the vehicle. The image capture device may capture an image of the docking station. The image of the docking station may be displayed on the display of the vehicle. This may provide a user with a view of the state of the UAV docking station on the vehicle.

Information on the display may be displayed in real-time. The information may be displayed within any of the time units described elsewhere herein. The information may be displayed and/or updated periodically. The information may be displayed while the vehicle is operational and/or in motion. The information may be displayed while the UAV is docked to the vehicle and/or landed on the vehicle. The information may be displayed while the UAV is in flight.

The display may also show user input components 1540a, 1540b. For example, a touchscreen may show one or more regions for a user to touch to provide user input components. The user input components may be shown simultaneously with the information shown on the display. In one example, a user may input a command that may affect a flight of the UAV. The images captured by the UAV may be streamed in real-time to the display. Thus, the user may be able to see the response of the UAV to the user's input in real-time.

In some instances, a single display may be provided on-board the vehicle. The single display may show any of types of information described herein. In some instances, a combination of the types of information described herein may be displayed. The display may also optionally include user input components. In some implementations, multiple displays may be provided on-board the vehicle. The displays may have any of the characteristics described herein. In some examples, some displays may be affixed or permanently attached to the vehicle while other displays may be removable and/or separable from the vehicle. The displays may individually or collectively show any of the types of information described herein. In some instances, different displays may show different types of information. For example, a first display show images streamed from a UAV while a second display may show location information for the UAV and/or vehicle. Optionally a third display may show information about a docking station of the vehicle. Any number of displays may be provided. One or more, two or more, three or more, four or more, five or more, six or more, seven or more, eight or more, nine or more, or ten or more display may be provided within a vehicle and/or on-board the vehicle. The various displays may show the same information or different information. The various displays may show the same type of information or different types of information. The various displays may show information pertaining to a UAV, environment, vehicle, docking station, and/or any components thereof.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 cm, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 16:
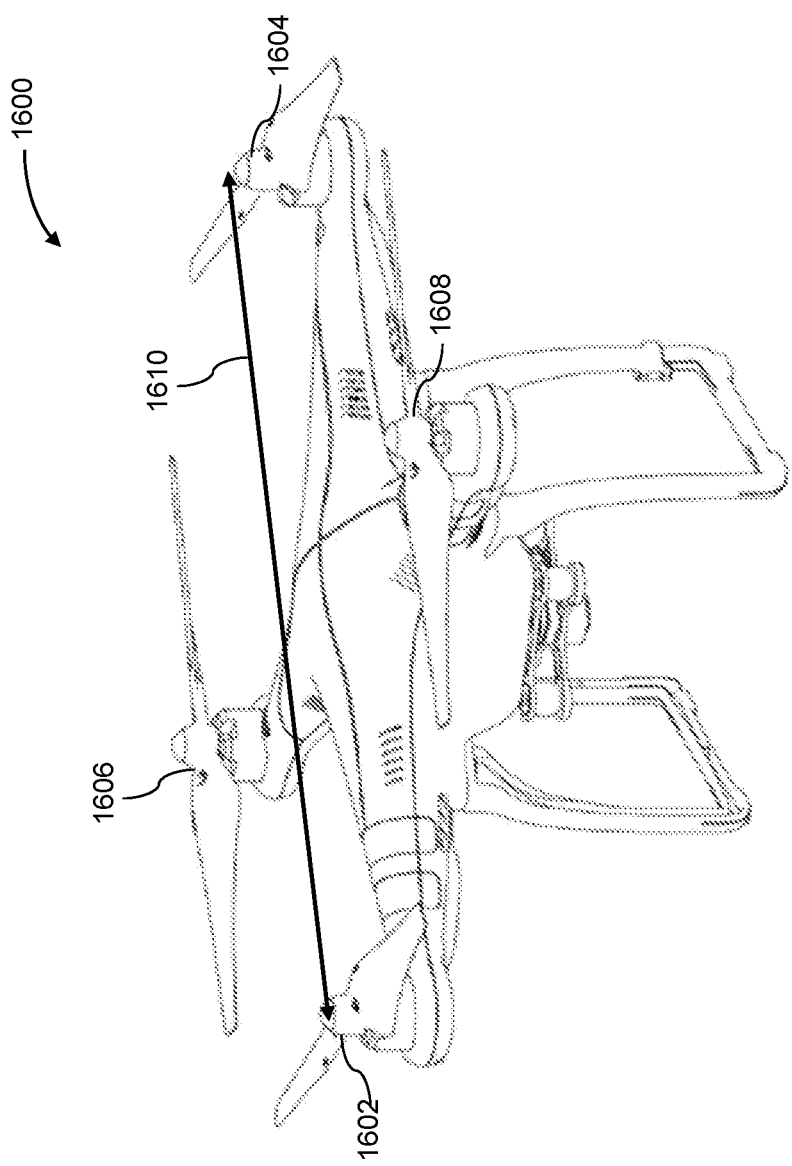
FIG. 16 illustrates an unmanned aerial vehicle, in accordance with an embodiment of the invention.

FIG. 16 illustrates an unmanned aerial vehicle (UAV) 1600, in accordance with embodiments of the present invention. The UAV may be an example of a movable object as described herein. The UAV 1600 can include a propulsion system having four rotors 1602, 1604, 1606, and 1608. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 1610 can be less than or equal to 2 m, or less than equal to 5 m. In some embodiments, the length 1610 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 17:
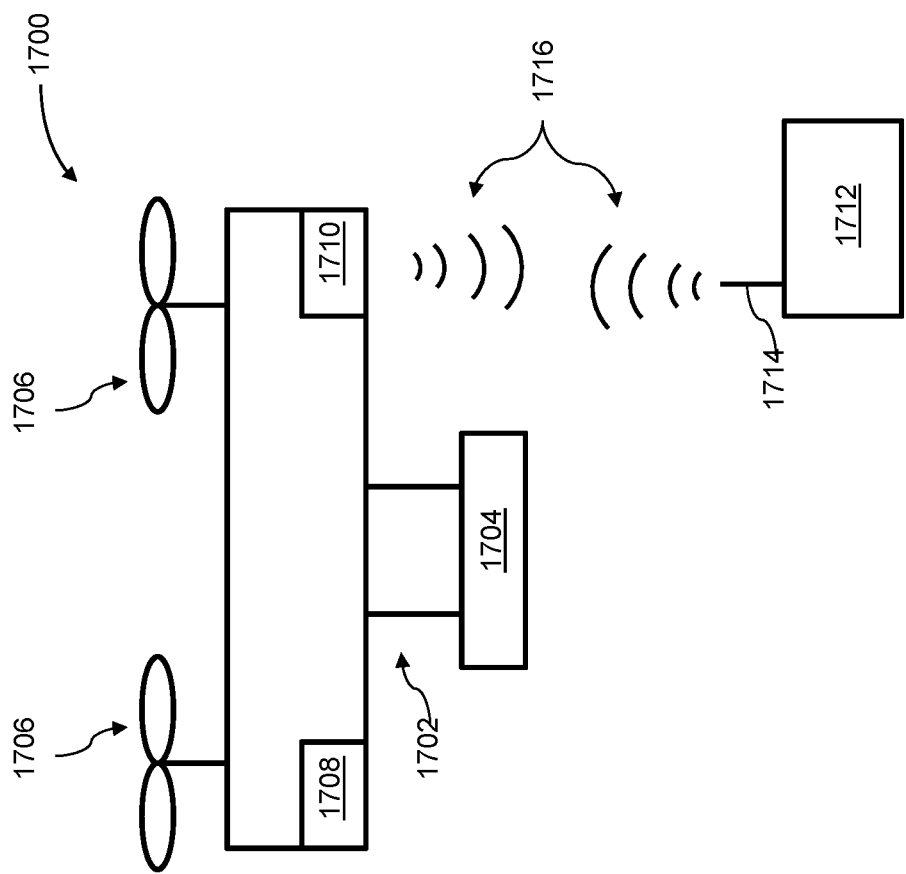
FIG. 17 illustrates a movable object including a carrier and a payload, in accordance with an embodiment of the invention.

FIG. 17 illustrates a movable object 1700 including a carrier 1702 and a payload 1704, in accordance with embodiments. Although the movable object 1700 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1704 may be provided on the movable object 1700 without requiring the carrier 1702. The movable object 1700 may include propulsion mechanisms 1706, a sensing system 1708, and a communication system 1710.

The propulsion mechanisms 1706 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 506 can be mounted on the movable object 1700 using any suitable means, such as a support element (e.g., a drive shaft) as described elsewhere herein. The propulsion mechanisms 1706 can be mounted on any suitable portion of the movable object 1700, such on the top, bottom, front, back, sides, or suitable combinations thereof.

In some embodiments, the propulsion mechanisms 1706 can enable the movable object 1700 to take off vertically from a surface or land vertically on a surface without requiring any horizontal movement of the movable object 1700 (e.g., without traveling down a runway). Optionally, the propulsion mechanisms 1706 can be operable to permit the movable object 1700 to hover in the air at a specified position and/or orientation. One or more of the propulsion mechanisms 1700 may be controlled independently of the other propulsion mechanisms. Alternatively, the propulsion mechanisms 1700 can be configured to be controlled simultaneously. For example, the movable object 1700 can have multiple horizontally oriented rotors that can provide lift and/or thrust to the movable object. The multiple horizontally oriented rotors can be actuated to provide vertical takeoff, vertical landing, and hovering capabilities to the movable object 1700. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1700 (e.g., with respect to up to three degrees of translation and up to three degrees of rotation).

The sensing system 1708 can include one or more sensors that may sense the spatial disposition, velocity, and/or acceleration of the movable object 1700 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1708 can be used to control the spatial disposition, velocity, and/or orientation of the movable object 1700 (e.g., using a suitable processing unit and/or control module, as described below). Alternatively, the sensing system 508 can be used to provide data regarding the environment surrounding the movable object, such as weather conditions, proximity to potential obstacles, location of geographical features, location of manmade structures, and the like.

The communication system 1710 enables communication with terminal 1712 having a communication system 1714 via wireless signals 1716. The communication systems 1710, 1714 may include any number of transmitters, receivers, and/or transceivers suitable for wireless communication. The communication may be one-way communication, such that data can be transmitted in only one direction. For example, one-way communication may involve only the movable object 1700 transmitting data to the terminal 1712, or vice-versa. The data may be transmitted from one or more transmitters of the communication system 1710 to one or more receivers of the communication system 1712, or vice-versa. Alternatively, the communication may be two-way communication, such that data can be transmitted in both directions between the movable object 1700 and the terminal 1712. The two-way communication can involve transmitting data from one or more transmitters of the communication system 1710 to one or more receivers of the communication system 1714, and vice-versa.

In some embodiments, the terminal 1712 can provide control data to one or more of the movable object 1700, carrier 1702, and payload 1704 and receive information from one or more of the movable object 1700, carrier 1702, and payload 1704 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1706), or a movement of the payload with respect to the movable object (e.g., via control of the carrier 1702). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1708 or of the payload 1704). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1712 can be configured to control a state of one or more of the movable object 1700, carrier 1702, or payload 1704. Alternatively or in combination, the carrier 1702 and payload 1704 can also each include a communication module configured to communicate with terminal 1712, such that the terminal can communicate with and control each of the movable object 1700, carrier 1702, and payload 1704 independently.

In some embodiments, the movable object 1700 can be configured to communicate with another remote device in addition to the terminal 1712, or instead of the terminal 1712. The terminal 1712 may also be configured to communicate with another remote device as well as the movable object 1700. For example, the movable object 1700 and/or terminal 1712 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1700, receive data from the movable object 1700, transmit data to the terminal 1712, and/or receive data from the terminal 1712. Optionally, the remote device can be connected to the Internet or other telecommunications network, such that data received from the movable object 1700 and/or terminal 1712 can be uploaded to a website or server.

Figure 18:
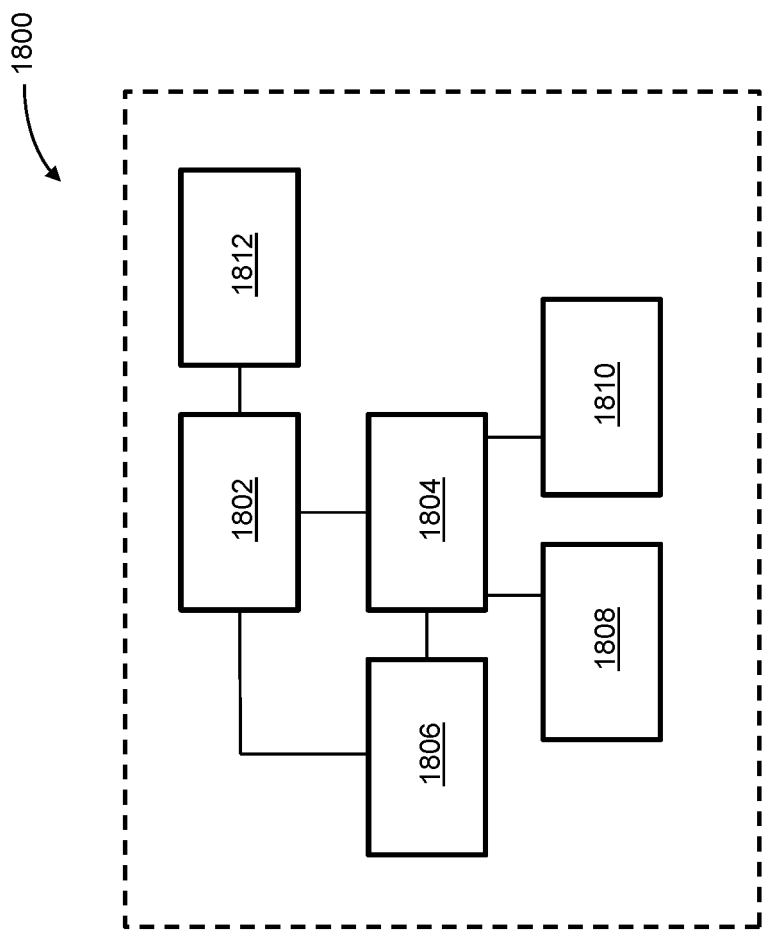
FIG. 18 is a schematic illustration by way of block diagram of a system for controlling a movable object, in accordance with an embodiment of the invention.

FIG. 18 is a schematic illustration by way of block diagram of a system 1800 for controlling a movable object, in accordance with embodiments. The system 1800 can be used in combination with any suitable embodiment of the systems, devices, and methods disclosed herein. The system 1800 can include a sensing module 1802, processing unit 1804, non-transitory computer readable medium 1806, control module 1808, and communication module 1810.

The sensing module 1802 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1802 can be operatively coupled to a processing unit 1804 having a plurality of processors. In some embodiments, the sensing module can be operatively coupled to a transmission module 1812 (e.g., a Wi-Fi image transmission module) configured to directly transmit sensing data to a suitable external device or system. For example, the transmission module 1812 can be used to transmit images captured by a camera of the sensing module 1802 to a remote terminal.

The processing unit 1804 can have one or more processors, such as a programmable processor (e.g., a central processing unit (CPU)). The processing unit 1804 can be operatively coupled to a non-transitory computer readable medium 1806. The non-transitory computer readable medium 1806 can store logic, code, and/or program instructions executable by the processing unit 1804 for performing one or more steps. The non-transitory computer readable medium can include one or more memory units (e.g., removable media or external storage such as an SD card or random access memory (RAM)). In some embodiments, data from the sensing module 1802 can be directly conveyed to and stored within the memory units of the non-transitory computer readable medium 1806. The memory units of the non-transitory computer readable medium 1806 can store logic, code and/or program instructions executable by the processing unit 1804 to perform any suitable embodiment of the methods described herein. For example, the processing unit 1804 can be configured to execute instructions causing one or more processors of the processing unit 1804 to analyze sensing data produced by the sensing module. The memory units can store sensing data from the sensing module to be processed by the processing unit 1804. In some embodiments, the memory units of the non-transitory computer readable medium 1806 can be used to store the processing results produced by the processing unit 1804.

In some embodiments, the processing unit 1804 can be operatively coupled to a control module 1808 configured to control a state of the movable object. For example, the control module 1808 can be configured to control the propulsion mechanisms of the movable object to adjust the spatial disposition, velocity, and/or acceleration of the movable object with respect to six degrees of freedom. Alternatively or in combination, the control module 1808 can control one or more of a state of a carrier, payload, or sensing module.

The processing unit 1804 can be operatively coupled to a communication module 1810 configured to transmit and/or receive data from one or more external devices (e.g., a terminal, display device, or other remote controller). Any suitable means of communication can be used, such as wired communication or wireless communication. For example, the communication module 1810 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1810 can transmit and/or receive one or more of sensing data from the sensing module 1802, processing results produced by the processing unit 1804, predetermined control data, user commands from a terminal or remote controller, and the like.

The components of the system 1800 can be arranged in any suitable configuration. For example, one or more of the components of the system 1800 can be located on the movable object, carrier, payload, terminal, sensing system, or an additional external device in communication with one or more of the above. Additionally, although FIG. 18 depicts a single processing unit 1804 and a single non-transitory computer readable medium 1806, one of skill in the art would appreciate that this is not intended to be limiting, and that the system 1800 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1800 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for controlling operation of an unmanned aerial vehicle (UAV), comprising:

receiving one or more commands selected by a user via a remote controller of the UAV, the one or more commands including at least a landing command to land the UAV on a vehicle while the vehicle is in operation; and
in response to the received landing command:
 identifying the vehicle from a plurality of vehicles for landing;
 navigating the UAV to travel in a substantially same direction as the vehicle; and
 controlling the UAV to land on the vehicle when the UAV approaches the vehicle.

2. The method of claim 1, wherein the one or more commands are input by the user through a user input component, a user interface, a keyboard, a mouse, a joystick, a touchscreen, or a display of the remote controller.

3. The method of claim 1, wherein the remote controller is not coupled to the vehicle.

4. The method of claim 1, wherein the remote controller is coupled to the vehicle.

5. The method of claim 1, wherein controlling the UAV to land on the vehicle when the UAV approaches the vehicle includes:
 controlling one or more propulsion mechanisms of the UAV to decrease an altitude of the UAV.

6. The method of claim 1, wherein controlling the UAV to land on the vehicle when the UAV approaches the vehicle includes:
 controlling one or more propulsion mechanisms of the UAV to control a lateral velocity of the UAV to fall within a predetermined range relative to an assessed lateral velocity of the vehicle.

7. The method of claim 1, wherein identifying the vehicle from the plurality of vehicles for landing includes:
 controlling one or more sensors of the UAV to detect one or more markers on the plurality of vehicles; and
 determining that one of the plurality of vehicles with a specific marker is the vehicle for landing.

8. The method of claim 7, wherein the specific marker indicates a landing position of the UAV on the vehicle.

9. The method of claim 7, further comprising:
 determining a relative distance between the vehicle and the UAV based on the detected marker of the vehicle and an altitude of the UAV.

10. The method of claim 7, wherein navigating the UAV to travel in the substantially same direction as the vehicle includes:
 navigating the UAV to travel in the substantially same direction as the vehicle based on the detected marker of the vehicle.

11. A device for controlling operation of an unmanned aerial vehicle (UAV), comprising:
 a memory storing a program; and
 a processor configured to execute the program to:
  receive one or more commands selected by a user via a remote controller of the UAV, the one or more commands including at least a landing command to land the UAV on a vehicle while the vehicle is in operation; and
  in response to the received landing command:
   identify the vehicle from a plurality of vehicles for landing;
   navigate the UAV to travel in a substantially same direction as the vehicle; and
   control the UAV to land on the vehicle when the UAV approaches the vehicle.

12. The device of claim 11, wherein the one or more commands are input by the user through a user input component, a user interface, a keyboard, a mouse, a joystick, a touchscreen, or a display of the remote controller.

13. The device of claim 11, wherein the remote controller is not coupled to the vehicle.

14. The device of claim 11, wherein the remote controller is coupled to the vehicle.

15. The device of claim 11, wherein the processor is further configured to execute the program to, in response to the received landing command:
control one or more propulsion mechanisms of the UAV to decrease an altitude of the UAV.

16. The device of claim 11, wherein the processor is further configured to execute the program to, in response to the received landing command:
control one or more propulsion mechanisms of the UAV to control a lateral velocity of the UAV to fall within a predetermined range relative to an assessed lateral velocity of the vehicle.

17. The device of claim 11, wherein the processor is further configured to execute the program to, in response to the received landing command:
control one or more sensors of the UAV to detect one or more markers on the plurality of vehicles; and
determine that one of the plurality of vehicles with a specific marker is the vehicle for landing.

18. The device of claim 17, wherein the specific marker indicates a landing position of the UAV on the vehicle.

19. The device of claim 17, wherein the processor is further configured to execute the program to:
determine a relative distance between the vehicle and the UAV based on the detected marker of the vehicle and an altitude of the UAV.

20. The device of claim 17, wherein the processor is further configured to execute the program to, in response to the received landing command:
navigate the UAV to travel in the substantially same direction as the vehicle based on the detected marker of the vehicle.

* * * * *